(12) United States Patent
Iijima et al.

(10) Patent No.: US 9,412,487 B2
(45) Date of Patent: Aug. 9, 2016

(54) SILVER-(CONJUGATED COMPOUND) COMPOSITE

(75) Inventors: Takayuki Iijima, Tsukuba (JP);
Masahiro Fujioka, Wakayama (JP);
Hideyuki Higashimura, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 816 days.

(21) Appl. No.: 13/496,611

(22) PCT Filed: Sep. 17, 2010

(86) PCT No.: PCT/JP2010/066221
§ 371 (c)(1),
(2), (4) Date: Mar. 16, 2012

(87) PCT Pub. No.: WO2011/034177
PCT Pub. Date: Mar. 24, 2011

(65) Prior Publication Data
US 2012/0168693 A1    Jul. 5, 2012

(30) Foreign Application Priority Data
Sep. 18, 2009 (JP) .................. 2009-216732

(51) Int. Cl.
*H01B 1/22* (2006.01)
*B22F 1/00* (2006.01)
*C08K 3/08* (2006.01)
(Continued)

(52) U.S. Cl.
CPC ............. *H01B 1/22* (2013.01); *B22F 1/0062* (2013.01); *C08K 3/08* (2013.01); *B22F 9/24* (2013.01); *B22F 2001/0092* (2013.01); *B82Y 30/00* (2013.01); *C08G 2261/148* (2013.01); *C08G 2261/1424* (2013.01); *C08G 2261/1432* (2013.01); *C08G 2261/3142* (2013.01); *C08G 2261/3162* (2013.01);
(Continued)

(58) Field of Classification Search
USPC ........................................................ 252/500
See application file for complete search history.

(56) References Cited

U.S. PATENT DOCUMENTS

| 5,215,820 A | 6/1993 | Hosokawa et al. |
| 2002/0192476 A1 | 12/2002 | Kambe et al. |

(Continued)

FOREIGN PATENT DOCUMENTS

| CN | 101085857 A | 12/2007 |
| EP | 0488321 A1 | 6/1992 |

(Continued)

OTHER PUBLICATIONS

International Preliminary Report on Patentability and Written Opinion for Application No. PCT/JP2010/066221 dated Apr. 19, 2012.
(Continued)

*Primary Examiner* — Ling Choi
*Assistant Examiner* — Thuy-Ai Nguyen
(74) *Attorney, Agent, or Firm* — Sughrue Mion, PLLC

(57) ABSTRACT

A silver-(conjugated compound) composite comprising silver particles having a number-average Feret diameter of not more than 1,000 nm, and a conjugated compound having a weight-average molecular weight of not less than $3.0 \times 10^2$ adsorbed to the silver particles. The composite exhibits excellent conductivity and charge injection properties, and excellent dispersibility within non-polar solvents.

17 Claims, 1 Drawing Sheet

(51) Int. Cl.
  *B22F 9/24* (2006.01)
  *B82Y 30/00* (2011.01)
  *C08L 65/00* (2006.01)

(52) U.S. Cl.
  CPC ..... *C08G 2261/514* (2013.01); *C08G 2261/95* (2013.01); *C08L 65/00* (2013.01)

(56) References Cited

U.S. PATENT DOCUMENTS

| | | |
|---|---|---|
| 2006/0124922 A1 | 6/2006 | Kim et al. |
| 2006/0163540 A1 | 7/2006 | Yang et al. |
| 2006/0231805 A1 | 10/2006 | Wang et al. |
| 2007/0172834 A1 | 7/2007 | Englebienne et al. |
| 2008/0020208 A1 | 1/2008 | Lee et al. |
| 2010/0006002 A1 | 1/2010 | Sato et al. |
| 2010/0084637 A1* | 4/2010 | Choi et al. ............ 257/40 |
| 2012/0032121 A1 | 2/2012 | Higashimura et al. |

FOREIGN PATENT DOCUMENTS

| | | |
|---|---|---|
| EP | 2418033 A1 | 2/2012 |
| JP | 4-202707 A | 7/1992 |
| JP | 2004-524396 A | 8/2004 |
| JP | 2005-285673 A | 10/2005 |
| JP | 2006-89818 A | 4/2006 |
| JP | 2007-035353 A | 2/2007 |
| JP | 2007-146279 A | 6/2007 |
| JP | 2007-227156 A | 9/2007 |
| JP | 2007-327058 A | 12/2007 |
| JP | 2008-518405 A | 5/2008 |
| JP | 2008-190025 A | 8/2008 |
| JP | 2009-093873 A | 4/2009 |
| WO | 2008/100084 A1 | 8/2008 |
| WO | 2010/048066 A2 | 4/2010 |

OTHER PUBLICATIONS

Notification of Grounds for Rejection issued Jul. 1, 2014 in corresponding Japanese Patent Application No. 2010-209284 with English translation.
Extended European Search Report issued Jul. 28, 2014 in corresponding European Patent Application No. 10817290.9.
Written Opinion by the International Searching Authority (PCT/ISA/237) with partial translation.
First Office Action issued Sep. 17, 2013 in corresponding Chinese Patent Application No. 201080051847.2 with English translation.

* cited by examiner

SILVER-(CONJUGATED COMPOUND) COMPOSITE

CROSS REFERENCE TO RELATED APPLICATIONS

This application is a National Stage of International Application No. PCT/JP2010/066221 filed Sep. 17, 2010, claiming priority based on Japanese Patent Application No. 2009-216732 filed Sep. 18, 2009, the contents of all of which are incorporated herein by reference in their entirety.

TECHNICAL FIELD

The present invention relates to a silver-(conjugated compound) composite.

BACKGROUND ART

In recent years, composites of silver microparticles and organic compounds have been attracting much attention as materials for forming the electrodes or circuit patterns or the like of electronic devices. In Patent Document 1, silver particles with an average particle size of not more than 20 nm and having an organic compound containing one or more unsaturated bonds within each molecule, and specifically oleylamine, provided on the surface of the particles are disclosed as an ink material for an inkjet method. In Patent Document 2, a silver colloidal solution containing silver-based particles in which a coating layer composed of polyvinylpyrrolidone, polyallylamine or polyethyleneimine is provided on the surface of silver particles having an average particle size of not more than 10 nm is disclosed as an ink material for an inkjet printer, but use of this silver colloidal solution for formation of a conductive member is not described.

PRIOR ART DOCUMENTS

Patent Documents

Patent Document 1: JP 2008-190025 A
Patent Document 2: JP 2007-146279 A

However, the silver-organic compound composites disclosed in the above Patent Documents tend to suffer from loss of the conductivity or charge injection properties inherent to silver articles.

Moreover, when the silver-organic compound composite disclosed in Patent Document 2 is used in the preparation of a coating ink, a non-polar solvent is sometimes used as a dispersion medium, but the silver composite exhibits poor dispersibility in non-polar solvents, and is prone to flocculation.

SUMMARY OF THE INVENTION

Problems Invention Aims to Solve

Accordingly, the present invention has an object of providing a silver-(conjugated compound) composite that has excellent conductivity and charge injection properties, and excellent dispersibility within non-polar solvents.

Means for Solution of the Problems

A first aspect of the present invention provides a silver-(conjugated compound) composite comprising silver particles having a number-average Feret diameter of not more than 1,000 nm, and a conjugated compound having a weight-average molecular weight of not less than $3.0 \times 10^2$ bonded to the silver particles.

A second aspect of the present invention provides a method of producing the above silver-(conjugated compound) composite, the method comprising the step of reducing a silver compound in the presence of a conjugated compound having a weight-average molecular weight of not less than $3.0 \times 10^2$.

A third aspect of the present invention provides a method of producing the above silver-(conjugated compound) composite, the method comprising the step of bringing coated silver particles, which have been prepared in advance by coating silver particles having a number-average Feret diameter of not more than 1,000 nm with an unconjugated compound, and a conjugated compound having a weight-average molecular weight of not less than $3.0 \times 10^2$ into contact within a solvent.

A fourth aspect of the present invention provides a dispersion, an electrode material and an organic electronic device each comprising the above silver-(conjugated compound) composite.

A fifth aspect of the present invention provides a layered structure comprising a substrate, and a layer comprising the above silver-(conjugated compound) composite formed on the substrate.

Effects of the Invention

The silver-(conjugated compound) composite of the present invention has excellent conductivity and charge injection properties, and excellent dispersibility within non-polar solvents. The silver-(conjugated compound) composite of the present invention can be used within a coating method that employs a non-polar solvent in the preparation of conductive members such as electrodes and circuit patterns.

EMBODIMENTS OF CARRYING OUT INVENTION

Figure 1:
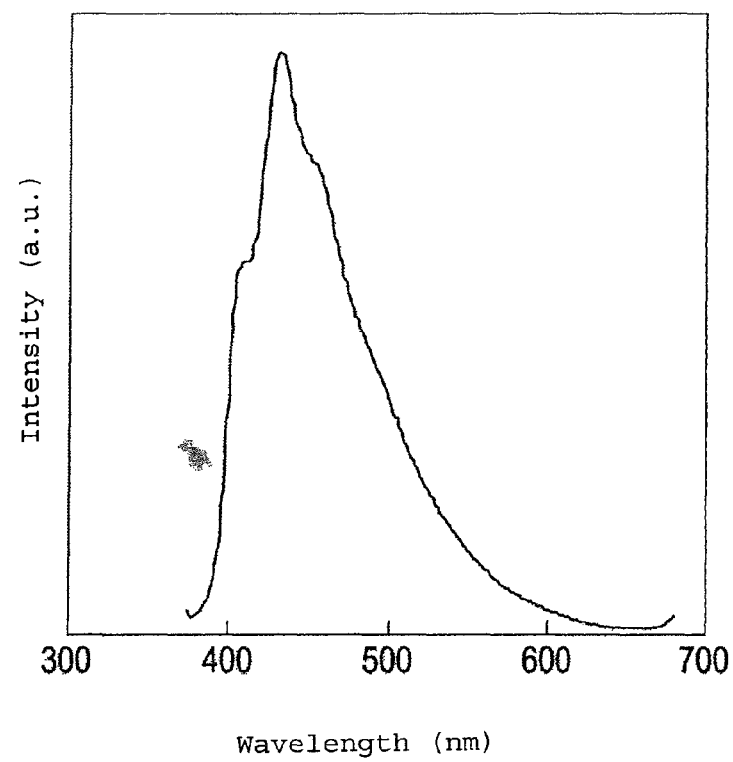
FIG. 1 An emission spectrum of a silver-(conjugated compound) composite (1) obtained in Example 1.
Figure 2:
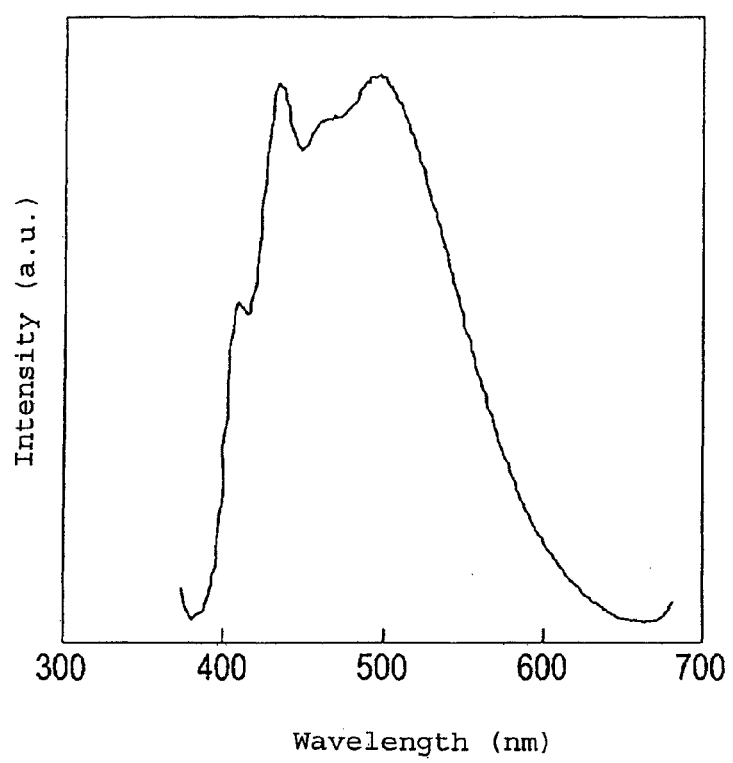
FIG. 2 An emission spectrum of a silver-(conjugated compound) composite (2) obtained in Example 2.

The present invention is described below.
<Silver-(Conjugated Compound) Composite>
The silver-(conjugated compound) composite of the present invention is in the form of particles composed of a composite formed from silver particles and a conjugated compound adsorbed to the surface of the particles.

In this description, the term "adsorption" may refer to chemical adsorption, physical adsorption or a combination thereof. From the viewpoint of the strength of the adsorption, chemical adsorption is preferred. Chemical adsorption refers to adsorption that occurs via chemical bonding such as covalent bonding, ionic bonding, metallic bonding, coordination bonding or hydrogen bonding between an adsorbate and an adsorbent. Physical adsorption refers to adsorption that occurs via interactions such as van der Waals forces, electrostatic attraction or magnetism. In the silver-(conjugated compound) composite of the present invention, the adsorbate is the conjugated compound and the adsorbent is the silver particles.

Silver Particles:
The silver particles that function as the matrix in the silver-(conjugated compound) composite of the present invention have a number-average Feret diameter that is typically not more than 1,000 nm, and from the viewpoint of ease of synthesis, this number-average Feret diameter is preferably not more than 800 nm, more preferably not more than 600 nm, still more preferably not more than 400 nm, and most preferably 300 nm or less. Further, the number-average Feret diameter of the silver particles is typically not less than 1 nm.

The aspect ratio, which is an indicator that defines the shape of the silver particles, is typically less than 1.5, preferably not more than 1.4, and still more preferably 1.2 or less. In this description, the aspect ratio refers to the value of (longest diameter)/(shortest diameter), and in those cases where there is an aspect ratio distribution, refers to a number-average value.

Conjugated Compound:

From the viewpoint of the stability of the silver-(conjugated compound) composite, the weight-average molecular weight of the conjugated compound is preferably not less than $3.0\times10^2$, more preferably not less than $5.0\times10^2$, and still more preferably $1.0\times10^3$ or greater, whereas the upper limit is preferably not more than $1.0\times10^8$, more preferably not more than $1.0\times10^7$, and still more preferably not more than $5.0\times10^6$. Accordingly, the range for the weight-average molecular weight is preferably from $3.0\times10^2$ to $1.0\times10^8$, more preferably from $5.0\times10^2$ to $1.0\times10^7$, and still more preferably from $1.0\times10^3$ to $5.0\times10^6$. In those cases where the weight-average molecular weight of the conjugated compound is less than $3.0\times10^2$, the conjugated compound adsorbed to the silver-(conjugated compound) composite may be more prone to separation by evaporation or the like. In the present description, the weight-average molecular weight and number-average molecular weight of a compound refer to the polystyrene-equivalent weight-average molecular weight and number-average molecular weight measured using gel permeation chromatography (GPC).

In the present description, the term "conjugated compound" describes a compound containing a region having a plurality of multiple bonds (for example, double bonds and triple bonds) within the main chain, wherein adjacent multiple bonds within the region are linked in sequence via a single bond, or a hetero atom having an unshared electron pair (for example, a nitrogen atom or oxygen atom) is interposed within the above type of multiple bond sequence, and delocalization of the conjugated π electrons can be realized within this region.

From the viewpoint of the electron transport properties, a value for the conjugated compound calculated by the following formula:

{(number of atoms contained within the delocalization region for the conjugated π electrons within the main chain)/(total number of atoms in the main chain)}×100% is preferably not less than 50%, more preferably not less than 60%, still more preferably not less than 70%, still more preferably not less than 80%, and most preferably 90% or greater.

The conjugated compound used in the present invention is preferably insoluble in water.

The expression that the conjugated compound used in the present invention is insoluble in water means that, at a standard temperature and under standard pressure, the amount of the conjugated compound that dissolves in 100 ml of water is less than 20 mg. If this amount is 20 mg or greater, then the conjugated compound tends to desorb from the silver particles when the silver-(conjugated compound) composite is washed with water, meaning performing water washing becomes difficult.

The conjugated compound used in the present invention is preferably an aromatic compound.

From the viewpoint of the dispersibility of the composite, the proportion of the conjugated compound within the silver-(conjugated compound) composite used in the present invention is preferably not less than 1.0% by weight, and is more preferably 5.0% by weight or greater. If the amount of the conjugated compound adsorbed to the silver particles is insufficient, then the silver-(conjugated compound) composite tends to be prone to flocculation.

From the viewpoint of the stability of the silver-(conjugated compound) composite, the conjugated compound used in the present invention preferably has a monovalent group containing a hetero atom. In this description, a "hetero atom" refers to an atom of an element other than carbon and hydrogen.

The conjugated compound used in the present invention is preferably a compound having a monovalent group represented by a formula (I) shown below, a repeating unit represented by a formula (II) shown below, or both a monovalent group represented by the formula (I) and a repeating unit represented by the formula (II).

[Chemical Formula 1]

(I)

(wherein $Ar^1$ represents an aromatic group having a valency of $(n^1+1)$, each $R^1$ independently represents a single bond or a group having a valency of $(m^1+1)$, and $X^1$ represents a monovalent group containing a hetero atom; $m^1$ and $n^1$ may be the same or different, and each represents an integer of 1 or greater; and when there is a plurality of any one or more of $R^1$, $X^1$ and $m^1$, in each case, the plurality of groups or numbers may be the same or different).

[Chemical Formula 2]

(II)

(wherein $Ar^2$ represents an aromatic group having a valency of $(n^2+2)$, each $R^2$ independently represents a single bond or a group having a valency of $(m^2+1)$, and $X^2$ represents a monovalent group containing a hetero atom; $m^2$ and $n^2$ may be the same or different, and each represents an integer of 1 or greater; and when there is a plurality of any one or more of $R^2$, $X^2$ and $m^2$, in each case, the plurality of groups or numbers may be the same or different).

From the viewpoint of the stability of the silver-(conjugated compound) composite, the formula weight of the repeating unit represented by the formula (II) is preferably not less than $3.0\times10^2$, more preferably not less than $5.0\times10^2$, and still more preferably $1.0\times10^3$ or greater. Further, although there are no particular limitations on the upper limit for the formula weight of the repeating unit, from the viewpoints of the ease of synthesis of the monomer that constitutes the repeating unit and the stability of the resulting silver-(conjugated compound) composite, the formula weight is preferably not more than $1.0\times10^8$, more preferably not more than $1.0 \times 10^7$, still more preferably not more than $5.0 \times 10^6$, still more preferably not more than $1.0 \times 10^5$, and most preferably $1.0 \times 10^4$ or less. If the formula weight of the repeating unit is less than $3.0 \times 10^2$, then the conjugated compound adsorbed to the silver-(conjugated compound) composite may be more prone to separation by evaporation or the like.

The formula weight of the repeating unit refers to the weight obtained by subtracting the atomic weight of two hydrogen atoms from the molecular weight of a molecule represented by a formula (III) shown below.

[Chemical Formula 3]

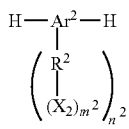
(III)

In the above formula (I), the aromatic group having a valency of $(n^1+1)$ represented by $Ar^1$ is, for example, a group of atoms remaining following removal of $(n^1+1)$ hydrogen atoms from an aromatic compound represented by a formula (1) to (57) shown below. This aromatic group $Ar^1$ having a valency of $(n^1+1)$ may have at least one substituent.

Examples of the substituent include at least one substituent selected from the group consisting of a halogen atom, monovalent hydrocarbon group, mercapto group, mercaptocarbonyl group, mercaptothiocarbonyl group, hydrocarbylthio group, hydrocarbylthiocarbonyl group, hydrocarbyldithio group, hydroxyl group, hydrocarbyloxy group, carboxyl group, hydrocarbylcarbonyl group, cyano group, amino group, hydrocarbylamino group, dihydrocarbylamino group, phosphino group, hydrocarbylphosphino group, dihydrocarbylphosphino group, a group represented by a formula: —P(=O)(OH)$_2$, sulfo group, monovalent heterocyclic group, a group represented by a formula: —COOM, a group represented by a formula: —PO$_3$M, a group represented by a formula: —SO$_3$M (wherein M represents a metal cation or an ammonium cation which may have a substituent), and a group represented by a formula: —NR$_3$M' (wherein R represents a hydrogen atom or a monovalent hydrocarbon group and M' represents an anion). Of these, a halogen atom, monovalent hydrocarbon group, carboxyl group, amino group, monovalent heterocyclic group, a group represented by the formula: —COOM or a group represented by the formula: —SO$_3$M is preferred, a monovalent hydrocarbon group, carboxyl group, amino group, pyrrolidinyl group, pyridinyl group or group represented by the formula: —COOM is more preferred, a monovalent hydrocarbon group, carboxyl group, monovalent heterocyclic group or group represented by the formula: —COOM is still more preferred, and a monovalent hydrocarbon group, carboxyl group, pyridinyl group or group represented by the formula: —COOM is particularly preferred.

In the above formula (II), the aromatic group having a valency of $(n^2+2)$ represented by $Ar^2$ is, for example, a group of atoms remaining following removal of $(n^2+2)$ hydrogen atoms from an aromatic compound represented by a formula (1) to (57) shown below. This aromatic group $Ar^2$ having a valency of $(n^2+2)$ may have at least one substituent. This substituent include the same substituents as those described above for $Ar^1$.

Among the aromatic compounds represented by the formulas (1) to (57) shown below, from the viewpoint of ease of synthesis, compounds represented by the formulas (1) to (8), (17), (24) to (33), (36) to (51) and (55) are preferred, compounds represented by the formulas (1) to (8), (17), (30) to (33), (36) to (42), (48) to (51) and (55) are more preferred, compounds represented by the formulas (1) to (8) are still more preferred, and compounds represented by the formulas (3) and (8) are particularly desirable.

[Chemical Formula 4]

(1)

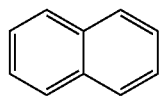
(2)

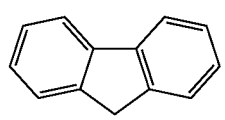
(3)

(4)

(5)

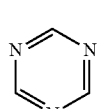
(6)

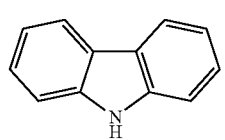
(7)

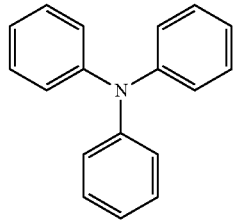
(8)

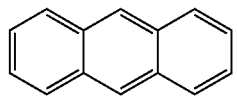
(9)

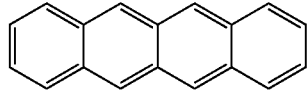
(10)

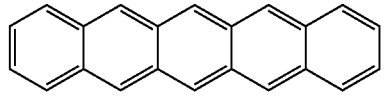
(11)

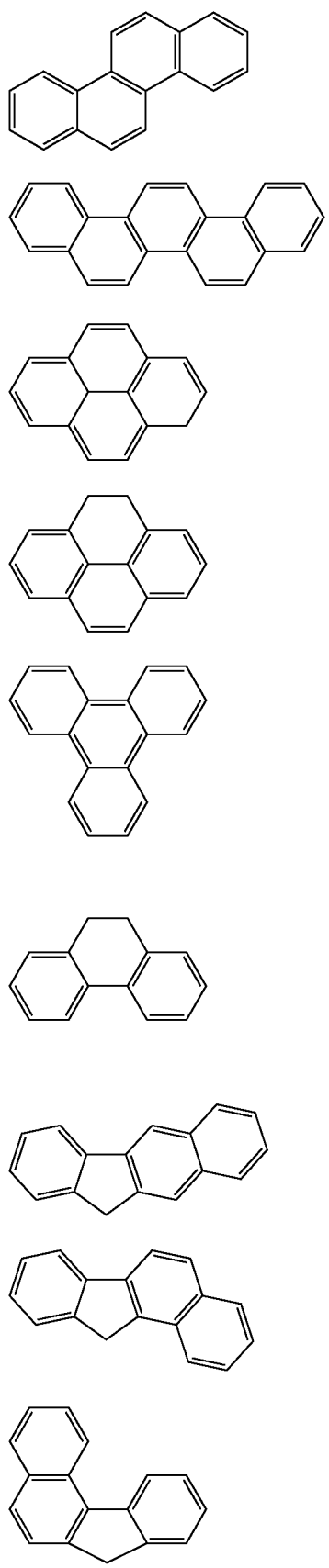
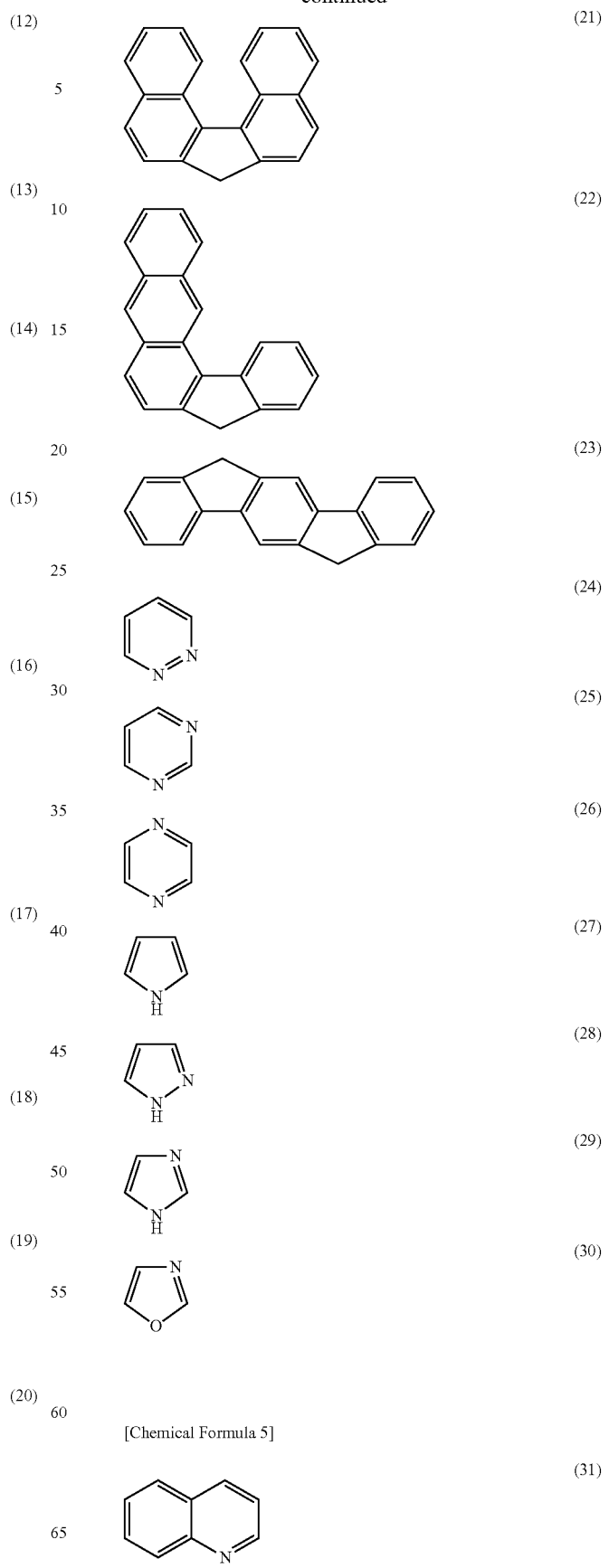
[Chemical Formula 5]

(32) 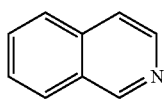
(33) 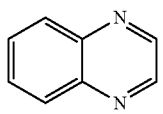
(34) 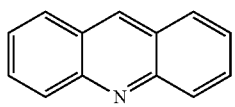
(35) 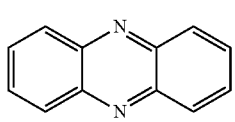
(36) 
(37) 
(38) 
(39) 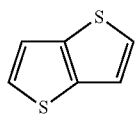
(40) 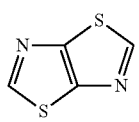
(41) 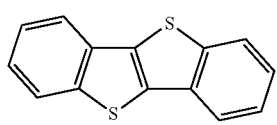
(42) 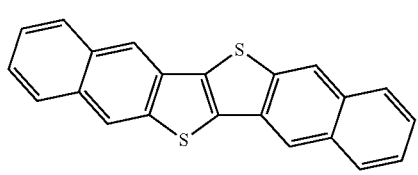
(43) 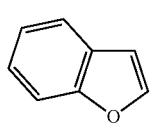
(44) 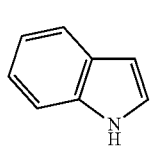
(45) 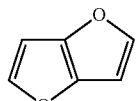
(46) 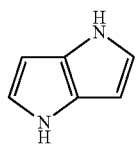
(47) 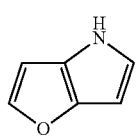
(48) 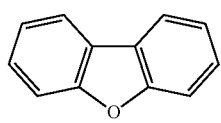
(49) 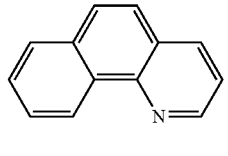
(50) 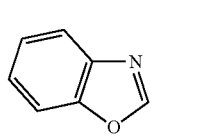
(51) 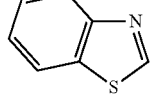
(52) 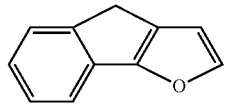
(53) 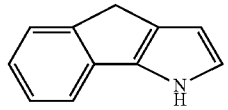
(54) 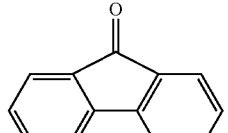
(55) 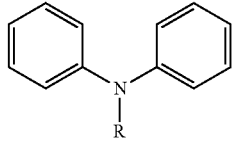

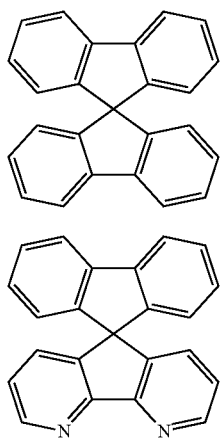

(wherein R is the same as defined above).

Throughout this description, the atoms and groups that the groups $Ar^1$ and $Ar^2$ may have as substituents listed above have the meanings shown below.

The "halogen atom" includes a fluorine atom, chlorine atom, bromine atom and iodine atom. As a substituent for $Ar^1$ and $Ar^2$, a fluorine atom, chlorine atom or bromine atom is preferred.

A "monovalent hydrocarbon group" refers to a substituted or unsubstituted monovalent hydrocarbon group, wherein the unsubstituted monovalent hydrocarbon group includes alkyl groups of 1 to 50 carbon atoms such as a methyl group, ethyl group, propyl group, isopropyl group, butyl group, isobutyl group, t-butyl group, pentyl group, hexyl group, nonyl group, dodecyl group, pentadecyl group, octadecyl group and docosyl group; cycloalkyl groups of 3 to 50 carbon atoms such as a cyclopropyl group, cyclobutyl group, cyclopentyl group, cyclohexyl group, cyclononyl group and cyclododecyl group; bicycloalkyl groups of 4 to 50 carbon atoms such as a norbornyl group and adamantyl group; alkenyl groups of 2 to 50 carbon atoms such as an ethenyl group, propenyl group, 3-butenyl group, 2-butenyl group, 2-pentenyl group, 2-hexenyl group, 2-nonenyl group and 2-dodecenyl group; aryl groups of 6 to 50 carbon atoms such as a phenyl group, 1-naphthyl group, 2-naphthyl group, 2-methylphenyl group, 3-methylphenyl group, 4-methylphenyl group, 4-ethylphenyl group, 4-propylphenyl group, 4-isopropylphenyl group, 4-butylphenyl group, 4-t-butylphenyl group, 4-hexylphenyl group, 4-cyclohexylphenyl group, 4-adamantylphenyl group and 4-phenylphenyl group; and aralkyl groups of 7 to 50 carbon atoms such as a phenylmethyl group, 1-phenylethyl group, 2-phenylethyl group, 1-phenyl-1-propyl group, 1-phenyl-2-propyl group, 2-phenyl-2-propyl group, 3-phenyl-1-propyl group, 4-phenyl-1-butyl group, 5-phenyl-1-pentyl group and 6-phenyl-1-hexyl group. The substituted monovalent hydrocarbon group includes groups in which some or all of the hydrogen atoms within one of the above unsubstituted monovalent hydrocarbon groups have each been substituted with a halogen atom or a mercapto group or the like.

The substituent for $Ar^1$ or $Ar^2$ is preferably an alkyl group of 1 to 50 carbon atoms or an aryl group of 6 to 50 carbon atoms, more preferably an alkyl group of 1 to 12 carbon atoms or an aryl group of 6 to 18 carbon atoms, and still more preferably an alkyl group of 1 to 6 carbon atoms or an aryl group of 6 to 12 carbon atoms. Some or all of the hydrogen atoms in these groups may each be substituted with a halogen atom or a mercapto group or the like.

The terms "hydrocarbylthio group", "hydrocarbylthiocarbonyl group", "hydrocarbyldithio group", "hydrocarbyloxy group" and "hydrocarbylcarbonyl group" refer to a substituted or unsubstituted hydrocarbylthio group, hydrocarbylthiocarbonyl group, hydrocarbyldithio group, hydrocarbyloxy group and hydrocarbylcarbonyl group respectively.

Here, a "hydrocarbylthio group" refers to an unsubstituted hydrocarbylthio group or a substituted hydrocarbylthio group that is substituted with, e.g., a halogen atom or a mercapto group or the like.

The unsubstituted hydrocarbylthio group includes an unsubstituted alkylthio group, cycloalkylthio group, bicycloalkylthio group, alkenylthio group, arylthio group and aralkylthio group.

The unsubstituted alkylthio group may be either linear or branched, and typically contains 1 to 20 carbon atoms, preferably 1 to 15 carbon atoms, and more preferably 1 to 10 carbon atoms. Examples of the unsubstituted alkylthio group include a methylthio group, ethylthio group, propylthio group, isopropylthio group, butylthio group, isobutylthio group, s-butylthio group, t-butylthio group, pentylthio group, hexylthio group, heptylthio group, octylthio group, 2-ethylhexylthio group, nonylthio group, decylthio group, 3,7-dimethyloctylthio group, dodecylthio group and trifluoromethylthio group.

The unsubstituted cycloalkylthio group typically contains 3 to 50 carbon atoms, and examples thereof include a cyclopropylthio group, cyclobutylthio group, cyclopentylthio group, cyclohexylthio group, cyclononylthio group and cyclododecylthio group.

The unsubstituted bicycloalkylthio group typically contains 4 to 50 carbon atoms, and examples thereof include a norbornylthio group and adamantylthio group.

The unsubstituted alkenylthio group typically contains 2 to 50 carbon atoms, and examples thereof include an ethenylthio group, propenylthio group, 3-butenylthio group, 2-butenylthio group, 2-pentenylthio group, 2-hexenylthio group, 2-nonenylthio group and 2-dodecenylthio group.

The unsubstituted arylthio group typically contains 6 to 50 carbon atoms, and examples thereof include a phenylthio group, 1-naphthylthio group, 2-naphthylthio group, 2-methylphenylthio group, 3-methylphenylthio group, 4-methylphenylthio group, 4-ethylphenylthio group, 4-propylphenylthio group, 4-isopropylphenylthio group, 4-butylphenylthio group, 4-t-butylphenylthio group, 4-hexylphenylthio group, 4-cyclohexylphenylthio group, 4-adamantylphenylthio group and 4-phenylphenylthio group.

The unsubstituted aralkylthio group typically contains 7 to 50 carbon atoms, and examples thereof include a phenylmethylthio group, 1-phenylethylthio group, 2-phenylethylthio group, 1-phenyl-1-propylthio group, 1-phenyl-2-propylthio group, 2-phenyl-2-propylthio group, 3-phenyl-1-propylthio group, 4-phenyl-1-butylthio group, 5-phenyl-1-pentylthio group and 6-phenyl-1-hexylthio group.

A "hydrocarbylthiocarbonyl group" refers to an unsubstituted hydrocarbylthiocarbonyl group or a substituted hydrocarbylthiocarbonyl group that is substituted with, e.g., a halogen atom or a mercapto group or the like.

Examples of the unsubstituted hydrocarbylthiocarbonyl group include an unsubstituted alkylthiocarbonyl group, cycloalkylthiocarbonyl group, bicycloalkylthiocarbonyl group, alkenylthiocarbonyl group, arylthiocarbonyl group and aralkylthiocarbonyl group.

The unsubstituted alkylthiocarbonyl group may be either linear or branched, and typically contains 2 to 21 carbon atoms, preferably 2 to 16 carbon atoms, and more preferably 2 to 11 carbon atoms. Examples of the unsubstituted alkylthiocarbonyl group include a methylthiocarbonyl group, ethylthiocarbonyl group, propylthiocarbonyl group, isopropylthiocarbonyl group, butylthiocarbonyl group, isobutylthiocarbonyl group, s-butylthiocarbonyl group, t-butylthiocarbonyl group, pentylthiocarbonyl group, hexylthiocarbonyl group, heptylthiocarbonyl group, octylthiocarbonyl group, 2-ethylhexylthiocarbonyl group, nonylthiocarbonyl group, decylthiocarbonyl group, 3,7-dimethyloctylthiocarbonyl group, dodecylthiocarbonyl group and trifluoromethylthiocarbonyl group.

The unsubstituted cycloalkylthiocarbonyl group typically contains 4 to 50 carbon atoms, and examples thereof include a cyclopropylthiocarbonyl group, cyclobutylthiocarbonyl group, cyclopentylthiocarbonyl group, cyclohexylthiocarbonyl group, cyclononylthiocarbonyl group and cyclododecylthiocarbonyl group.

The unsubstituted bicycloalkylthiocarbonyl group typically contains 5 to 50 carbon atoms, and examples thereof include a norbornylthiocarbonyl group and adamantylthiocarbonyl group.

The unsubstituted alkenylthiocarbonyl group typically contains 3 to 50 carbon atoms, and examples thereof include an ethenylthiocarbonyl group, propenylthiocarbonyl group, 3-butenylthiocarbonyl group, 2-butenylthiocarbonyl group, 2-pentenylthiocarbonyl group, 2-hexenylthiocarbonyl group, 2-nonenylthiocarbonyl group and 2-dodecenylthiocarbonyl group.

The unsubstituted arylthiocarbonyl group typically contains 7 to 50 carbon atoms, and examples thereof include a phenylthiocarbonyl group, 1-naphthylthiocarbonyl group, 2-naphthylthiocarbonyl group, 2-methylphenylthiocarbonyl group, 3-methylphenylthiocarbonyl group, 4-methylphenylthiocarbonyl group, 4-ethylphenylthiocarbonyl group, 4-propylphenylthiocarbonyl group, 4-isopropylphenylthiocarbonyl group, 4-butylphenylthiocarbonyl group, 4-t-butylphenylthiocarbonyl group, 4-hexylphenylthiocarbonyl group, 4-cyclohexylphenylthiocarbonyl group, 4-adamantylphenylthiocarbonyl group and 4-phenylphenylthiocarbonyl group.

The unsubstituted aralkylthiocarbonyl group typically contains 8 to 50 carbon atoms, and examples thereof include a phenylmethylthiocarbonyl group, 1-phenylethylthiocarbonyl group, 2-phenylethylthiocarbonyl group, 1-phenyl-1-propylthiocarbonyl group, 1-phenyl-2-propylthiocarbonyl group, 2-phenyl-2-propylthiocarbonyl group, 3-phenyl-1-propylthiocarbonyl group, 4-phenyl-1-butylthiocarbonyl group, 5-phenyl-1-pentylthiocarbonyl group and 6-phenyl-1-hexylthiocarbonyl group.

A "hydrocarbyldithio group" refers to an unsubstituted hydrocarbyldithio group or a substituted hydrocarbyldithio group that is substituted with, e.g., a halogen atom or a mercapto group or the like.

The unsubstituted hydrocarbyldithio group includes an alkyldithio group, cycloalkyldithio group, bicycloalkyldithio group, alkenyldithio group, aryldithio group and aralkyldithio group.

The unsubstituted alkyldithio group may be either linear or branched, and typically contains 1 to 20 carbon atoms, preferably 1 to 15 carbon atoms, and more preferably 1 to 10 carbon atoms. Examples of the unsubstituted alkyldithio group include a methyldithio group, ethyldithio group, propyldithio group, isopropyldithio group, butyldithio group, isobutyldithio group, s-butyldithio group, t-butyldithio group, pentyldithio group, hexyldithio group, heptyldithio group, octyldithio group, 2-ethylhexyldithio group, nonyldithio group, decyldithio group, 3,7-dimethyloctyldithio group, dodecyldithio group and trifluoromethyldithio group.

The unsubstituted cycloalkyldithio group typically contains 3 to 50 carbon atoms, and examples thereof include a cyclopropyldithio group, cyclobutyldithio group, cyclopentyldithio group, cyclohexyldithio group, cyclononyldithio group and cyclododecyldithio group.

The unsubstituted bicycloalkyldithio group typically contains 4 to 50 carbon atoms, and examples thereof include a norbornyldithio group and adamantyldithio group.

The unsubstituted alkenyldithio group typically contains 2 to 50 carbon atoms, and examples thereof include an ethenyldithio group, propenyldithio group, 3-butenyldithio group, 2-butenyldithio group, 2-pentenyldithio group, 2-hexenyldithio group, 2-nonenyldithio group and 2-dodecenyldithio group.

The unsubstituted aryldithio group typically contains 6 to 50 carbon atoms, and examples thereof include a phenyldithio group, 1-naphthyldithio group, 2-naphthyldithio group, 2-methylphenyldithio group, 3-methylphenyldithio group, 4-methylphenyldithio group, 4-ethylphenyldithio group, 4-propylphenyldithio group, 4-isopropylphenyldithio group, 4-butylphenyldithio group, 4-t-butylphenyldithio group, 4-hexylphenyldithio group, 4-cyclohexylphenyldithio group, 4-adamantylphenyldithio group and 4-phenylphenyldithio group.

The unsubstituted aralkyldithio group typically contains 7 to 50 carbon atoms, and examples thereof include a phenylmethyldithio group, 1-phenylethyldithio group, 2-phenylethyldithio group, 1-phenylpropyldithio group, 2-phenyl-1-methylethyldithio group, 1-phenyl-1-methylethyldithio group, 3-phenylpropyldithio group, 4-phenylbutyldithio group, 5-phenylpentyldithio group and 6-phenylhexyldithio group.

A "hydrocarbyloxy group" refers to an unsubstituted hydrocarbyloxy group or a substituted hydrocarbyloxy group that is substituted with, e.g., a halogen atom or a mercapto group or the like.

Examples of the unsubstituted hydrocarbyloxy group include an unsubstituted alkoxy group, cycloalkoxy group, bicycloalkoxy group, alkenyloxy group, aryloxy group and aralkyloxy group.

The unsubstituted alkoxy group may be either linear or branched, and typically contains 1 to 20 carbon atoms, preferably 1 to 15 carbon atoms, and more preferably 1 to 10 carbon atoms. Examples of the unsubstituted alkyloxy group include a methoxy group, ethoxy group, propoxy group, isopropoxy group, butoxy group, isobutoxy group, s-butoxy group, t-butoxy group, pentyloxy group, hexyloxy group, heptyloxy group, octyloxy group, 2-ethylhexyloxy group, nonyloxy group, decyloxy group, 3,7-dimethyloctyloxy group, dodecyloxy group and trifluoromethoxy group.

The unsubstituted cycloalkoxy group typically contains 3 to 50 carbon atoms, and examples thereof include a cyclopropoxy group, cyclobutoxy group, cyclopentyloxy group, cyclohexyloxy group, cyclononyloxy group and cyclododecyloxy group.

The unsubstituted bicycloalkoxy group typically contains 4 to 50 carbon atoms, and examples thereof include a norbornyloxy group and adamantyloxy group.

The unsubstituted alkenyloxy group typically contains 2 to 50 carbon atoms, and examples thereof include an ethenyloxy group, propenyloxy group, 3-butenyloxy group, 2-butenyloxy group, 2-pentenyloxy group, 2-hexenyloxy group, 2-nonenyloxy group and 2-dodecenyloxy group.

The unsubstituted aryloxy group typically contains 6 to 50 carbon atoms, and examples thereof include a phenoxy group, 1-naphthyloxy group, 2-naphthyloxy group, 2-methylphenoxy group, 3-methylphenoxy group, 4-methylphenoxy group, 4-ethylphenoxy group, 4-propylphenoxy group, 4-isopropylphenoxy group, 4-butylphenoxy group, 4-t-butylphenoxy group, 4-hexylphenoxy group, 4-cyclohexylphenoxy group, 4-adamantylphenoxy group and 4-phenylphenoxy group.

The unsubstituted aralkyloxy group typically contains 7 to 50 carbon atoms, and examples thereof include a phenylmethoxy group, 1-phenylethoxy group, 2-phenylethoxy group, 1-phenyl-1-propoxy group, 1-phenyl-2-propoxy group, 2-phenyl-2-propoxy group, 3-phenyl-1-propoxy group, 4-phenyl-1-butoxy group, 5-phenyl-1-pentyloxy group and 6-phenyl-1-hexyloxy group.

A "hydrocarbylcarbonyl group" refers to an unsubstituted hydrocarbylcarbonyl group or a substituted hydrocarbylcarbonyl group that is substituted with, e.g., a halogen atom or a mercapto group or the like.

The unsubstituted hydrocarbylcarbonyl group includes an unsubstituted alkylcarbonyl group, cycloalkylcarbonyl group, bicycloalkylcarbonyl group, alkenylcarbonyl group, arylcarbonyl group and aralkylcarbonyl group.

The unsubstituted alkylcarbonyl group may be either linear or branched, and typically contains 1 to 20 carbon atoms, preferably 1 to 15 carbon atoms, and more preferably 1 to 10 carbon atoms. The unsubstituted alkylcarbonyl group includes a formyl group, acetyl group, ethylcarbonyl group, propylcarbonyl group, isopropylcarbonyl group, butylcarbonyl group, isobutylcarbonyl group, s-butylcarbonyl group, t-butylcarbonyl group, pentylcarbonyl group, hexylcarbonyl group, heptylcarbonyl group, octylcarbonyl group, 2-ethylhexylcarbonyl group, nonylcarbonyl group, decylcarbonyl group, 3,7-dimethyloctylcarbonyl group, dodecylcarbonyl group and trifluoromethylcarbonyl group.

The unsubstituted cycloalkylcarbonyl group typically contains 4 to 50 carbon atoms, and examples thereof include a cyclopropylcarbonyl group, cyclobutylcarbonyl group, cyclopentylcarbonyl group, cyclohexylcarbonyl group, cyclononylcarbonyl group and cyclododecylcarbonyl group.

The unsubstituted bicycloalkylcarbonyl group typically contains 5 to 50 carbon atoms, and examples thereof include a norbornylcarbonyl group and adamantylcarbonyl group.

The unsubstituted alkenylcarbonyl group typically contains 2 to 50 carbon atoms, and examples thereof include an ethenylcarbonyl group, propenylcarbonyl group, 3-butenylcarbonyl group, 2-butenylcarbonyl group, 2-pentenylcarbonyl group, 2-hexenylcarbonyl group, 2-nonenylcarbonyl group and 2-dodecenylcarbonyl group.

The unsubstituted arylcarbonyl group typically contains 6 to 50 carbon atoms, and examples thereof include a phenylcarbonyl group, 1-naphthylcarbonyl group, 2-naphthylcarbonyl group, 2-methylphenylcarbonyl group, 3-methylphenylcarbonyl group, 4-methylphenylcarbonyl group, 4-ethylphenylcarbonyl group, 4-propylphenylcarbonyl group, 4-isopropylphenylcarbonyl group, 4-butylphenylcarbonyl group, 4-t-butylphenylcarbonyl group, 4-hexylphenylcarbonyl group, 4-cyclohexylphenylcarbonyl group, 4-adamantylphenylcarbonyl group and 4-phenylphenylcarbonyl group.

The unsubstituted aralkylcarbonyl group typically contains 7 to 50 carbon atoms, and examples thereof include a phenylmethylcarbonyl group, 1-phenylethylcarbonyl group, 2-phenylethylcarbonyl group, 1-phenyl-1-propylcarbonyl group, 1-phenyl-2-propylcarbonyl group, 2-phenyl-2-propylcarbonyl group, 3-phenyl-1-propylcarbonyl group, 4-phenyl-1-butylcarbonyl group, 5-phenyl-1-pentylcarbonyl group and 6-phenyl-1-hexylcarbonyl group.

A "hydrocarbylamino group", "dihydrocarbylamino group", "hydrocarbylphosphino group" and "dihydrocarbylphosphino group" refer to a substituted or unsubstituted hydrocarbylamino group, a substituted or unsubstituted dihydrocarbylamino group, a substituted or unsubstituted hydrocarbylphosphino group and a substituted or unsubstituted dihydrocarbylphosphino group respectively.

A "hydrocarbylamino group" refers to an unsubstituted hydrocarbylamino group or a substituted hydrocarbylamino group that is substituted with, e.g., a halogen atom or a mercapto group or the like.

The unsubstituted hydrocarbylamino group includes an unsubstituted alkylamino group, cycloalkylamino group, bicycloalkylamino group, alkenylamino group, arylamino group and aralkylamino group.

The unsubstituted alkylamino group may be either linear or branched, and typically contains 1 to 20 carbon atoms, preferably 1 to 15 carbon atoms, and more preferably 1 to 10 carbon atoms. Examples of the alkylamino group include a methylamino group, ethylamino group, propylamino group, isopropylamino group, butylamino group, isobutylamino group, s-butylamino group, t-butylamino group, pentylamino group, hexylamino group, heptylamino group, octylamino group, 2-ethylhexylamino group, nonylamino group, decylamino group, 3,7-dimethyloctylamino group, dodecylamino group and trifluoromethylamino group.

The unsubstituted cycloalkylamino group typically contains 3 to 50 carbon atoms, and examples thereof include a cyclopropylamino group, cyclobutylamino group, cyclopentylamino group, cyclohexylamino group, cyclononylamino group and cyclododecylamino group.

The unsubstituted bicycloalkylamino group typically contains 4 to 50 carbon atoms, and examples thereof include a norbornylamino group and adamantylamino group.

The unsubstituted alkenylamino group typically contains 2 to 50 carbon atoms, and examples thereof include an ethenylamino group, propenylamino group, 3-butenylamino group, 2-butenylamino group, 2-pentenylamino group, 2-hexenylamino group, 2-nonenylamino group and 2-dodecenylamino group.

The unsubstituted arylamino group typically contains 6 to 50 carbon atoms, and examples thereof include a phenylamino group, 1-naphthylamino group, 2-naphthylamino group, 2-methylphenylamino group, 3-methylphenylamino group, 4-methylphenylamino group, 4-ethylphenylamino group, 4-propylphenylamino group, 4-isopropylphenylamino group, 4-butylphenylamino group, 4-t-butylphenylamino group, 4-hexylphenylamino group, 4-cyclohexylphenylamino group, 4-adamantylphenylamino group and 4-phenylphenylamino group.

The unsubstituted aralkylamino group typically contains 7 to 50 carbon atoms, and examples thereof include a phenylmethylamino group, 1-phenylethylamino group, 2-phenylethylamino group, 1-phenyl-1-propylamino group, 1-phenyl-2-propylamino group, 2-phenyl-2-propylamino group, 3-phenyl-1-propylamino group, 4-phenyl-1-butylamino group, 5-phenyl-1-pentylamino group and 6-phenyl-1-hexylamino group.

Examples of the "dihydrocarbylamino group" include amino groups in which the two hydrogen atoms are substituted with identical or different monovalent hydrocarbon groups of 1 to 20 carbon atoms, including dialkylamino groups such as a dimethylamino group, diethylamino group, methylethylamino group, dipropylamino group, methylpropylamino group, diisopropylamino group, dibutylamino group, methylbutylamino group, diisobutylamino group, di-s-butylamino group, di-t-butylamino group, dipentylamino group, dihexylamino group, ethylhexylamino group, diheptylamino group, dioctylamino group, dinonylamino group and didecylamino group; alkylarylamino groups such as a methylphenylamino group and ethylphenylamino group; and diarylamino groups such as a di(4-methylphenyl)amino group, di(2,3-xylyl)amino group, diphenylamino group and phenyltoluoylamino group.

Further, the dihydrocarbylamino group includes 5-membered ring or 6-membered ring cyclic amino groups such as a 1-pyrrolidinyl group, 3-methyl-1-pyrrolidinyl group, 1-pyrrolyl group, 3-ethyl-1-pyrrolyl group, 1-indolyl group, 1-piperidinyl group, 3-methyl-1-piperidinyl group, 1-piperazinyl group, 4-methyl-1-piperazinyl group, 1-imidazolidinyl group and 4-morpholinyl group.

A "hydrocarbylphosphino group" refers to an unsubstituted hydrocarbylphosphino group or a substituted monohydrocarbylphosphino group in which the hydrocarbon group portion is substituted with, e.g., a halogen atom or a mercapto group or the like.

Examples of the unsubstituted hydrocarbylphosphino group include an unsubstituted alkylphosphino group, cycloalkylphosphino group, bicycloalkylphosphino group, alkenylphosphino group, arylphosphino group and aralkylphosphino group.

The unsubstituted alkylphosphino group may be either linear or branched, and typically contains 1 to 20 carbon atoms, preferably 1 to 15 carbon atoms, and more preferably 1 to 10 carbon atoms. Examples of the alkylphosphino group include a methylphosphino group, ethylphosphino group, propylphosphino group, isopropylphosphino group, butylphosphino group, isobutylphosphino group, s-butylphosphino group, t-butylphosphino group, pentylphosphino group, hexylphosphino group, heptylphosphino group, octylphosphino group, 2-ethylhexylphosphino group, nonylphosphino group, decylphosphino group, 3,7-dimethyloctylphosphino group, dodecylphosphino group and trifluoromethylphosphino group.

The unsubstituted cycloalkylphosphino group typically contains 3 to 50 carbon atoms, and examples thereof include a cyclopropylphosphino group, cyclobutylphosphino group, cyclopentylphosphino group, cyclohexylphosphino group, cyclononylphosphino group and cyclododecylphosphino group.

The unsubstituted bicycloalkylphosphino group typically contains 4 to 50 carbon atoms, and examples thereof include a norbornylphosphino group and adamantylphosphino group.

The unsubstituted alkenylphosphino group typically contains 2 to 50 carbon atoms, and examples thereof include an ethenylphosphino group, propenylphosphino group, 3-butenylphosphino group, 2-butenylphosphino group, 2-pentenylphosphino group, 2-hexenylphosphino group, 2-nonenylphosphino group and 2-dodecenylphosphino group.

The unsubstituted arylphosphino group typically contains 6 to 50 carbon atoms, and examples thereof include a phenylphosphino group, 1-naphthylphosphino group, 2-naphthylphosphino group, 2-methylphenylphosphino group, 3-methylphenylphosphino group, 4-methylphenylphosphino group, 4-ethylphenylphosphino group, 4-propylphenylphosphino group, 4-isopropylphenylphosphino group, 4-butylphenylphosphino group, 4-t-butylphenylphosphino group, 4-hexylphenylphosphino group, 4-cyclohexylphenylphosphino group, 4-adamantylphenylphosphino group and 4-phenylphenylphosphino group.

The unsubstituted aralkylphosphino group typically contains 7 to 50 carbon atoms, and examples thereof include a phenylmethylphosphino group, 1-phenylethylphosphino group, 2-phenylethylphosphino group, 1-phenyl-1-propylphosphino group, 1-phenyl-2-propylphosphino group, 2-phenyl-2-propylphosphino group, 3-phenyl-1-propylphosphino group, 4-phenyl-1-butylphosphino group, 5-phenyl-1-pentylphosphino group and 6-phenyl-1-hexylphosphino group.

A "dihydrocarbylphosphino group" refers to an unsubstituted dihydrocarbylphosphino group or a substituted dihydrocarbylphosphino group in which at least one of the two hydrocarbon portions is mono-substituted with, e.g., a halogen atom or a mercapto group or the like.

Examples of the unsubstituted dihydrocarbylphosphino group include phosphino groups in which the two hydrogen atoms of a phosphino group are substituted with identical or different monovalent hydrocarbon groups of 1 to 20 carbon atoms, including an unsubstituted dimethylphosphino group, diethylphosphino group, methylethylphosphino group, dipropylphosphino group, methylpropylphosphino group, diisopropylphosphino group, dibutylphosphino group, methylbutylphosphino group, diisobutylphosphino group, di-s-butylphosphino group, di-t-butylphosphino group, dipentylphosphino group, dihexylphosphino group, ethylhexylphosphino group, diheptylphosphino group, dioctylphosphino group, dinonylphosphino group, didecylphosphino group, diphenylphosphino group, methylphenylphosphino group, ethylphenylphosphino group, di-4-methylphenylphosphino group, di-2,3-xylylphosphino group and phenyltoluoylphosphino group.

A "monovalent heterocyclic group" refers to a group of atoms remaining following removal of one hydrogen atom bonded to the heterocyclic ring of a heterocyclic compound. The heterocyclic ring includes a pyridine ring, pyrrolidone ring, 1,2-diazine ring, 1,3-diazine ring, 1,4-diazine ring, 1,3,5-triazine ring, furan ring, pyrrole ring, thiophene ring, pyrazole ring, imidazole ring, oxazole ring, thiazole ring, oxadiazole ring, thiadiazole ring and azadiazole ring, and of these, a pyridine ring, 1,2-diazine ring, 1,3-diazine ring, 1,4-diazine ring, or 1,3,5-triazine ring is preferred, and a pyridine ring or 1,3,5-triazine ring is particularly desirable. The monovalent heterocyclic group may be substituted with a halogen atom or a monovalent hydrocarbon group or the like. Further, the monovalent heterocyclic group is preferably a monovalent aromatic heterocyclic group.

In the "group represented by the formula: —COOM", "group represented by the formula: —PO$_3$M" or "group represented by the formula: —SO$_3$M", M represents a metal cation or an ammonium cation which may have a substituent.

The metal cation is preferably a monovalent, divalent or trivalent ion, and examples include ions of metals such as Li, Na, K, Cs, Be, Mg, Ca, Ba, Ag, Al, Bi, Cu, Fe, Ga, Mn, Pb, Sn, Ti, V, W, Y, Yb, Zn and Zr.

The substituent which the ammonium cation may have includes alkyl groups of 1 to 10 carbon atoms such as a methyl group, ethyl group, propyl group, isopropyl group, n-butyl group, i-butyl group and t-butyl group.

In order to ensure a neutral charge for the entire group represented by the formula: —COOM, —PO$_3$M or —SO$_3$M, the group may also include another metal cation besides M, or an anion.

The anion includes F$^-$, Cl$^-$, Br$^-$, I$^-$, OH$^-$, ClO$^-$, ClO$_2^-$, ClO$_3^-$, ClO$_4^-$, BF$_4^-$, PF6$^-$, as well as an 8-quinolinolate anion, 2-methyl-8-quinolinolate anion and 2-phenyl-8-quinolinolate anion. Among these, an 8-quinolinolate anion or 2-methyl-8-quinolinolate anion is preferred.

In the formula —NR$_3$M', R represents a hydrogen atom or a monovalent hydrocarbon group such as, e.g., an alkyl group, cycloalkyl group, aryl group or aralkyl group.

In the formula —NR$_3$M', M' represents an anion. This anion includes the same anions as those mentioned above.

From the viewpoints of the adsorption properties and the dispersibility within solvents, the monovalent group containing a hetero atom represented by $X^1$ in the formula (I) and $X^2$ in the formula (II) is preferably a group containing at least one hetero atom selected from the group consisting of a sulfur atom, oxygen atom, nitrogen atom, phosphorus atom and halogen atoms.

More preferred examples of this type of monovalent group containing a hetero atom include a mercapto group, mercaptocarbonyl group, mercaptothiocarbonyl group, hydrocarbylthio group, hydrocarbylthiocarbonyl group, hydrocarbyldithio group, hydroxyl group, hydrocarbyloxy group, carboxyl group, hydrocarbylcarbonyl group, cyano group, amino group, pyrrolidonyl group, hydrocarbylamino group, dihydrocarbylamino group, phosphino group, hydrocarbylphosphino group, dihydrocarbylphosphino group, a group represented by a formula: —P(=O)(OH)$_2$, sulfo group, monovalent heterocyclic group, a group represented by a formula: —COOM, a group represented by a formula: —SO$_3$M, a group represented by a formula: —NR$_3$M', a halogen atom, formyl group, hydrocarbyloxycarbonyl group, hydrocarbylcarbonyloxy group, nitro group, a group represented by a formula: —OP(=O)(OH)$_2$, carbamoyl group, monohydrocarbylcarbamoyl group, dihydrocarbylcarbamoyl group, a group represented by a formula: —C(=S)NR$_2$, a group represented by a formula: —B(OH)$_2$, a group represented by a formula: —BR$_2$, a borate ester residue represented by a formula shown below:

[Chemical Formula 6]

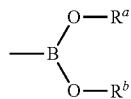

(wherein each of $R^a$ and $R^b$ independently represents a monovalent hydrocarbon group, or $R^a$ and $R^b$ are bonded together to form a divalent hydrocarbon group), a group represented by a formula: —Si(OR)$_3$, a hydrocarbylsulfo group, a group represented by a formula: —S(=O)$_2$R, sulfino group, hydrocarbylsulfino group, a group represented by a formula: —NRC(=O)OR, a group represented by a formula: —NRC(=O)SR, a group represented by a formula: —NRC(=S)OR, a group represented by a formula: —NRC(=S)SR, a group represented by a formula: —OC(=O)NR$_2$, a group represented by a formula: —SC(=O)NR$_2$, a group represented by a formula: —OC(=S)NR$_2$, a group represented by a formula: —SC(=S)NR$_2$, a group represented by a formula: —NRC(=O)NR$_2$, a group represented by a formula: —NRC(=S)NR$_2$, a group represented by a formula: —SM, a group represented by a formula: —C(=O)SM, a group represented by a formula: —CS$_2$M, a group represented by a formula: —OM, a group represented by a formula: —NM$_2$, a group represented by a formula: —NRM, a group represented by a formula: —OP(=O)(OM)$_2$, a group represented by a formula: —P(=O)(OM)$_2$, a group represented by a formula: —C(=O)NM$_2$, a group represented by a formula: —C(=O)NRM, a group represented by a formula: —C(=S)NRM, a group represented by a formula: —C(=S)NM$_2$, a group represented by a formula: —B(OM)$_2$, a group represented by a formula: —BR$_3$M, a group represented by a formula: —B(OR)$_3$M, a group represented by a formula: —S(=O)$_2$M, a group represented by a formula: —S(=O)OM, a group represented by a formula: —NRC(=O)OM, a group represented by a formula: —NRC(=O)SM, a group represented by a formula: —NRC(=S)OM, a group represented by a formula: —NRC(=S)SM, a group represented by a formula: —OC(=O)NM$_2$, a group represented by a formula: —OC(=O)NRM, a group represented by a formula: —OC(=S)NM$_2$, a group represented by a formula: —OC(=S)NRM, a group represented by a formula: —SC(=O)NM$_2$, a group represented by a formula: —SC(=O)NRM, a group represented by a formula: —SC(=S)NM$_2$, a group represented by a formula: —SC(=S)NRM, a group represented by a formula: —NRC(=O)NM$_2$, a group represented by a formula: —NRC(=O)NRM, a group represented by a formula: —NRC(=S)NM$_2$, a group represented by a formula: —NRC(=S)NRM, a group represented by a formula: —PR$_3$M', a group represented by a formula: —OR$_2$M', a group represented by a formula: —SR$_2$M', a group represented by a formula: —IRM', a group of atoms remaining following removal of one hydrogen atom from an aromatic ring within an aromatic hydrocarbon compound represented by a formula (n-1) to (n-13) shown below:

[Chemical Formula 7]

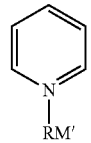 (n-1)

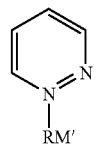 (n-2)

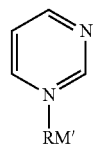 (n-3)

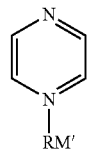 (n-4)

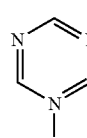 (n-5)

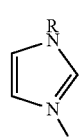 (n-6)

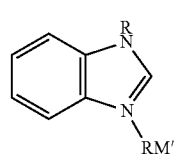 (n-7)

-continued

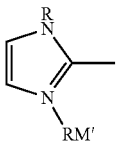
(n-8)

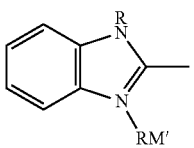
(n-9)

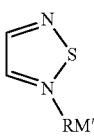
(n-10)

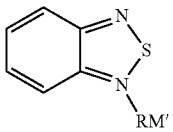
(n-11)

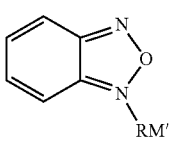
(n-12)

(n-13)

and a monovalent group represented by a formula (p-1) to (p-9) shown below.

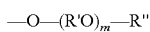
(p-1)

[Chemical Formula 8]

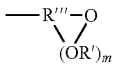
(p-2)

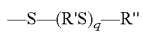 (p-3)

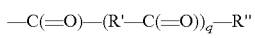 (p-4)

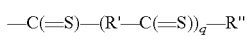 (p-5)

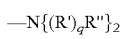 (p-6)

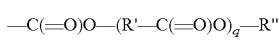 (p-7)

 (p-8)

 (p-9)

(wherein in the above formulas, R represents a hydrogen atom or a substituted or unsubstituted monovalent hydrocarbon group, M represents a metal cation or a substituted or unsubstituted ammonium cation, M' represents an anion, R' represents a substituted or unsubstituted divalent hydrocarbon group or a group represented by a formula: —$R^dO$— (wherein $R^d$ represents an alkylene group of 1 to 50 carbon atoms), R" represents a hydrogen atom, a substituted or unsubstituted monovalent hydrocarbon group, —$CO_2H$, —$SO_3H$, —OH, —SH, —$NR^c_2$, —CN or —C(=O)$NR^c_2$ (wherein $R^c$ represents a substituted or unsubstituted alkyl group of 1 to 30 carbon atoms or a substituted or unsubstituted aryl group of 6 to 50 carbon atoms), R''' represents a substituted or unsubstituted trivalent hydrocarbon group, m represents an integer of 1 or greater, q represents an integer of 0 or greater, and in those cases where there is a plurality of any one or more of R', R" and R''' groups, in each case, the plurality of groups may be the same or different).

The monovalent group containing a hetero atom may exist as a single type of group or a combination of two or more different groups.

Among the monovalent groups containing a hetero atom listed above, a mercapto group, hydrocarbylthio group, hydrocarbyldithio group, hydroxyl group, hydrocarbyloxy group, carboxyl group, hydrocarbylcarbonyl group, cyano group, amino group, hydrocarbylamino group, dihydrocarbylamino group, a group represented by the formula: —P(=O)(OH)$_2$, sulfo group, monovalent heterocyclic group, a group represented by the formula: —COOM, a group represented by the formula: —$SO_3M$, a group represented by the formula: —$NR_3M'$, a halogen atom, formyl group, nitro group, a group represented by the formula: —OP(=O)(OH)$_2$, carbamoyl group, a group represented by the formula (n-1), a group represented by the formula (n-5), a group represented by the formula (p-1) and a group represented by the formula (p-2) are more preferred; a mercapto group, hydroxyl group, carboxyl group, cyano group, amino group, a group represented by the formula: —P(=O)(OH)$_2$, sulfo group, monovalent heterocyclic group, a group represented by the formula: —COOM, a group represented by the formula: —$SO_3M$, a group represented by the formula: —$NR_3M'$, a group represented by the formula (p-1) and a group represented by the formula (p-2) are still more preferred; a mercapto group, hydroxyl group, carboxyl group, cyano group, amino group, pyrrolidonyl group, sulfo group, pyridinyl group, a group represented by the formula: —COOM, a group represented by the formula (p-1) and a group represented by the formula (p-2) are still more preferred; and among these, a hydroxyl group, carboxyl group, amino group, pyrrolidonyl group, pyridinyl group, a group represented by the formula: —COOM, a group represented by the formula (p-1) and a group represented by the formula (p-2) are particularly preferred; and a pyrrolidonyl group, a group represented by the formula: —COOM, a group represented by the formula (p-1) and a group represented by the formula (p-2) are the most desirable.

A portion of the above-mentioned monovalent groups containing a hetero atom are as described and exemplified above for the substituent that the groups $Ar^1$ and $Ar^2$ may have. The remaining monovalent groups containing a hetero atom are described below, and these groups have the meanings described below throughout this description.

A "hydrocarbyloxycarbonyl group" refers to an unsubstituted hydrocarbyloxycarbonyl group or a substituted hydrocarbyloxycarbonyl group that is substituted with, e.g., a halogen atom or a mercapto group or the like.

The unsubstituted hydrocarbyloxycarbonyl group includes an unsubstituted alkoxycarbonyl group, cycloalkoxycarbonyl group, bicycloalkoxycarbonyl group, alkenyloxycarbonyl group, aryloxycarbonyl group and aralkyloxycarbonyl group.

The unsubstituted alkoxycarbonyl group may be either linear or branched, and typically contains 1 to 20 carbon atoms, preferably 1 to 15 carbon atoms, and more preferably 1 to 10 carbon atoms. Examples of the unsubstituted alkyloxycarbonyl group include a methoxycarbonyl group, ethoxycarbonyl group, propoxycarbonyl group, isopropoxycarbonyl group, butoxycarbonyl group, isobutoxycarbonyl group, s-butoxycarbonyl group, t-butoxycarbonyl group, pentyloxycarbonyl group, hexyloxycarbonyl group, heptyloxycarbonyl group, octyloxycarbonyl group, 2-ethylhexyloxycarbonyl group, nonyloxycarbonyl group, decyloxycarbonyl group, 3,7-dimethyloctyloxycarbonyl group, dodecyloxycarbonyl group and trifluoromethoxycarbonyl group.

The unsubstituted cycloalkoxycarbonyl group typically contains 4 to 50 carbon atoms, and examples thereof include a cyclopropoxycarbonyl group, cyclobutoxycarbonyl group, cyclopentyloxycarbonyl group, cyclohexyloxycarbonyl group, cyclononyloxycarbonyl group and cyclododecyloxycarbonyl group.

The unsubstituted bicycloalkoxycarbonyl group typically contains 5 to 50 carbon atoms, and examples thereof include a norbornyloxycarbonyl group and adamantyloxycarbonyl group.

The unsubstituted alkenyloxycarbonyl group typically contains 2 to 50 carbon atoms, and examples thereof include an ethenyloxycarbonyl group, propenyloxycarbonyl group, 3-butenyloxycarbonyl group, 2-butenyloxycarbonyl group, 2-pentenyloxycarbonyl group, 2-hexenyloxycarbonyl group, 2-nonenyloxycarbonyl group and 2-dodecenyloxycarbonyl group.

The unsubstituted aryloxycarbonyl group typically contains 6 to 50 carbon atoms, and examples thereof include a phenoxycarbonyl group, 1-naphthyloxycarbonyl group, 2-naphthyloxycarbonyl group, 2-methylphenoxycarbonyl group, 3-methylphenoxycarbonyl group, 4-methylphenoxycarbonyl group, 4-ethylphenoxycarbonyl group, 4-propylphenoxycarbonyl group, 4-isopropylphenoxycarbonyl group, 4-butylphenoxycarbonyl group, 4-t-butylphenoxycarbonyl group, 4-hexylphenoxycarbonyl group, 4-cyclohexylphenoxycarbonyl group, 4-adamantylphenoxycarbonyl group and 4-phenylphenoxycarbonyl group.

The unsubstituted aralkyloxycarbonyl group typically contains 7 to 50 carbon atoms, and examples thereof include a phenylmethoxycarbonyl group, 1-phenylethoxycarbonyl group, 2-phenylethoxycarbonyl group, 1-phenyl-1-propoxycarbonyl group, 1-phenyl-2-propoxycarbonyl group, 2-phenyl-2-propoxycarbonyl group, 3-phenyl-1-propoxycarbonyl group, 4-phenyl-1-butoxycarbonyl group, 5-phenyl-1-pentyloxycarbonyl group and 6-phenyl-1-hexyloxycarbonyl group.

A "hydrocarbylcarbonyloxy group" refers to an unsubstituted hydrocarbylcarbonyloxy group or a substituted hydrocarbylcarbonyloxy group that is substituted with, e.g., a halogen atom or a mercapto group or the like.

The unsubstituted hydrocarbylcarbonyloxy group includes an unsubstituted alkylcarbonyloxy group, cycloalkylcarbonyloxy group, bicycloalkylcarbonyloxy group, alkenylcarbonyloxy group, arylcarbonyloxy group and aralkylcarbonyloxy group.

The unsubstituted alkylcarbonyloxy group may be either linear or branched, and typically contains 1 to 20 carbon atoms, preferably 1 to 15 carbon atoms, and more preferably 1 to 10 carbon atoms. Examples of the unsubstituted alkylcarbonyloxy group include a methylcarbonyloxy group, ethylcarbonyloxy group, propylcarbonyloxy group, isopropylcarbonyloxy group, butylcarbonyloxy group, isobutylcarbonyloxy group, s-butylcarbonyloxy group, t-butylcarbonyloxy group, pentylcarbonyloxy group, hexylcarbonyloxy group, heptylcarbonyloxy group, octylcarbonyloxy group, 2-ethylhexylcarbonyloxy group, nonylcarbonyloxy group, decylcarbonyloxy group, 3,7-dimethyloctylcarbonyloxy group, dodecylcarbonyloxy group and trifluoromethylcarbonyloxy group.

The unsubstituted cycloalkylcarbonyloxy group typically contains 4 to 50 carbon atoms, and examples thereof include a cyclopropylcarbonyloxy group, cyclobutylcarbonyloxy group, cyclopentylcarbonyloxy group, cyclohexylcarbonyloxy group, cyclononylcarbonyloxy group and cyclododecylcarbonyloxy group.

The unsubstituted bicycloalkylcarbonyloxy group typically contains 5 to 50 carbon atoms, and examples thereof include a norbornylcarbonyloxy group and adamantylcarbonyloxy group.

The unsubstituted alkenylcarbonyloxy group typically contains 2 to 50 carbon atoms, and examples thereof include an ethenylcarbonyloxy group, propenylcarbonyloxy group, 3-butenylcarbonyloxy group, 2-butenylcarbonyloxy group, 2-pentenylcarbonyloxy group, 2-hexenylcarbonyloxy group, 2-nonenylcarbonyloxy group and 2-dodecenylcarbonyloxy group.

The unsubstituted arylcarbonyloxy group typically contains 6 to 50 carbon atoms, and examples thereof include a phenylcarbonyloxy group, 1-naphthylcarbonyloxy group, 2-naphthylcarbonyloxy group, 2-methylphenylcarbonyloxy group, 3-methylphenylcarbonyloxy group, 4-methylphenylcarbonyloxy group, 4-ethylphenylcarbonyloxy group, 4-propylphenylcarbonyloxy group, 4-isopropylphenylcarbonyloxy group, 4-butylphenylcarbonyloxy group, 4-t-butylphenylcarbonyloxy group, 4-hexylphenylcarbonyloxy group, 4-cyclohexylphenylcarbonyloxy group, 4-adamantylphenylcarbonyloxy group and 4-phenylphenylcarbonyloxy group.

The unsubstituted aralkylcarbonyloxy group typically contains 7 to 50 carbon atoms, and examples thereof include a phenylmethylcarbonyloxy group, 1-phenylethylcarbonyloxy group, 2-phenylethylcarbonyloxy group, 1-phenylpropylcarbonyloxy group, 2-phenyl-1-methylethylpropylcarbonyloxy group, 1-phenyl-1-methylethylcarbonyloxy group, 3-phenylpropylcarbonyloxy group, 4-phenylbutylcarbonyloxy group, 5-phenylpentylcarbonyloxy group and 6-phenylhexylcarbonyloxy group.

A "hydrocarbylcarbamoyl group" refers to an unsubstituted hydrocarbylcarbamoyl group (namely, a monohydrocarbylcarbamoyl group) or a substituted hydrocarbylcarbamoyl group in which the hydrocarbon group portion is substituted with, e.g., a halogen atom or a mercapto group or the like.

Examples of the unsubstituted hydrocarbylcarbamoyl group include an unsubstituted alkylcarbamoyl group, cycloalkylcarbamoyl group, bicycloalkylcarbamoyl group, alkenylcarbamoyl group, arylcarbamoyl group and aralkylcarbamoyl group.

The unsubstituted alkylcarbamoyl group may be either linear or branched, and typically contains 1 to 20 carbon atoms, preferably 1 to 15 carbon atoms, and more preferably 1 to 10 carbon atoms. Examples of the unsubstituted alkylcarbamoyl group include an N-methylcarbamoyl group, N-ethylcarbamoyl group, N-propylcarbamoyl group, N-isopropylcarbamoyl group, N-butylcarbamoyl group, N-isobutylcarbamoyl group, N-s-butylcarbamoyl group, N-t-butylcarbamoyl group, N-pentylcarbamoyl group, N-hexylcarbamoyl group, N-heptylcarbamoyl group, N-octylcarbamoyl group, N-2-ethylhexylcarbamoyl group, N-nonylcarbamoyl group, N-decylcarbamoyl group, N-3,7-dimethyloctylcarbamoyl group and N-dodecylcarbamoyl group. An example of the substituted hydrocarbylcarbamoyl group is an N-trifluoromethylcarbamoyl group.

The unsubstituted cycloalkylcarbamoyl group typically contains 4 to 50 carbon atoms, and examples thereof include an N-cyclopropylcarbamoyl group, N-cyclobutylcarbamoyl group, N-cyclopentylcarbamoyl group, N-cyclohexylcarbamoyl group, N-cyclononylcarbamoyl group and N-cyclododecylcarbamoyl group.

The unsubstituted bicycloalkylcarbamoyl group typically contains 5 to 50 carbon atoms, and examples thereof include an N-norbornylcarbamoyl group and N-adamantylcarbamoyl group.

The unsubstituted alkenylcarbamoyl group typically contains 2 to 50 carbon atoms, and examples thereof include an N-ethenylcarbamoyl group, N-propenylcarbamoyl group, N-3-butenylcarbamoyl group, N-2-butenylcarbamoyl group, N-2-pentenylcarbamoyl group, N-2-hexenylcarbamoyl group, N-2-nonenylcarbamoyl group and N-2-dodecenylcarbamoyl group.

The unsubstituted arylcarbamoyl group typically contains 6 to 50 carbon atoms, and examples thereof include an N-phenylcarbamoyl group, N-1-naphthylcarbamoyl group, N-(2-naphthyl)carbamoyl group, N-(2-methylphenyl)carbamoyl group, N-(3-methylphenyl)carbamoyl group, N-(4-methylphenyl)carbamoyl group, N-(4-ethylphenyl)carbamoyl group, N-(4-propylphenyl)carbamoyl group, N-(4-isopropylphenyl)carbamoyl group, N-(4-butylphenyl)carbamoyl group, N-(4-t-butylphenyl)carbamoyl group, N-(4-hexylphenyl)carbamoyl group, N-(4-cyclohexylphenyl)carbamoyl group, N-(4-adamantylphenyl)carbamoyl group and N-(4-phenylphenyl)carbamoyl group.

The unsubstituted aralkylcarbamoyl group typically contains 7 to 50 carbon atoms, and examples thereof include an N-phenylmethylcarbamoyl group, N-(1-phenylethyl)carbamoyl group, N-(2-phenylethyl)carbamoyl group, N-(1-phenylpropyl)carbamoyl group, N-(2-phenyl-1-methylethyl)carbamoyl group, N-(1-phenyl-1-methylethyl)carbamoyl group, N-(3-phenylpropyl)carbamoyl group, N-(4-phenylbutyl)carbamoyl group, N-(5-phenylpentyl)carbamoyl group and N-(6-phenylhexyl)carbamoyl group.

A "dihydrocarbylcarbamoyl group" refers to an unsubstituted dihydrocarbylcarbamoyl group or a substituted dihydrocarbylcarbamoyl group in which the hydrocarbon group portion is substituted with, e.g., a halogen atom or a mercapto group or the like.

Examples of the unsubstituted dihydrocarbylcarbamoyl group include an unsubstituted dialkylcarbamoyl group, dicycloalkylcarbamoyl group, bis-bicycloalkylcarbamoyl group, dialkenylcarbamoyl group, diarylcarbamoyl group, diaralkylcarbamoyl group and N-alkyl-N-arylcarbamoyl group.

The unsubstituted dialkylcarbamoyl group may be either linear or branched, and typically contains 1 to 20 carbon atoms, preferably 1 to 15 carbon atoms, and more preferably 1 to 10 carbon atoms. Examples of the unsubstituted dialkylcarbamoyl group include an N,N-dimethylcarbamoyl group, N,N-diethylcarbamoyl group, N,N-dipropylcarbamoyl group, N,N-diisopropylcarbamoyl group, N,N-dibutylcarbamoyl group, N,N-diisobutylcarbamoyl group, N,N-di-s-butylcarbamoyl group, N,N-di-t-butylcarbamoyl group, N,N-dipentylcarbamoyl group, N,N-dihexylcarbamoyl group, N,N-diheptylcarbamoyl group, N,N-dioctylcarbamoyl group, N,N-di(2-ethylhexyl)carbamoyl group, N,N-dinonylcarbamoyl group, N,N-didecylcarbamoyl group, N,N-di-3,7-dimethyloctylcarbamoyl group, N,N-didodecylcarbamoyl group, N-ethyl-N-methylcarbamoyl group and N-ethyl-N-propylcarbamoyl group. An example of the substituted dihydrocarbylcarbamoyl group is an N,N-bis(trifluoromethyl)carbamoyl group.

The unsubstituted dicycloalkylcarbamoyl group typically contains 7 to 50 carbon atoms, and examples thereof include an N,N-dicyclopropylcarbamoyl group, N,N-dicyclobutylcarbamoyl group, N,N-dicyclopentylcarbamoyl group, N,N-dicyclohexylcarbamoyl group, N,N-dicyclononylcarbamoyl group and N,N-dicyclododecylcarbamoyl group.

The unsubstituted bis-bicycloalkylcarbamoyl group typically contains 9 to 50 carbon atoms, and examples thereof include an N,N-dinorbornylcarbamoyl group and N,N-diadamantylcarbamoyl group.

The unsubstituted dialkenylcarbamoyl group typically contains 2 to 50 carbon atoms, and examples thereof include an N,N-diethenylcarbamoyl group; N,N-dipropenylcarbamoyl group, N,N-di(3-butenyl)carbamoyl group, N,N-di(2-butenyl)carbamoyl group, N,N-di(2-pentenyl)carbamoyl group, N,N-di(2-hexenyl)carbamoyl group, N,N-di(2-nonenyl)carbamoyl group and N,N-di(2-dodecenyl)carbamoyl group.

The unsubstituted diarylcarbamoyl group typically contains 6 to 50 carbon atoms, and examples thereof include an N,N-diphenylcarbamoyl group, N,N-di(1-naphthyl)carbamoyl group, N,N-di(2-naphthyl)carbamoyl group, N,N-di(2-methylphenyl)carbamoyl group, N,N-di(3-methylphenyl)carbamoyl group, N,N-di(4-methylphenyl)carbamoyl group, N,N-di(4-ethylphenyl)carbamoyl group, N,N-di(4-propylphenyl)carbamoyl group, N,N-di(4-isopropylphenyl)carbamoyl group, N,N-di(4-butylphenyl)carbamoyl group, N,N-di(4-t-butylphenyl)carbamoyl group, N,N-di(4-hexylphenyl)carbamoyl group, N,N-di(4-cyclohexylphenyl)carbamoyl group, N,N-di(4-adamantylphenyl)carbamoyl group and N,N-di(4-phenylphenyl)carbamoyl group.

The unsubstituted diaralkylcarbamoyl group typically contains 7 to 50 carbon atoms, and examples thereof include an N,N-di(phenylmethyl)carbamoyl group, N,N-di(1-phenylethyl)carbamoyl group, N,N-di(2-phenylethyl)carbamoyl group, N,N-di(1-phenylpropyl)carbamoyl group, N,N-di(2-phenyl-1-methylethyl)carbamoyl group, N,N-di(1-phenyl-1-methylethyl)carbamoyl group, N,N-di(3-phenylpropyl)carbamoyl group, N,N-di(4-phenylbutyl)carbamoyl group, N,N-di(5-phenylpentyl)carbamoyl group, N,N-di(6-phenylhexyl)carbamoyl group and N-phenylethyl-N-phenylmethylcarbamoyl group.

The unsubstituted N-alkyl-N-arylcarbamoyl group typically contains 7 to 50 carbon atoms, and examples thereof include an N-methyl-N-phenylcarbamoyl group, N-ethyl-N-phenylcarbamoyl group, N-propyl-N-phenylcarbamoyl group, N-isopropyl-N-phenylcarbamoyl group, N-butyl-N-phenylcarbamoyl group, N-methyl-N-naphthylcarbamoyl group and N-methyl-N-(2-methylphenyl)carbamoyl group.

In the groups —C(=S)NR$_2$ and —BR$_2$, R represents a hydrogen atom or a monovalent hydrocarbon group such as an alkyl group, cycloalkyl group, aryl group or aralkyl group.

A "borate ester residue" is represented by a formula shown below:

[Chemical Formula 9]

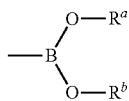

(wherein each of $R^a$ and $R^b$ independently represents a monovalent hydrocarbon group, or $R^a$ and $R^b$ may be bonded together to form a divalent hydrocarbon group; the monovalent hydrocarbon group includes an alkyl group of 1 to 10 carbon atoms or an aryl group of 1 to 10 carbon atoms, whereas the divalent hydrocarbon group includes an alkylene group of 2 to 10 carbon atoms or a phenylene group).

The borate ester residue is preferably a group represented by a formula shown below.

[Chemical Formula 10]

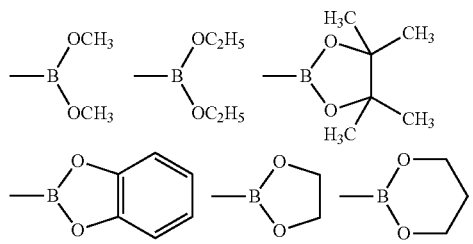

In the group represented by the formula: —Si(OR)$_3$, R represents a hydrogen atom or a monovalent hydrocarbon group such as an alkyl group, cycloalkyl group, aryl group or aralkyl group.

A "hydrocarbylsulfo group" refers to an unsubstituted hydrocarbylsulfo group or a substituted hydrocarbylsulfo group that is substituted with, e.g., a halogen atom or a mercapto group or the like.

Examples of the unsubstituted hydrocarbylsulfo group include an unsubstituted alkylsulfo group, cycloalkylsulfo group, bicycloalkylsulfo group, alkenylsulfo group, arylsulfo group and aralkylsulfo group.

The unsubstituted alkylsulfo group may be either linear or branched, and typically contains 1 to 20 carbon atoms, preferably 1 to 15 carbon atoms, and more preferably 1 to 10 carbon atoms. Examples of the alkylsulfo group include a methylsulfo group, ethylsulfo group, propylsulfo group, isopropylsulfo group, butylsulfo group, isobutylsulfo group, s-butylsulfo group, t-butylsulfo group, pentylsulfo group, hexylsulfo group, heptylsulfo group, octylsulfo group, 2-ethylhexylsulfo group, nonylsulfo group, decylsulfo group, 3,7-dimethyloctylsulfo group and dodecylsulfo group. An example of the substituted hydrocarbylsulfo group is a trifluoromethylsulfo group.

The unsubstituted cycloalkylsulfo group typically contains 3 to 50 carbon atoms, and examples thereof include a cyclopropylsulfo group, cyclobutylsulfo group, cyclopentylsulfo group, cyclohexylsulfo group, cyclononylsulfo group and cyclododecylsulfo group.

The unsubstituted bicycloalkylsulfo group typically contains 4 to 50 carbon atoms, and examples thereof include a norbornylsulfo group and adamantylsulfo group.

The unsubstituted alkenylsulfo group typically contains 2 to 50 carbon atoms, and examples thereof include an ethenylsulfo group, propenylsulfo group, 3-butenylsulfo group, 2-butenylsulfo group, 2-pentenylsulfo group, 2-hexenylsulfo group, 2-nonenylsulfo group and 2-dodecenylsulfo group.

The unsubstituted arylsulfo group typically contains 6 to 50 carbon atoms, and examples thereof include a phenylsulfo group, 1-naphthylsulfo group, 2-naphthylsulfo group, 2-methylphenylsulfo group, 3-methylphenylsulfo group, 4-methylphenylsulfo group, 4-ethylphenylsulfo group, 4-propylphenylsulfo group, 4-isopropylphenylsulfo group, 4-butylphenylsulfo group, 4-t-butylphenylsulfo group, 4-hexylphenylsulfo group, 4-cyclohexylphenylsulfo group, 4-adamantylphenylsulfo group and 4-phenylphenylsulfo group.

The unsubstituted aralkylsulfo group typically contains 7 to 50 carbon atoms, and examples thereof include a phenylmethylsulfo group, 1-phenylethylsulfo group, 2-phenylethylsulfo group, 1-phenylpropylsulfo group, 2-phenyl-1-methylethylsulfo group, 1-phenyl-1-methylethylsulfo group, 3-phenylpropylsulfo group, 4-phenylbutylsulfo group, 5-phenylpentylsulfo group and 6-phenylhexylsulfo group.

In the group —S(=O)R, R represents a hydrogen atom or a monovalent hydrocarbon group such as an alkyl group, cycloalkyl group, aryl group or aralkyl group.

A "hydrocarbylsulfino group" refers to an unsubstituted hydrocarbylsulfino group or a substituted hydrocarbylsulfino group that is substituted with, e.g., a halogen atom or a mercapto group or the like.

Examples of the unsubstituted hydrocarbylsulfino group include an unsubstituted alkylsulfino group, cycloalkylsulfino group, bicycloalkylsulfino group, alkenylsulfino group, arylsulfino group and aralkylsulfino group.

The unsubstituted alkylsulfino group may be either linear or branched, and typically contains 1 to 20 carbon atoms, preferably 1 to 15 carbon atoms, and more preferably 1 to 10 carbon atoms. Examples of the alkylsulfino group include a methylsulfino group, ethylsulfino group, propylsulfino group, isopropylsulfino group, butylsulfino group, isobutylsulfino group, s-butylsulfino group, t-butylsulfino group, pentylsulfino group, hexylsulfino group, heptylsulfino group, octylsulfino group, 2-ethylhexylsulfino group, nonylsulfino group, decylsulfino group, 3,7-dimethyloctylsulfino group, dodecylsulfino group and trifluoromethylsulfino group.

The unsubstituted cycloalkylsulfino group typically contains 3 to 50 carbon atoms, and examples thereof include a cyclopropylsulfino group, cyclobutylsulfino group, cyclopentylsulfino group, cyclohexylsulfino group, cyclononylsulfino group and cyclododecylsulfino group.

The unsubstituted bicycloalkylsulfino group typically contains 4 to 50 carbon atoms, and examples thereof include a norbornylsulfino group and adamantylsulfino group.

The unsubstituted alkenylsulfino group typically contains 2 to 50 carbon atoms, and examples thereof include an ethenylsulfino group, propenylsulfino group, 3-butenylsulfino group, 2-butenylsulfino group, 2-pentenylsulfino group, 2-hexenylsulfino group, 2-nonenylsulfino group and 2-dodecenylsulfino group.

The unsubstituted arylsulfino group typically contains 6 to 50 carbon atoms, and examples thereof include a phenylsulfino group, 1-naphthylsulfino group, 2-naphthylsulfino group, 2-methylphenylsulfino group, 3-methylphenylsulfino group, 4-methylphenylsulfino group, 4-ethylphenylsulfino group, 4-propylphenylsulfino group, 4-isopropylphenylsulfino group, 4-butylphenylsulfino group, 4-t-butylphenylsulfino group, 4-hexylphenylsulfino group, 4-cyclohexylphenylsulfino group, 4-adamantylphenylsulfino group and 4-phenylphenylsulfino group.

The unsubstituted aralkylsulfino group typically contains 7 to 50 carbon atoms, and examples thereof include a phenylmethylsulfino group, 1-phenylethylsulfino group, 2-phenylethylsulfino group, 1-phenylpropylsulfino group, 2-phenyl-1-methylethylsulfino group, 1-phenyl-1-methylethylsulfino group, 3-phenylpropylsulfino group, 4-phenylbutylsulfino group, 5-phenylpentylsulfino group and 6-phenylhexylsulfino group.

In the above group represented by the formula: —NRC (=O)OR, the group represented by the formula: —NRC (=O)SR, the group represented by the formula: —NRC (=S)OR, the group represented by the formula: —NRC(=S)SR, the group represented by the formula: —OC(=O)NR$_2$, the group represented by the formula: —SC(=O)NR$_2$, the group represented by the formula: —OC(=S)NR$_2$, the group represented by the formula: —SC(=S)NR$_2$, the group represented by the formula: —NRC(=O)NR$_2$, the group represented by the formula: —NRC(=S)NR$_2$, the group represented by the formula: —SM, the group represented by the formula: —C(=O)SM, the group represented by the formula: —CS$_2$M, the group represented by the formula: —OM, the group represented by the formula: —NM$_2$, the group represented by the formula: —NRM, the group represented by the formula: —OP(=O)(OM)$_2$, the group represented by the formula: —P(=O)(OM)$_2$, the group represented by the formula: —C(=O)NM$_2$, the group represented by the formula: —C(=O)NRM, the group represented by the formula: —C(=S)NRM, the group represented by the formula: —C(=S)NM$_2$, the group represented by the formula: —B(OM)$_2$, the group represented by the formula: —BR$_3$M, the group represented by the formula: —B(OR)$_3$M, the group represented by the formula: —SO$_2$M, the group represented by the formula: —NRC(=O)OM, the group represented by the formula: —NRC(=O)SM, the group represented by the formula: —NRC(=S)OM, the group represented by the formula: —NRC(=S)SM, the group represented by the formula: —OC(=O)NM$_2$, the group represented by the formula: —OC(=O)NRM, the group represented by the formula: —OC(=S)NM$_2$, the group represented by the formula: —OC(=S)NRM, the group represented by the formula: —SC(=O)NM$_2$, the group represented by the formula: —SC(=O)NRM, the group represented by the formula: —SC(=S)NM$_2$, the group represented by the formula: —SC(=S)NRM, the group represented by the formula: —NRC(=O)NM$_2$, the group represented by the formula: —NRC(=O)NRM, the group represented by the formula: —NRC(=S)NM$_2$, the group represented by the formula: —NRC(=S)NRM, the group represented by the formula: —PR$_3$M', the group represented by the formula: —OR$_2$M', the group represented by the formula: —SR$_2$M', group represented by the formula: —IRM', and the group of atoms remaining following removal of one hydrogen atom from an aromatic ring within an aromatic hydrocarbon compound represented by a formula (n-1) to (n-13) shown below, R represents a hydrogen atom or a monovalent hydrocarbon group such as an alkyl group, cycloalkyl group, aryl group or aralkyl group, M represents a metal cation or an ammonium cation which may have a substituent, and M' represents an anion. R, M and M' are each the same as defined above.

Within the monovalent group containing a hetero atom, R' represents a substituted or unsubstituted divalent hydrocarbon group or a group represented by the formula: —R$^d$O— (wherein R$^d$ represents an alkylene group of 1 to 50 carbon atoms, and preferably 1 to 10 carbon atoms), R'' represents a hydrogen atom, a substituted or unsubstituted monovalent hydrocarbon group, —CO$_2$H, —SO$_3$H, —OH, —SH, —NR$^c_2$, —CN or —C(=O)NR$^c_2$ (wherein R$^c$ represents a substituted or unsubstituted alkyl group of 1 to 30 carbon atoms or a substituted or unsubstituted aryl group of 6 to 50 carbon atoms), R''' represents a substituted or unsubstituted trivalent hydrocarbon group, m represents an integer of 1 or greater, q represents an integer of 0 or greater, and in those cases where there is a plurality of any one or more of R', R'' and R''' groups, in each case, the plurality of groups may be identical or different.

The divalent alkylene group represented by R' includes divalent saturated hydrocarbon groups of 1 to 50 carbon atoms such as a methylene group, ethylene group, 1,2-propylene group, 1,3-propylene group, 1,2-butylene group, 1,3-butylene group, 1,4-butylene group, 1,5-pentylene group, 1,6-hexylene group, 1,9-nonylene group and 1,12-dodecylene group, alkenylene groups of 2 to 50 carbon atoms such as an ethenylene group, propenylene group, 2-butenylene group, 3-butenylene group, 2-pentenylene group, 2-hexenylene group, 2-nonenylene group and 2-dodecenylene group, divalent cycloalkylene groups of 3 to 50 carbon atoms such as a cyclopropylene group, cyclobutylene group, cyclopentylene group, cyclohexylene group, cyclononylene group and cyclododecylene group, divalent bicycloalkylene groups of 4 to 50 carbon atoms such as a norbornylene group and adamantylene group, and arylene groups of 6 to 50 carbon atoms such as a 1,3-phenylene group, 1,4-phenylene group, 1,4-naphthylene group, 1,5-naphthylene group, 2,6-naphthylene group and biphenyl-4,4'-diyl group. Further, the above-mentioned alkyleneoxy group includes alkyleneoxy groups of 1 to 50 carbon atoms such as a methyleneoxy group, ethyleneoxy group, propyleneoxy group, butyleneoxy group, pentyleneoxy group and hexyleneoxy group.

The monovalent hydrocarbon group represented by R'' is as defined above, and is preferably an alkyl group of 1 to 20 carbon atoms or an aryl group of 6 to 30 carbon atoms. From the viewpoint of the solubility of the conjugated compound in solvents, a methyl group, ethyl group, phenyl group, 1-naphthyl group or 2-naphthyl group is particularly preferred.

The trivalent hydrocarbon group represented by R''' describes a substituted or unsubstituted trivalent hydrocarbon group which typically contains 1 to 50 carbon atoms, and preferably 1 to 30 carbon atoms. Examples include unsubstituted alkanetriyl groups of 1 to 20 carbon atoms such as a methanetriyl group, ethanetriyl group, 1,2,3-propanetriyl group, 1,2,4-butanetriyl group, 1,2,5-pentanetriyl group, 1,3,5-pentanetriyl group, 1,2,6-hexanetriyl group and 1,3,6-hexanetriyl group, substituted alkanetriyl groups in which at least one hydrogen atom within an above alkanetriyl group has been substituted, unsubstituted trivalent aromatic cyclic groups of 6 to 30 carbon atoms such as a 1,2,3-benzenetriyl group, 1,2,4-benzenetriyl group and 1,3,5-benzenetriyl group, and substituted groups in which at least one hydrogen atom within an above trivalent aromatic cyclic group has been substituted. From the viewpoint of the solubility of the conjugated compound in solvents, a methanetriyl group, ethanetriyl group, 1,2,4-benzenetriyl group or 1,3,5-benzenetriyl group is preferred.

m represents an integer of 1 or greater, and is preferably an integer of 1 to 20, more preferably 3 to 20, still more preferably 3 to 15, and most preferably 6 to 10.

q represents an integer of 0 or greater. In the formula (p-3), q is preferably an integer of 0 to 30, more preferably 3 to 20, still more preferably 3 to 10, and most preferably 6 to 10. In the formulas (p-4) to (p-7), q is preferably an integer of 0 to 30, more preferably 0 to 20, still more preferably 0 to 10, and most preferably 0 to 5. In the formula (p-8), q is preferably an integer of 0 to 30, more preferably 0 to 20, still more preferably 3 to 20, and most preferably 3 to 10. In the formula (p-9), q is preferably an integer of 0 to 30, more preferably 0 to 20, still more preferably 0 to 15, and most preferably 0 to 10.

From the viewpoint of the solubility of the conjugated compound in solvents, R$^c$ is preferably a methyl group, ethyl group, phenyl group, 1-naphthyl group or 2-naphthyl group.

In the above formula (I), the group having a valency of (m$^1$+1) represented by R$^1$ includes groups of atoms remaining following removal of m$^1$ hydrogen atoms from either an above-mentioned monovalent hydrocarbon group or an above-mentioned monovalent heterocyclic group, and this group R$^1$ is preferably a group of atoms remaining following removal of $m^1$ hydrogen atoms from an alkyl group, a group of atoms remaining following removal of $m^1$ hydrogen atoms from an aryl group, a group of atoms remaining following removal of $m^1$ hydrogen atoms from a monovalent heterocyclic group, a group of atoms remaining following removal of $m^1$ hydrogen atoms from an alkyl group that has been substituted with a monovalent heterocyclic group, or a group of atoms remaining following removal of $m^1$ hydrogen atoms from an aryl group that has been substituted with a monovalent heterocyclic group, and is more preferably a group of atoms remaining following removal of $m^1$ hydrogen atoms from an alkyl group of 1 to 6 carbon atoms, a group of atoms remaining following removal of $m^1$ hydrogen atoms from a phenyl group, a group of atoms remaining following removal of $m^1$ hydrogen atoms from a triazinyl group, a group of atoms remaining following removal of $m^1$ hydrogen atoms from an alkyl group that has been substituted with a triazinyl group, or a group of atoms remaining following removal of $m^1$ hydrogen atoms from an aryl group that has been substituted with a triazinyl group.

Here, the alkyl group and the aryl group include the substituted or unsubstituted alkyl groups and the substituted or unsubstituted aryl groups listed above in the description of the monovalent hydrocarbon group. The unsubstituted alkyl group includes a methyl group, ethyl group, propyl group, isopropyl group, butyl group, isobutyl group, t-butyl group, pentyl group, hexyl group, nonyl group and dodecyl group, whereas the unsubstituted aryl group includes a phenyl group, 1-naphthyl group, 2-naphthyl group, 1-anthracenyl group, 2-anthracenyl group and 9-anthracenyl group.

The monovalent heterocyclic group is the same as defined above.

Examples of the alkyl group that has been substituted with a monovalent heterocyclic group include groups of 3 to 30 carbon atoms such as a 2-pyridinylmethyl group, 3-pyridinylmethyl group, 4-pyridinylmethyl group, 3-pyridazinylmethyl group, 4-pyridazinylmethyl group, 2-pyrimidinylmethyl group, 4-pyrimidinylmethyl group, 5-pyrimidinylmethyl group, 2-pyrazinylmethyl group, 2-triazinylmethyl group, quinolylmethyl group, quinoxalinylmethyl group, 1,10-phenanthrolinylmethyl group, 2-pyridinylethyl group, 3-pyridinylethyl group, 4-pyridinylethyl group, 3-pyridazinylethyl group, 4-pyridazinylethyl group, 2-pyrimidinylethyl group, 4-pyrimidinylethyl group, 5-pyrimidinylethyl group, 2-pyrazinylethyl group, 2-triazinylethyl group, quinolylethyl group, quinoxalinylethyl group and 1,10-phenanthrolinylethyl group.

The aryl group that has been substituted with a monovalent heterocyclic group includes groups of 9 to 30 carbon atoms such as a 2-pyridinylphenyl group, 3-pyridinylphenyl group, 4-pyridinylphenyl group, 3-pyridazinylphenyl group, 4-pyridazinylphenyl group, 2-pyrimidinylphenyl group, 4-pyrimidinylphenyl group, 5-pyrimidinylphenyl group, 2-pyrazinylphenyl group, 2-triazinylphenyl group, quinolylphenyl group, quinoxalinylphenyl group and 1,10-phenanthrolinylphenyl group.

In the above formula (II), the group having a valency of $(m^2+1)$ represented by $R^2$ includes groups of atoms remaining following removal of $m^2$ hydrogen atoms from either an above-mentioned monovalent hydrocarbon group or an above-mentioned monovalent heterocyclic group, and this group $R^2$ is preferably a group of atoms remaining following removal of $m^2$ hydrogen atoms from an alkyl group, a group of atoms remaining following removal of $m^2$ hydrogen atoms from an aryl group, a group of atoms remaining following removal of $m^2$ hydrogen atoms from a monovalent heterocyclic group, a group of atoms remaining following removal of $m^2$ hydrogen atoms from an alkyl group that has been substituted with a monovalent heterocyclic group, or a group of atoms remaining following removal of $m^2$ hydrogen atoms from an aryl group that has been substituted with a monovalent heterocyclic group, and is more preferably a group of atoms remaining following removal of $m^2$ hydrogen atoms from an alkyl group of 1 to 6 carbon atoms, a group of atoms remaining following removal of $m^2$ hydrogen atoms from a phenyl group, a group of atoms remaining following removal of $m^2$ hydrogen atoms from a triazinyl group, a group of atoms remaining following removal of $m^2$ hydrogen atoms from an alkyl group that has been substituted with a triazinyl group, or a group of atoms remaining following removal of $m^2$ hydrogen atoms from an aryl group that has been substituted with a triazinyl group. The alkyl group, aryl group, monovalent heterocyclic group, alkyl group that has been substituted with a monovalent heterocyclic group, and aryl group that has been substituted with a monovalent heterocyclic group are each the same as defined above.

The conjugated compound used in the present invention include conjugated compounds having a repeating unit represented by a formula (a-1) to (a-35), (b-1) to (b-39), (c-1) to (c-38), (d-1) to (d-48), (e-1) to (e-16), (f-1) to (f-35), or (g-1) to (g-24) shown below. In these formulas, $n^3$ represents an integer of 2 or greater, and is preferably an integer of 2 to 30, more preferably an integer of 2 to 20, and still more preferably an integer of 6 to 10. $n^4$ represents an integer of 1 or greater, and is preferably an integer of 1 to 10, and more preferably an integer of 2 to 6. In these formulas, R is a hydrogen atom or a monovalent hydrocarbon group, as defined above, and is preferably an alkyl group of 1 to 6 carbon atoms, and more preferably a methyl group, ethyl group, propyl group or butyl group.

[Chemical Formula 11]

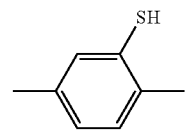

(a-1)

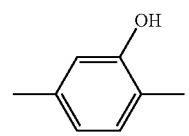

(a-2)

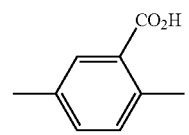

(a-3)

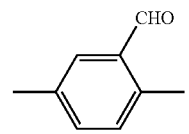

(a-4)

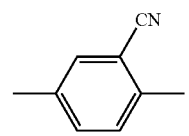

(a-5)

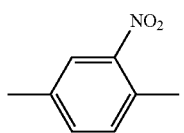 (a-6)
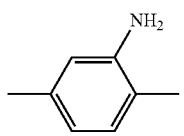 (a-7)
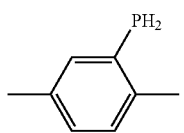 (a-8)
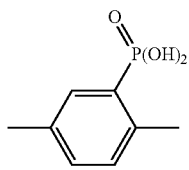 (a-9)
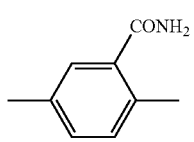 (a-10)
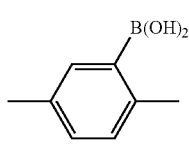 (a-11)
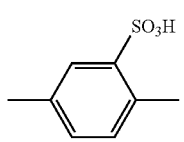 (a-12)
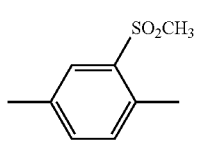 (a-13)
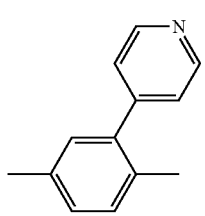 (a-14)
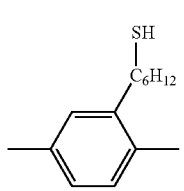 (a-15)

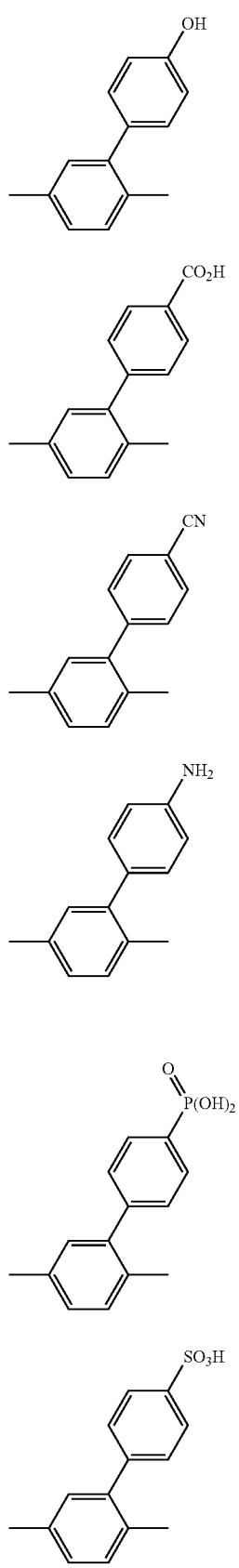
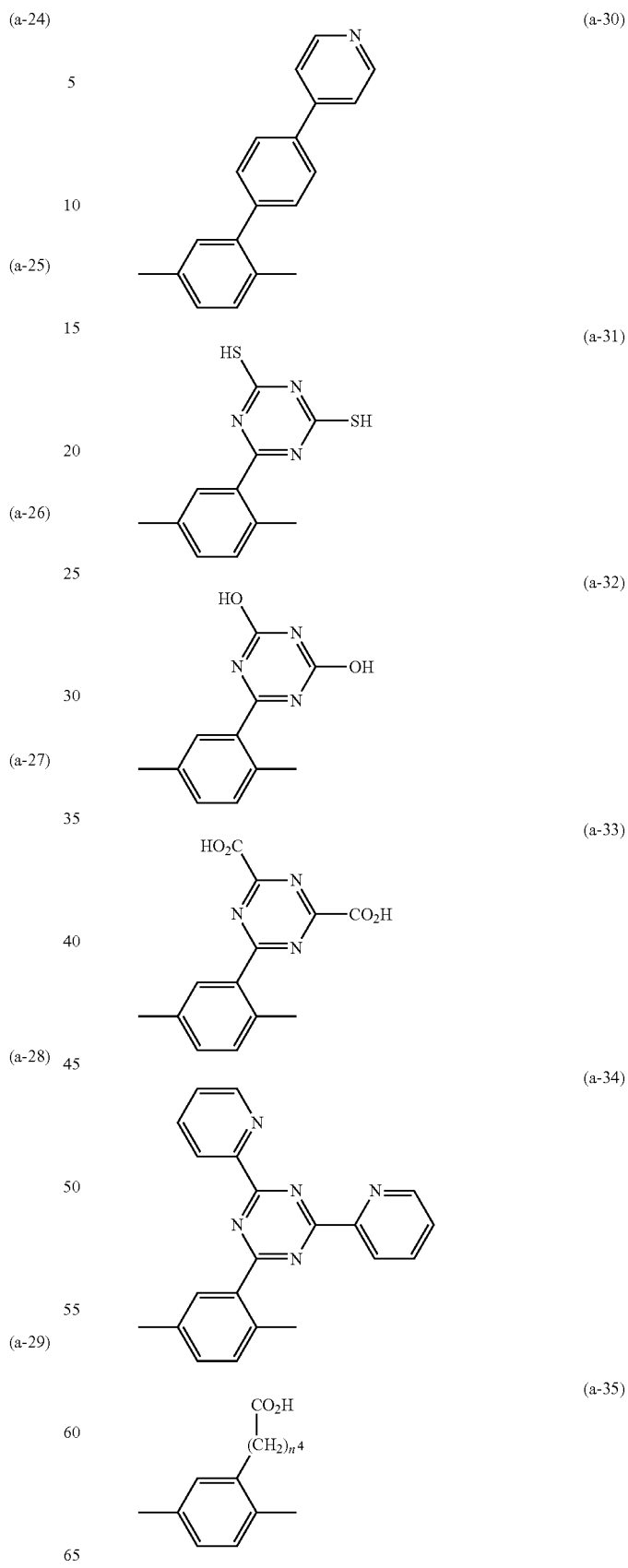

[Chemical Formula 12]
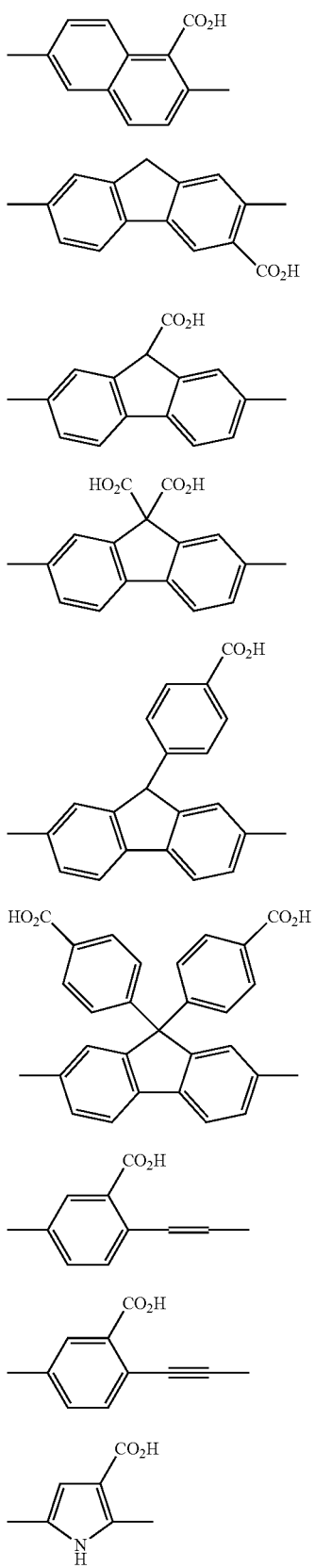
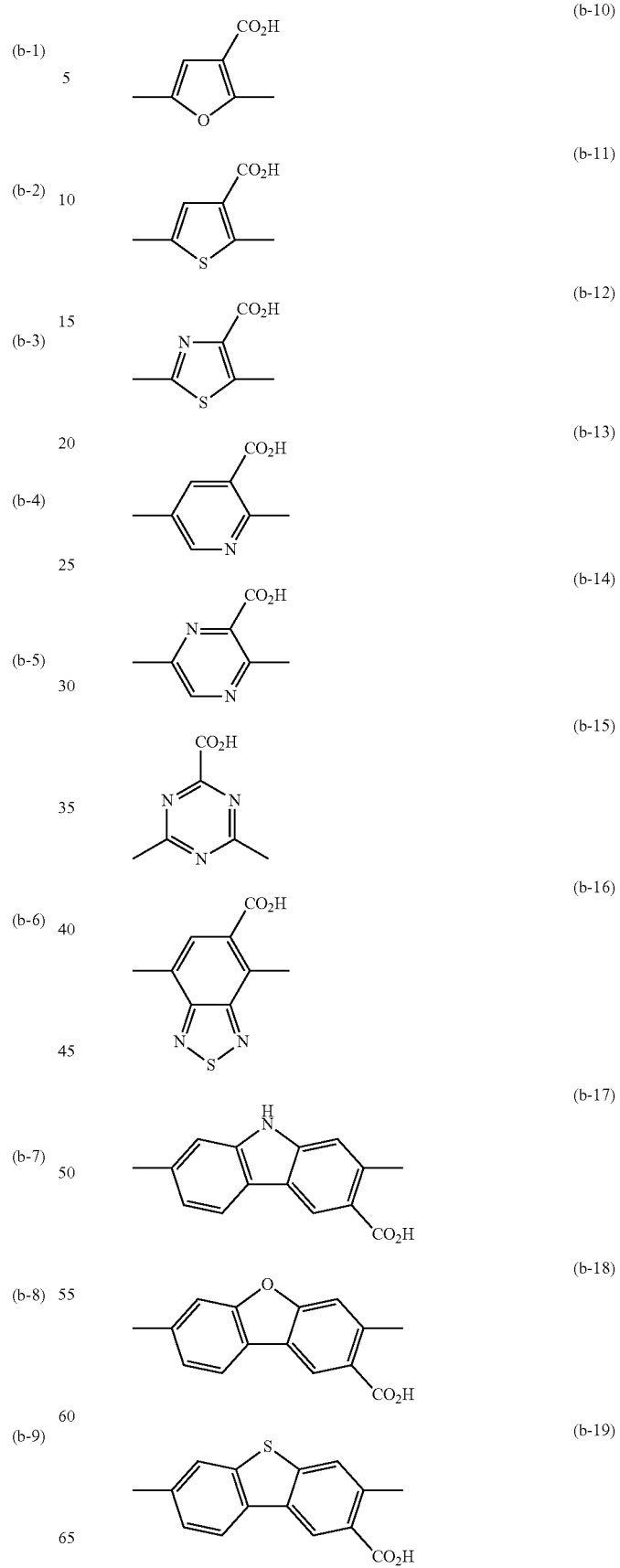

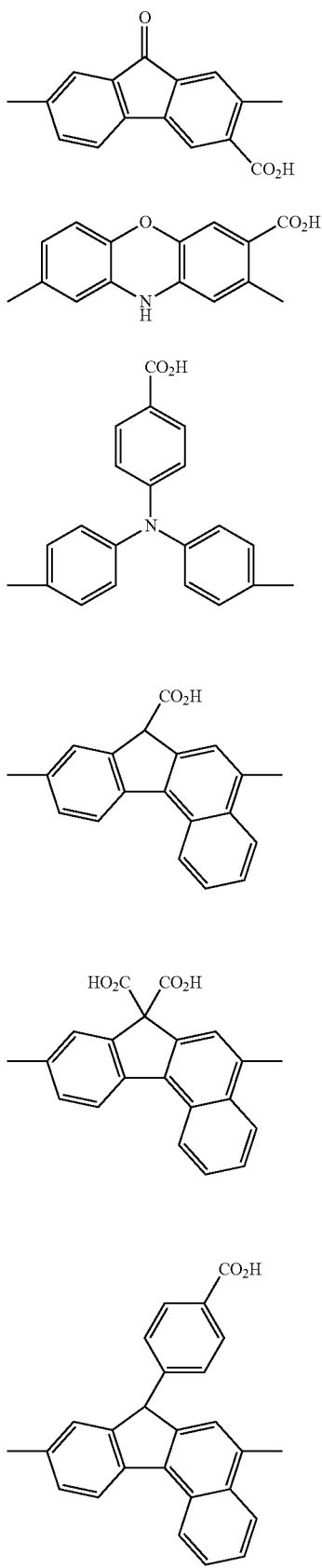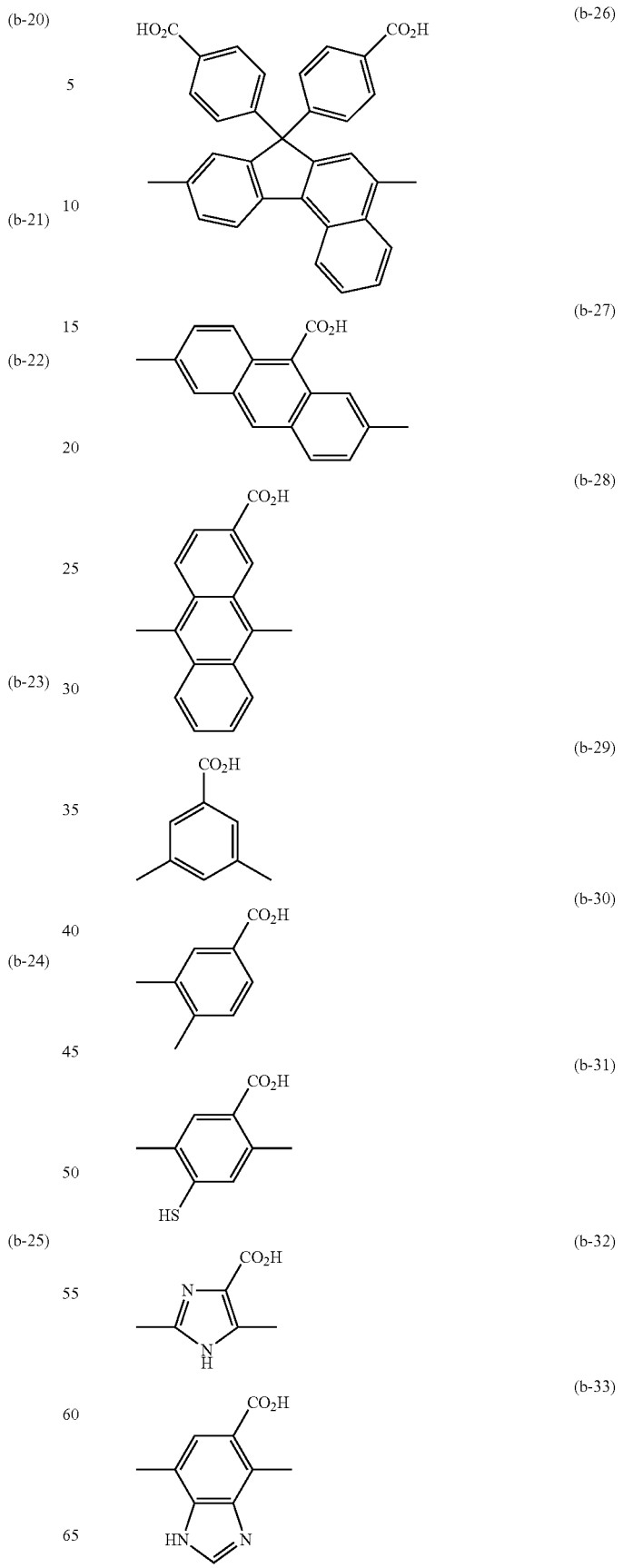

-continued
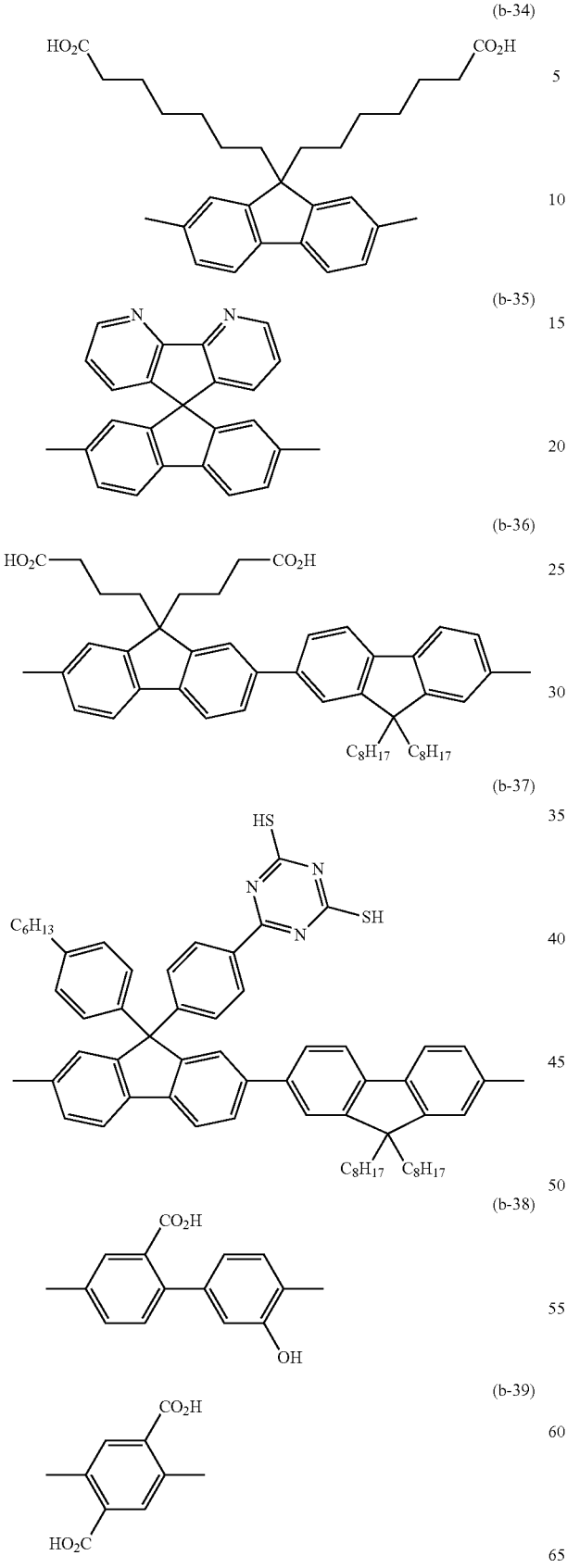
[Chemical Formula 13]
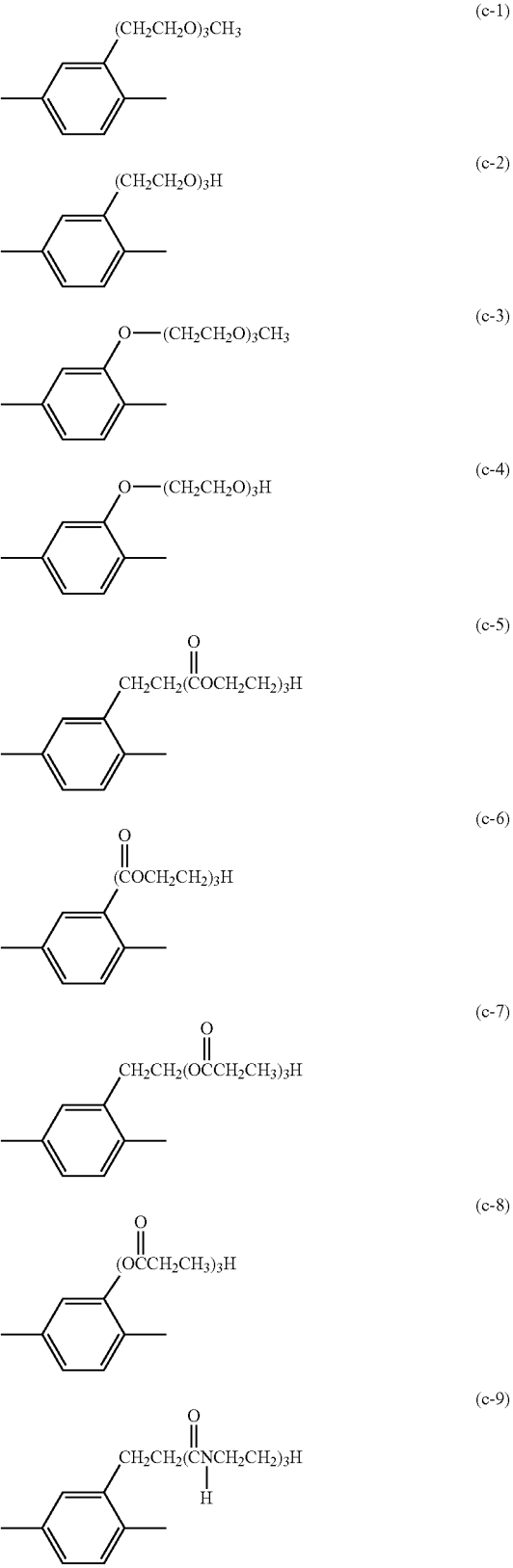

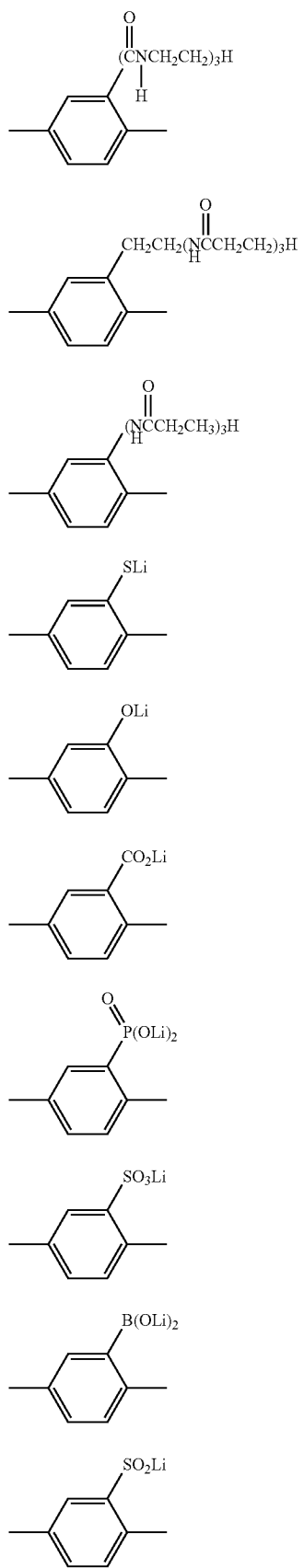
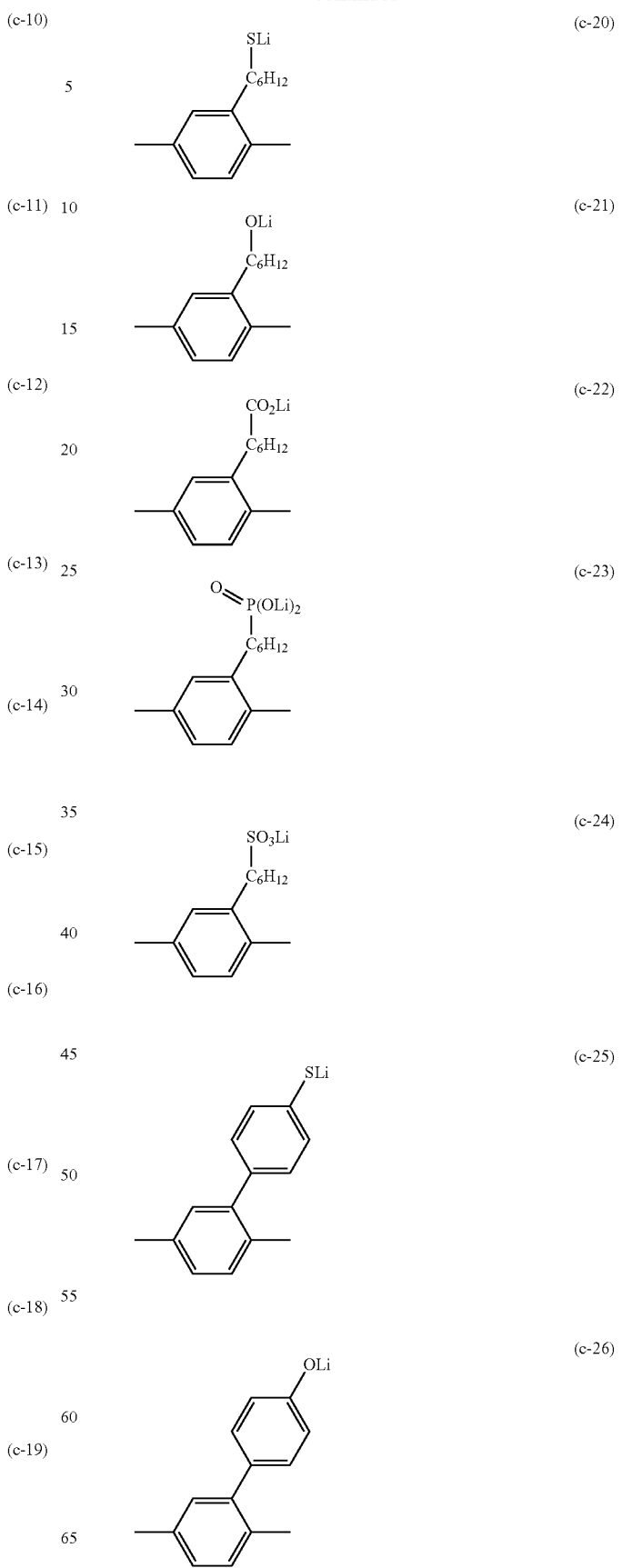

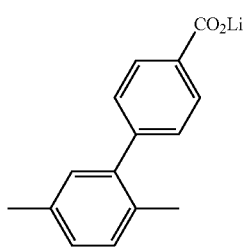
(c-27)
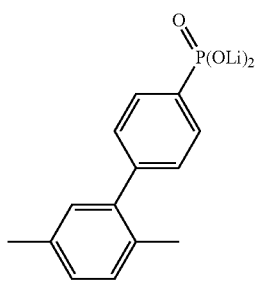
(c-28)
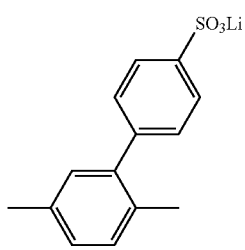
(c-29)
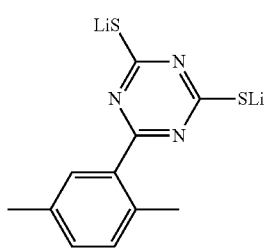
(c-30)
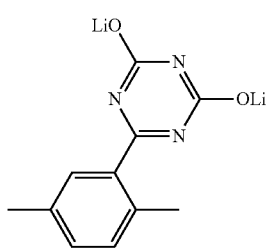
(c-31)
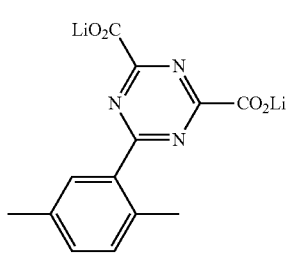
(c-32)
(c-33)
H$_3$C(OH$_2$CH$_2$C)$_3$—O— ... —O—(CH$_2$CH$_2$O)$_3$CH$_3$
H$_3$C(OH$_2$CH$_2$C)$_3$—O— ... —O—(CH$_2$CH$_2$O)$_3$CH$_3$
(c-34) ((CH$_2$)$_{n4}$O)$_{n3}$CH$_3$
(c-35) ((CH$_2$)$_{n4}$O)$_{n3}$H
(c-36) O—((CH$_2$)$_{n4}$O)$_{n3}$CH$_3$
(c-37) O—((CH$_2$)$_{n4}$O)$_{n3}$H
(c-38) CO$_2$Li, (CH$_2$)$_{n4}$
[Chemical Formula 14]
(d-1) CO$_2$Li
(d-2) CO$_2$Li
(d-3) CO$_2$Li
(d-4) LiO$_2$C  CO$_2$Li

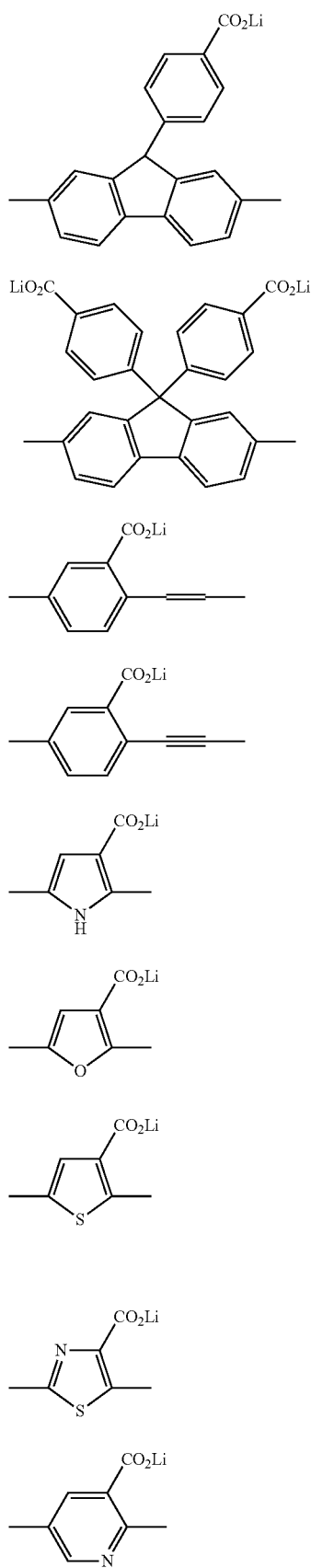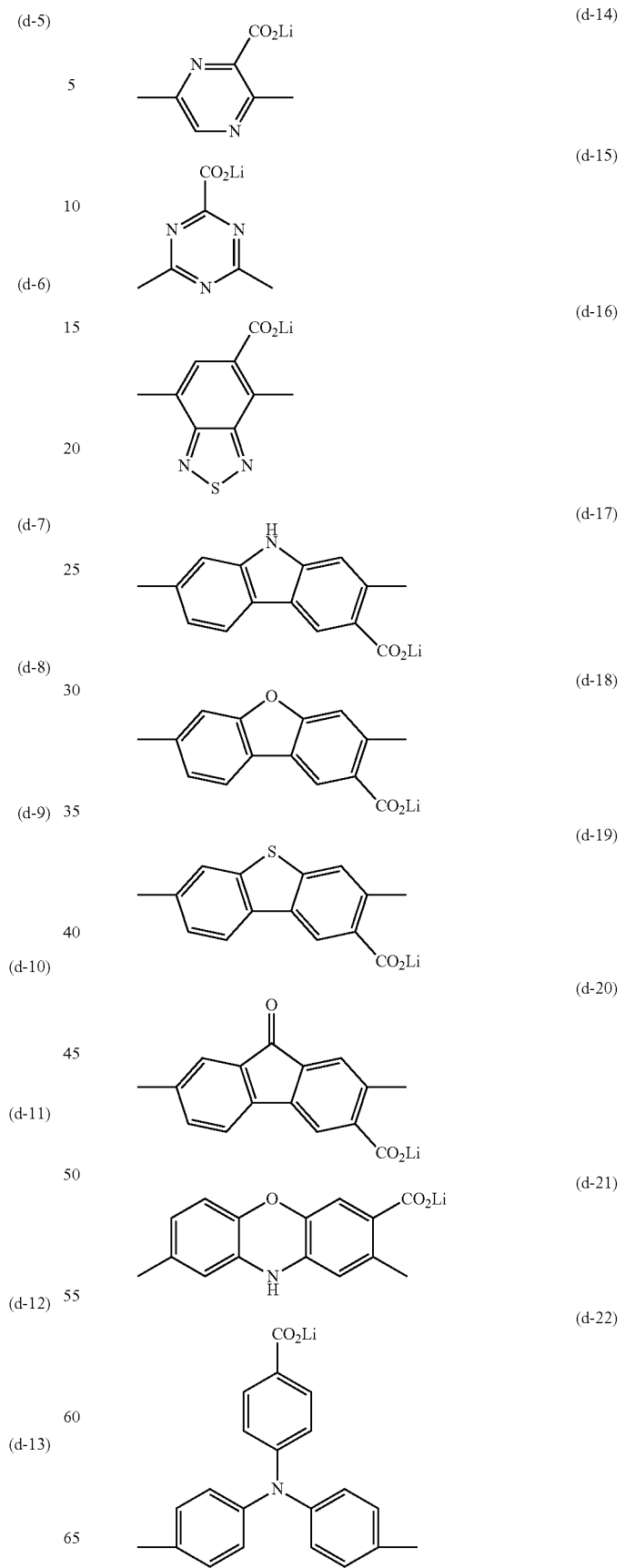

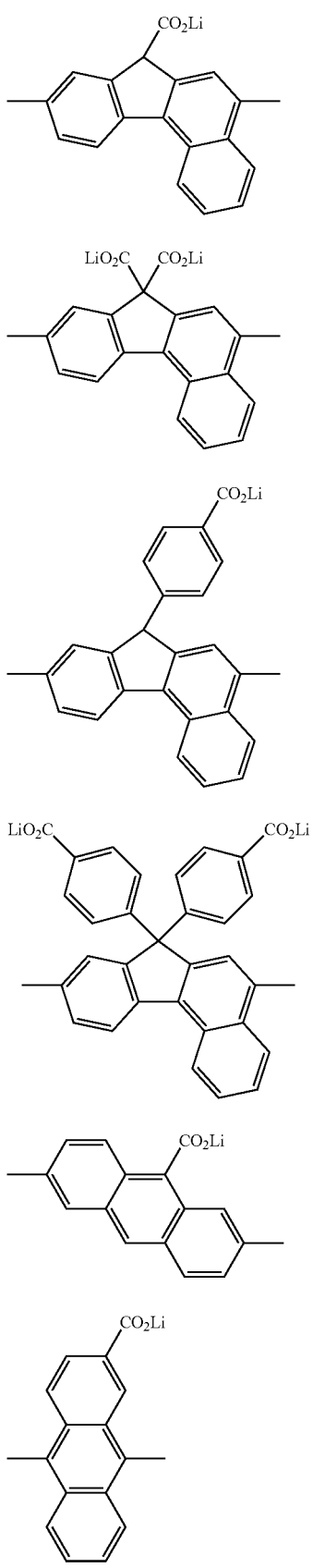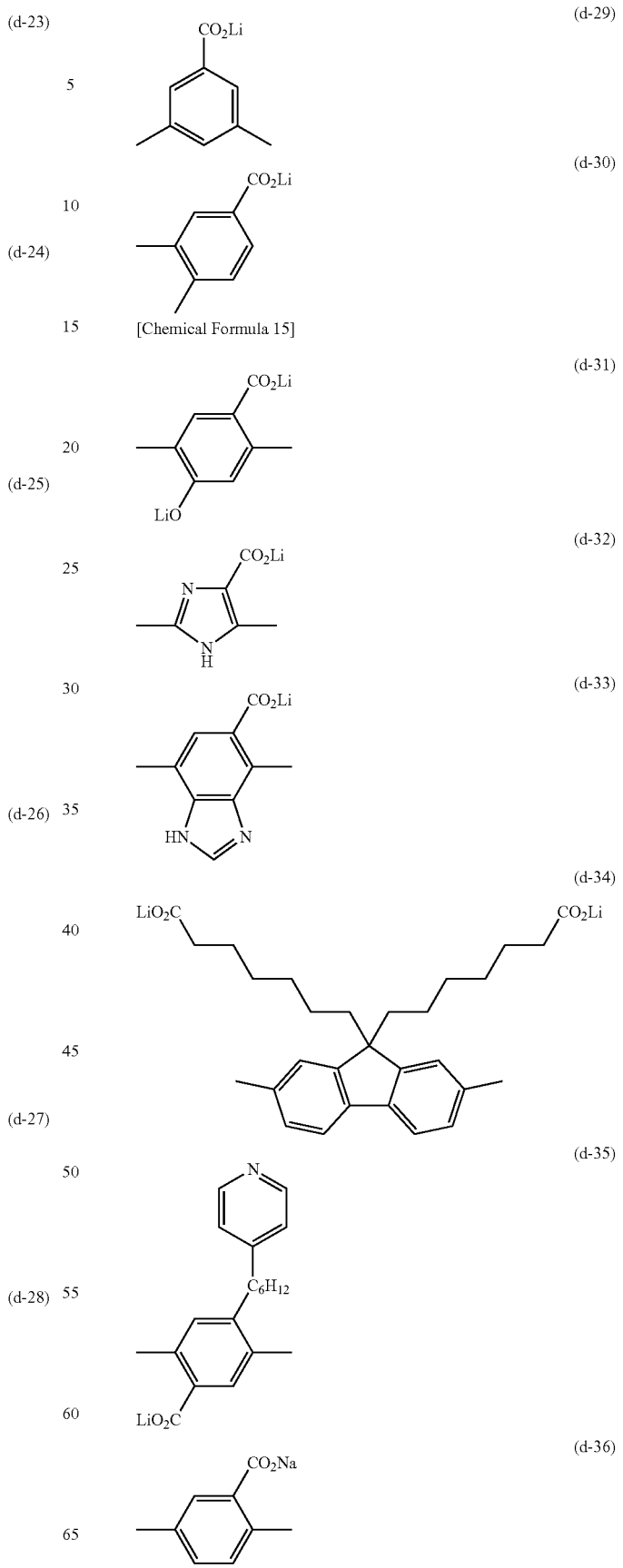
[Chemical Formula 15]

-continued (d-37) Structure: 2,5-dimethylbenzoic acid potassium salt (CO₂K)

(d-38) Structure: 2,5-dimethylbenzoic acid cesium salt (CO₂Cs)

(d-39) Structure: 2,5-dimethylbenzoate tetramethylammonium (CO₂—N(CH₃)₄)

(d-40) Structure: 2,5-dimethylbenzoate magnesium chloride (CO₂Mg(Cl))

(d-41) Structure: 9,9-bis[4-(3-methoxytriethyleneoxy)-3-(cesium carboxylate)phenyl]-2,7-dimethylfluorene (d-42) Structure: spiro-bifluorene derivative with H₃C(OH₂CH₂C)₃O—, —O(CH₂CH₂O)₃CH₃, CsO₂C—, —CO₂Cs substituents and pyridine-fused cyclopentadiene (d-43) Structure: biphenyl with CO₂H and OLi substituents (d-44) Structure: biphenyl with CO₂H and O—(CH₂CH₂O)₃CH₃ substituents (d-45) Structure: pyridyl-terphenyl with —O(CH₂CH₂O)₃CH₃ substituent (d-46) Structure: pyridyl-terphenyl with CO₂Li substituent (d-47) Structure: 2,5-dimethylbenzene-1,4-dicarboxylate dilithium (CO₂Li, LiO₂C)

(d-48) Structure: 1-(4-(diphenylamino)phenyl)pyrrolidin-2-one derivative with triarylamine

[Chemical Formula 16]

(e-1) Structure: 2,5-dimethylphenyl trimethylammonium bromide (N(CH₃)₃Br)

(e-2) Structure: 2,5-dimethylphenyl trimethylphosphonium bromide (P(CH₃)₃Br)

(e-3) Structure: 2,5-dimethylphenyl dimethylsulfonium bromide (S(CH₃)₂Br)

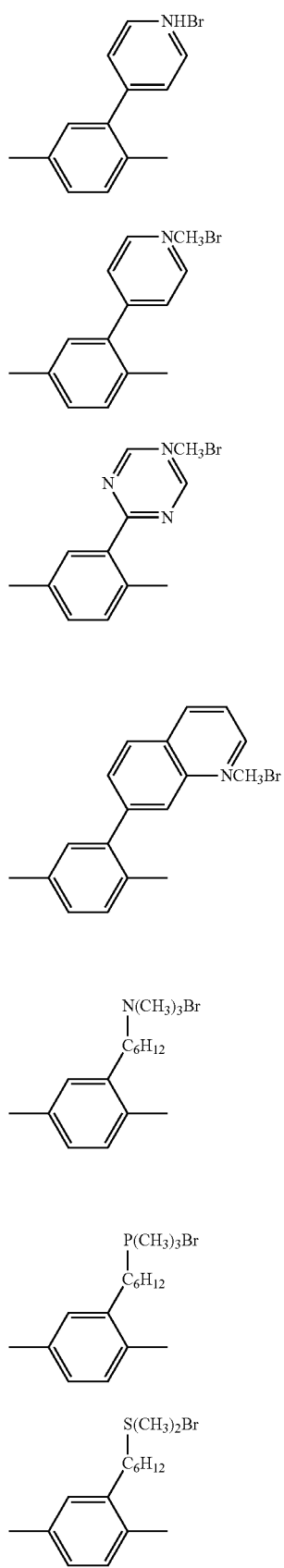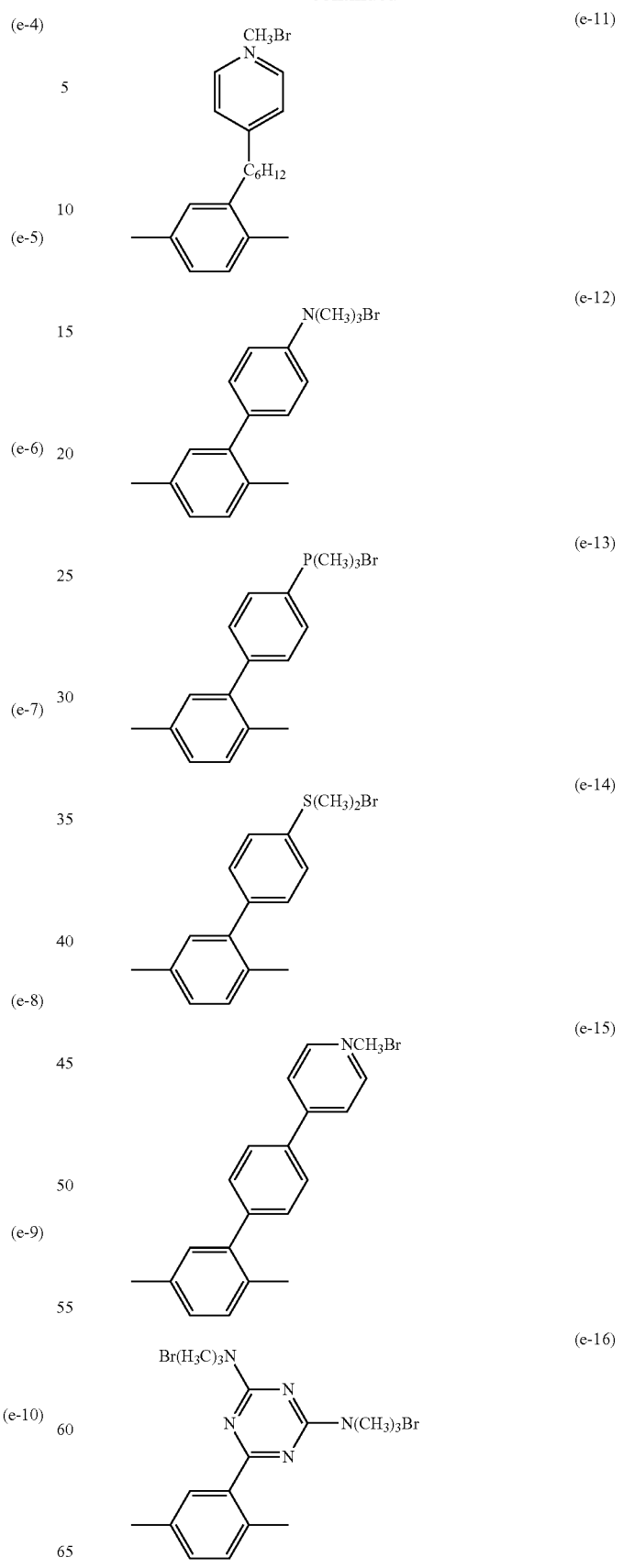

[Chemical Formula 17]
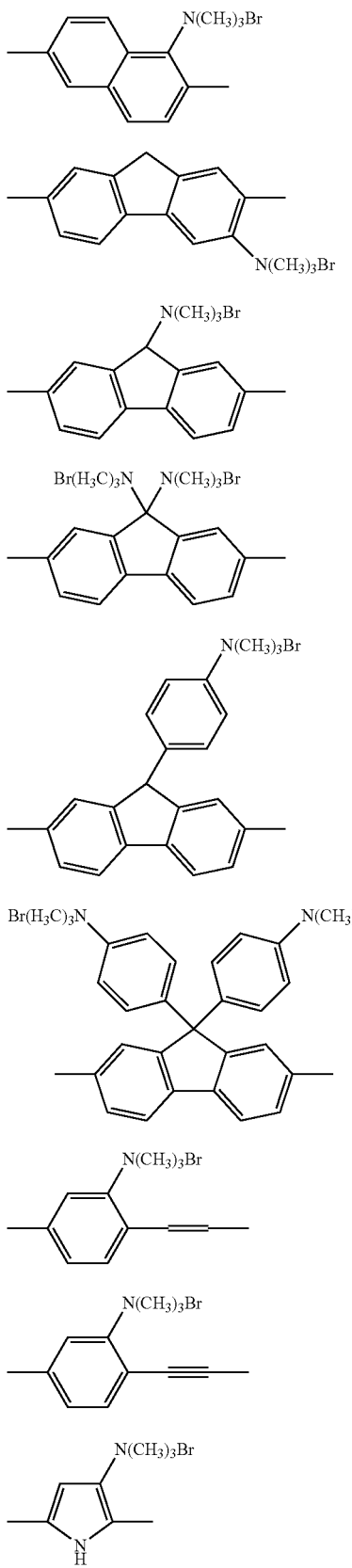
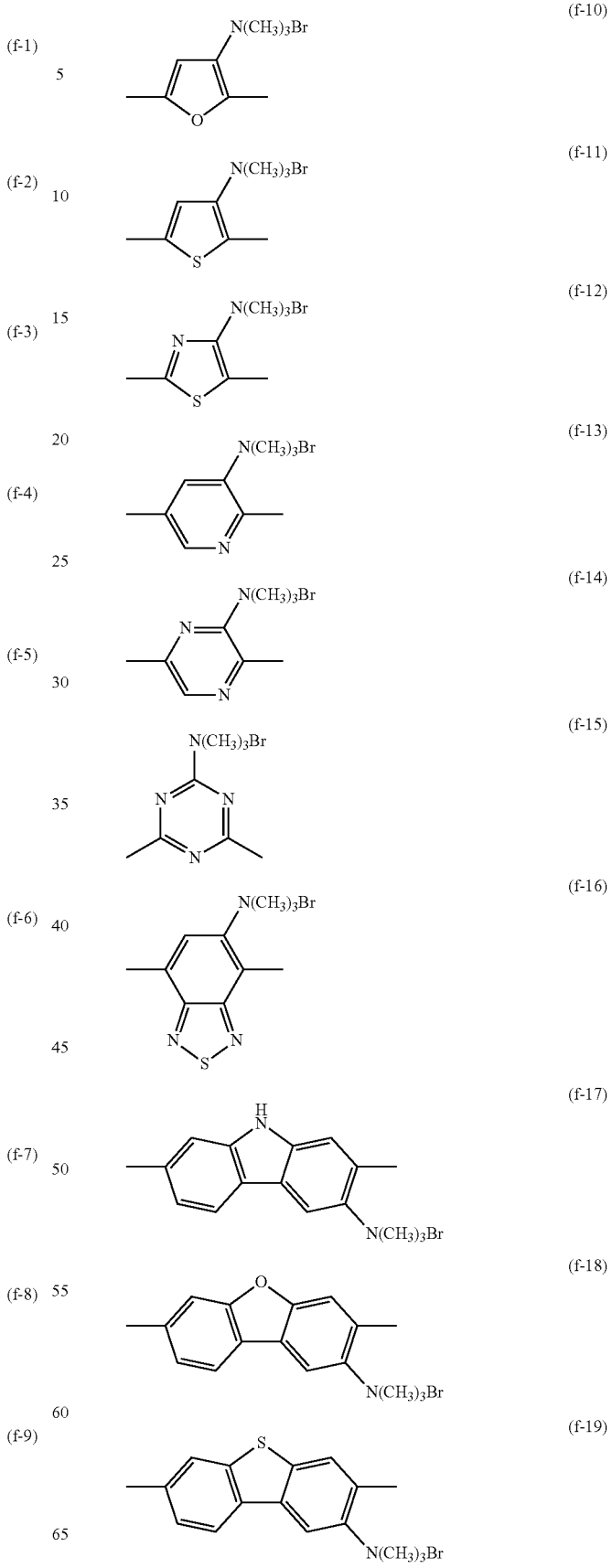

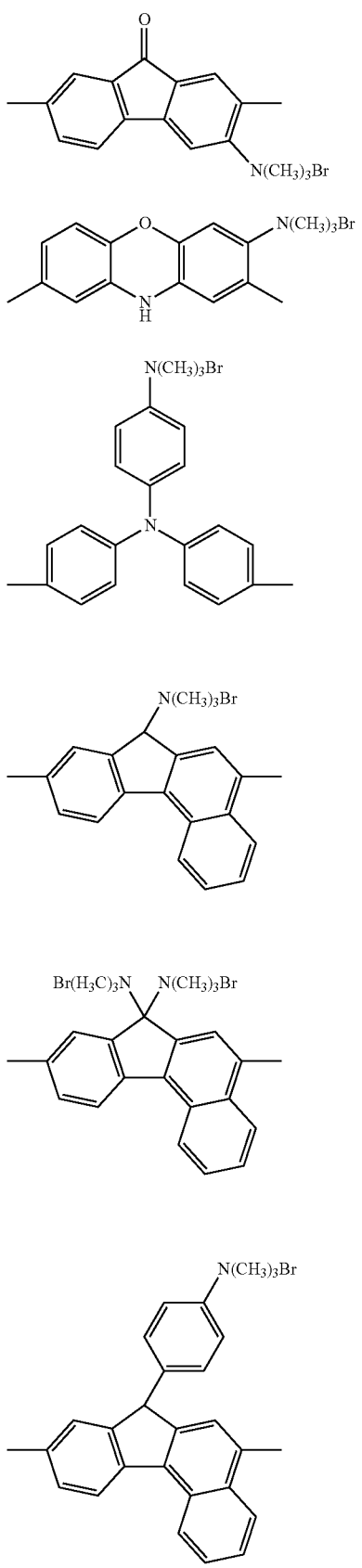
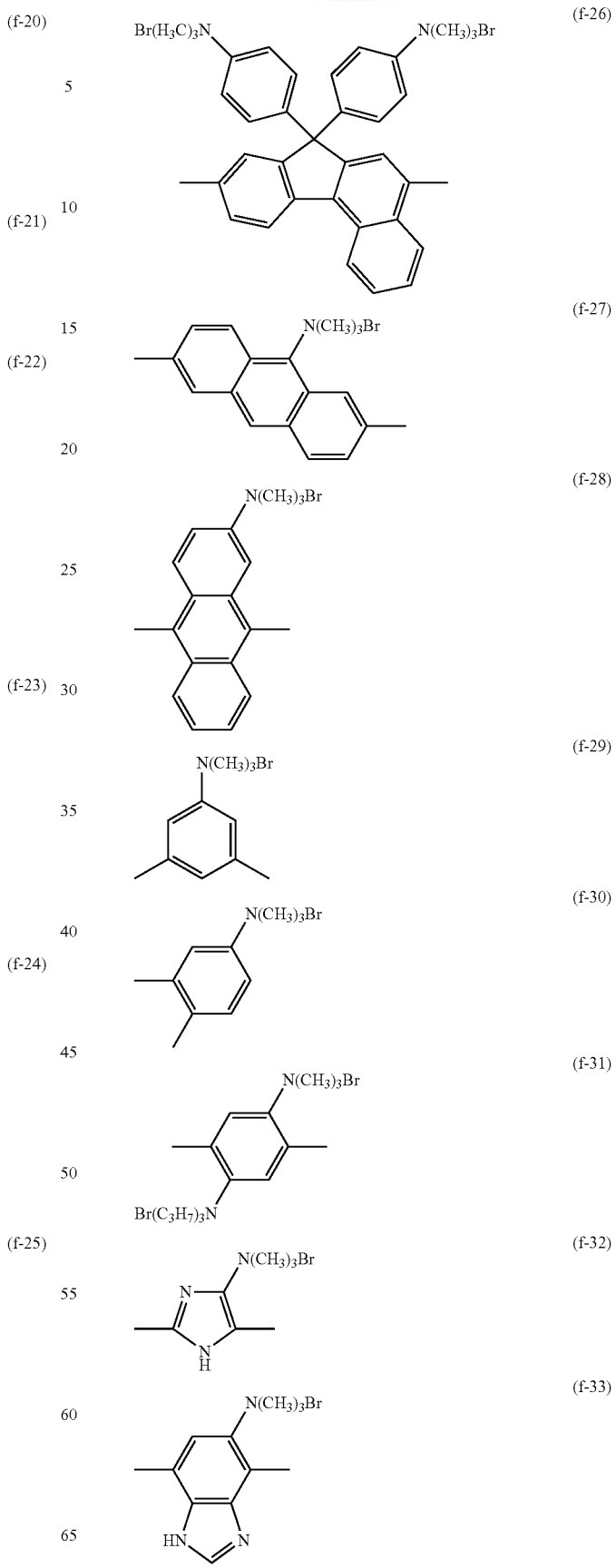

-continued
(f-34)
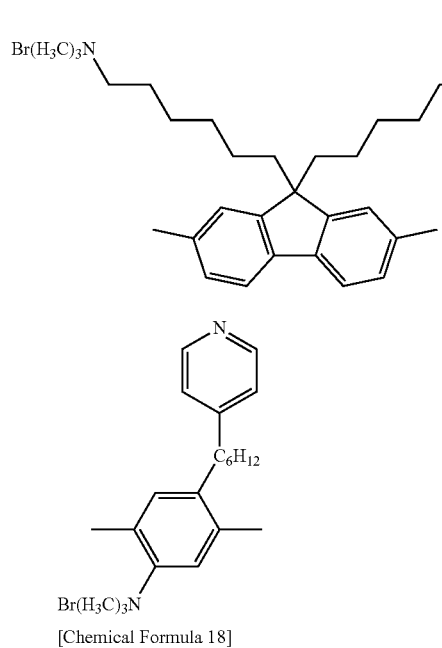
(f-35)
[Chemical Formula 18]
(g-1)
(g-2)
(g-3)
(g-4)
(g-5)
(g-6)
(g-7)
-continued
(g-8)
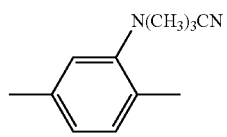
(g-9)
(g-10)
(g-11)
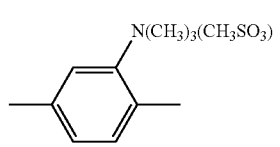
(g-12)
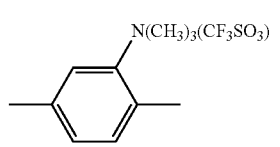
(g-13)
(g-14)
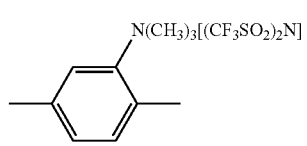
(g-15)
(g-16)
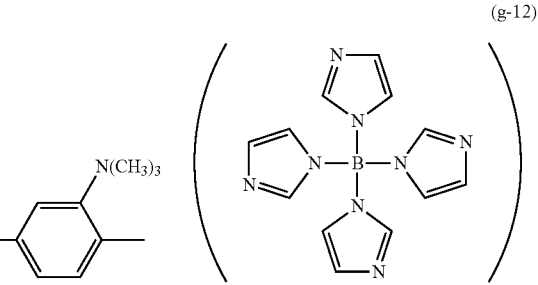

-continued

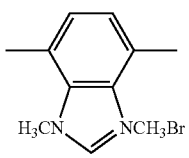 (g-17)

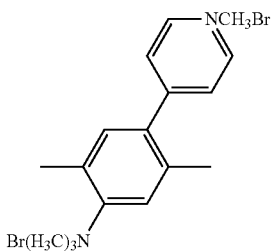 (g-18)

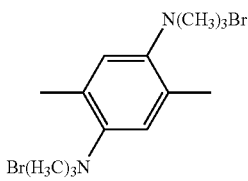 (g-19)

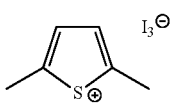 (g-20)

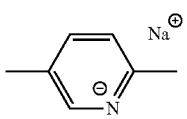 (g-21)

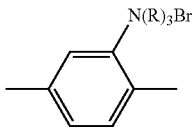 (g-22)

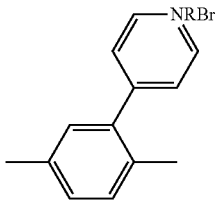 (g-23)

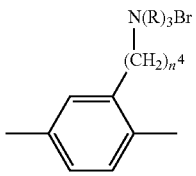 (g-24)

In terms of achieving superior adsorption to the silver particles, superior dispersibility within solvents, and excellent conductivity and charge injection properties, the conjugated compound is preferably a conjugated compound having a repeating unit represented by the formula (a-1) to (a-7), (a-10) to (a-19), (a-21) to (a-27), (a-29) to (a-35), (b-1) to (b-6), (b-9), (b-11) to (b-16), (b-22), (b-31) to (b-39), (c-1) to (c-15), (c-17), (c-20) to (c-22), (c-24) to (c-27), (c-29), (c-30) to (c-38), (d-1) to (d-6), (d-9), (d-11) to (d-16), (d-22), (d-31) to (d-39), (d-41) to (d-48), (e-1) to (e-3), (e-5) to (e-16), (f-1) to (f-6), (f-9), (f-11) to (f-16), (f-22), (f-31) to (f-35), (g-1) to (g-13) or (g-16) to (g-24), is more preferably a conjugated compound having a repeating unit represented by the formula (a-1) to (a-3), (a-5), (a-7), (a-10), (a-12), (a-14) to (a-19), (a-21) to (a-27), (a-29) to (a-33), (b-1) to (b-6), (b-9), (b-11), (b-13), (b-15), (b-16), (b-22), (b-34) to (b-39), (c-1) to (c-15), (c-17), (c-20) to (c-22), (c-24) to (c-27), (c-29) to (c-38), (d-1) to (d-6), (d-9), (d-11), (d-13), (d-15), (d-16), (d-22), (d-31) to (d-39), (d-41), (d-42), (d-47), (d-48), (e-1), (e-5) to (e-8), (e-11), (e-12), (e-15), (e-16), (f-1) to (f-6), (f-9), (f-11), (f-13), (f-15), (f-16), (f-22), (f-31), (f-34), (f-35), (g-1) to (g-3), (g-6) to (g-13) or (g-16) to (g-24), is still more preferably a conjugated compound having a repeating unit represented by the formula (a-1), (a-3), (a-7), (a-10), (a-14), (a-15), (a-17), (a-19), (a-22), (a-23), (a-25) to (a-27), (a-30), (a-31), (b-1), (b-2), (b-5), (b-6), (b-9), (b-11), (b-13), (b-22), (b-34) to (b-39), (c-1) to (c-4), (c-13)(c-15), (c-20) to (c-22), (c-25) to (c-27), (c-30) to (c-33), (d-1), (d-2), (d-5), (d-6), (d-9), (d-11), (d-13), (d-22), (d-31) to (d-38), (d-41), (d-42), (d-47), (d-48), (e-1), (e-5), (e-7), (e-8), (e-11), (e-12), (e-15), (e-16), (f-1), (f-2), (f-5), (f-6), (f-9), (f-11), (f-13), (f-22), (f-31), (f-34), (f-35), (g-1) to (g-3), (g-6), (g-7), (g-9) to (g-13) or (g-18) to (g-21), is still more preferably a conjugated compound having a repeating unit represented by the formula (a-3), (a-14), (a-22), (a-17), (a-25), (a-30), (a-31), (b-6), (b-22), (b-34) to (b-37), (b-39), (c-1) to (c-4), (c-15), (c-22), (c-27), (c-33), (d-6), (d-22), (d-34) to (d-38), (d-41), (d-42), (d-48), (e-1), (e-5), (e-8), (e-12), (e-15), (f-6), (f-34), (g-2), (g-6), (g-7), (g-10) to (g-12), or (g-18) to (g-21), is still more preferably a conjugated compound having a repeating unit represented by the formula (b-6), (b-34), (b-35), (b-37), (c-1) to (c-4), (c-33), (d-6), (d-34), (d-36) to (d-38), (d-41), (d-42), (d-48), (f-6), (f-34), (g-2), or (g-10) to (g-12), is still more preferably a conjugated compound having a repeating unit represented by the formula (b-6), (b-34), (b-37), (c-1) to (c-4), (c-33), (d-38), (d-41), (d-42) or (d-48), and is most preferably a conjugated compound having a repeating unit represented by the formula (c-33), (d-41) or (d-48).

Among the above examples of the repeating unit of the conjugated compound, groups in which one of the two bonds is substituted with a hydrogen atom represent examples of the group represented by the formula (I).

The conjugated compound is a compound having a group represented by the formula (I), a repeating unit represented by the formula (II), or both a group represented by the formula (I) and a repeating unit represented by the formula (II), and may also include another repeating unit besides the repeating unit represented by the formula (II).

This other repeating unit includes groups of atoms following removal of two hydrogen atoms from an aromatic compound represented by one of the above formulas (1) to (57) and (n-1) to (n-13), groups of atoms following removal of one hydrogen atom from an above-mentioned monovalent hydrocarbon group, and groups of atoms following removal of one hydrogen atom from an above-mentioned monovalent heterocyclic group, and of these, a group of atoms following removal of two hydrogen atoms from an above-mentioned aromatic compound (and preferably a compound represented by one of the formulas (1) to (57)) or a group of atoms following removal of one hydrogen atom from an above-mentioned monovalent hydrocarbon group is preferred, a group of atoms following removal of two hydrogen atoms from an above-mentioned aromatic compound (and preferably a compound represented by one of the formulas (1) to (57)) is more preferred, and of these aromatic compounds, the compounds represented by the formulas (1) to (8), (17), (24) to (33), (36) to (51), (55) and (56) are preferred, the compounds represented by the formulas (1) to (8), (17), (30) to (33), (36) to (42), (48) to (51), (55) and (56) are more preferred, the compounds represented by the formulas (1) to (8) are still more preferred, and the compounds represented by the formulas (3) and (8) are particularly desirable. These groups of atoms may be substituted with a halogen atom or the like. The repeating units represented by the formula (II) may be bonded together via a divalent group such as the groups of formulas (h-1) to (h-19) shown below, and of these, the formulas (h-1), (h-3) to (h-6), (h-9) and (h-13) are preferred, and the formulas (h-9) and (h-13) are particularly desirable. In those cases where the conjugated compound includes an above-mentioned repeating unit, these divalent groups are preferably introduced at a level that does not impair the conjugation of the conjugated compound.

[Chemical Formula 19]

 (h-1)

 (h-2)

 (h-3)

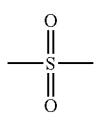 (h-4)

(h-5)

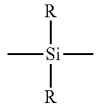 (h-6)

 (h-7)

 (h-8)

 (h-9)

 (h-10)

 (h-11)

 (h-12)

 (h-13)

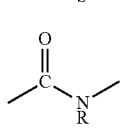

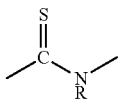 (h-14)

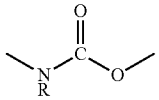 (h-15)

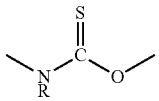 (h-16)

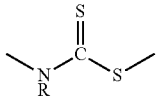 (h-17)

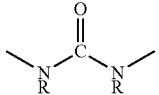 (h-18)

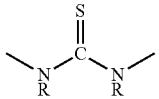 (h-19)

In the above formulas, R is the same as defined above, and represents a hydrogen atom or a substituted or unsubstituted monovalent hydrocarbon group.

For the conjugated compound used in the present invention, compounds of types 1 to 3 described below are preferred. These compounds are insoluble in water under the definition mentioned above.

1. A compound having a group represented by the formula (I), wherein $Ar^1$ is bonded to a hydrogen atom or a halogen atom.

2. A compound having a repeating unit represented by the formula (II).

3. A compound having a group represented by the formula (I) at one terminal or both terminals, and also having a repeating unit represented by the formula (II).

Examples of compounds of the above type 2 include a polymeric compound having a repeating unit represented by a formula shown below:

[Chemical Formula 20]

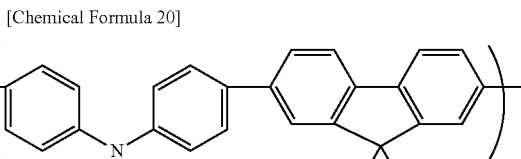

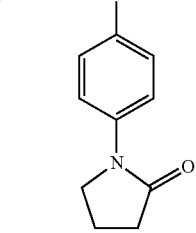

and a polymeric compound having a repeating unit represented by a formula shown below:

[Chemical Formula 21]

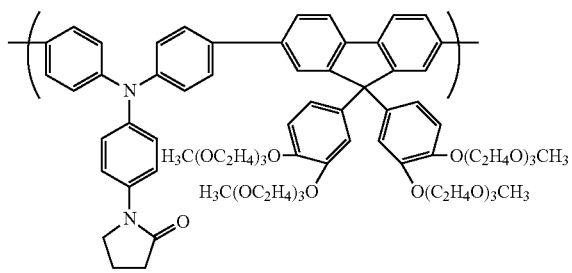

These polymeric compounds are aromatic compounds.

The conjugated compound may be doped with a dopant. The dopant is preferably used in a proportion of 1 to 50 parts by weight per 100 parts by weight of the conjugated compound.

The dopant includes a halogen, halogen compound, Lewis acid, protic acid, nitrile compound, organometallic compound, alkali metal or alkaline earth metal. The halogen includes chlorine, bromine and iodine, whereas the halogen compound includes interhalogen compounds such as iodine chloride, iodine bromide and iodine fluoride. The Lewis acid includes phosphorus pentafluoride, arsenic pentafluoride, antimony pentafluoride, boron trifluoride, boron trichloride, boron tribromide and sulfur trioxide. The protic acid includes inorganic acids such as hydrochloric acid, sulfuric acid, nitric acid, phosphoric acid, fluoroboric acid, hydrofluoric acid and perchloric acid, and organic acids such as carboxylic acids and sulfonic acids. The organic carboxylic acids include acids having aliphatic, aromatic or cyclic carbonyl groups, such as formic acid, acetic acid, oxalic acid, benzoic acid, phthalic acid, maleic acid, fumaric acid, malonic acid, tartaric acid, citric acid, lactic acid, succinic acid, monochloroacetic acid, dichloroacetic acid, trichloroacetic acid, trifluoroacetic acid, nitroacetic acid and triphenylacetic acid. The organic sulfonic acids include aliphatic, aromatic and cyclic hydrocarbons that include a sulfo group, and examples thereof include sulfonic acid compounds having one sulfo group within the molecule, such as benzenesulfonic acid, p-toluenesulfonic acid, xylenesulfonic acid, naphthalenesulfonic acid, decylbenzenesulfonic acid, dodecylbenzenesulfonic acid, pentadecylbenzenesulfonic acid, methanesulfonic acid, ethanesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, vinylsulfonic acid, styrenesulfonic acid and allylsulfonic acid, and sulfonic acid compounds having a plurality of sulfo groups within the molecule, such as ethanedisulfonic acid, butanedisulfonic acid, pentanedisulfonic acid, decanedisulfonic acid, benzenedisulfonic acid, naphthalenedisulfonic acid, toluenedisulfonic acid, dimethylbenzenedisulfonic acid, diethylbenzenedisulfonic acid, methylnaphthalenedisulfonic acid and ethylnaphthalenedisulfonic acid. Further, the organic acid used as the dopant in the present invention may be a polymeric acid. Examples of the polymeric acid include polyvinylsulfonic acid, polystyrenesulfonic acid, sulfonated styrene-butadiene copolymers, polyallylsulfonic acid, polymethallylsulfonic acid, poly-2-acrylamido-2-methylpropanesulfonic acid and polyisoprenesulfonic acid. The nitrile compound includes, compounds having two or more cyano groups on the conjugated bonds.

Such compounds include tetracyanoethylene, tetracyanoethylene oxide, tetracyanobenzene, tetracyanoquinodimethane and tetracyanoazanaphthalene. Examples of the organometallic compounds include tris(4-bromophenyl)ammonium hexachloroantimonate, bis(dithiobenzyl)nickel, bis(tetrabutylammonium)-bis(1,3-dithiol-2-thione-4,5-dithiolato) zinc complex and tetrabutylammonium-bis(1,3-dithiol-2-thione-4,5-dithiolato)nickel(III) complex. The alkali metal includes Li, Na, K, Rb and Cs. The alkaline earth metals include Be, Mg, Ca, Sr and Ba.

Silver-(Conjugated Compound) Composite

In the silver-(conjugated compound) composite of the present invention, the adsorbed conjugated compound can be detected by analyzing the composite by spectroscopic analysis, thermal analysis, mass spectrometry, elemental analysis and/or the like.

In the present invention, the adsorbed conjugated compound can be detected, for example, by spectroscopic analysis such as nuclear magnetic resonance spectroscopy, infrared spectroscopy, Raman spectroscopy, atomic absorption spectroscopy, arc discharge atomic emission spectrometry, spark discharge atomic emission spectrometry, inductively coupled plasma emission spectroscopy, X-ray photoelectron spectroscopy (XPS), fluorescence X-ray spectroscopy, ultraviolet-visible spectroscopy and fluorescence spectroscopy, by thermal analysis such as thermogravimetric analysis, differential thermal analysis and differential scanning calorimetry, by mass spectrometry such as mass spectrometry using various ionization methods, and by elemental analysis.

In the silver-(conjugated compound) composite of the present invention, if the total number of atoms that exist within the composite, determined by X-ray photoelectron spectroscopy, is deemed to be 1, then in terms of effects such as the dispersibility of the conjugated compound adsorbed to the silver particles, the proportion of hetero atoms other than silver atoms is preferably at least 0.01, more preferably at least 0.02, still more preferably at least 0.025, and most preferably 0.03 or greater. The upper limit for this proportion is typically 0.7.

From the viewpoint of enabling the properties of the conjugated compound to be imparted to the silver particles, analysis of the silver-(conjugated compound) composite of the present invention by X-ray photoelectron spectroscopy preferably results in the detection of a peak attributable to the conjugated compound that is not detected in pure metallic silver.

When the silver-(conjugated compound) composite is measured by X-ray photoelectron spectroscopy, the silver-(conjugated compound) composite is first washed at least 5 times with a solvent that is capable of dissolving conjugated compounds that are weakly adsorbed to the surface of the particles and a solvent that is capable of dissolving other compounds adsorbed to the silver particles prior to the measurement. This washing can be performed by bringing the sample of the silver-(conjugated compound) composite into contact with the solvent, for example by adding the composite to the solvent, subsequently performing stirring, shaking or ultrasonic dispersion of the mixture, and then conducting centrifugal separation, supernatant removal, re-dispersion, dialysis, filtration or heating as required.

In the present invention, the term "hetero atom" refers to an element other than a carbon atom or hydrogen atom, but from the viewpoints of ease of synthesis and stability of the resulting silver-(conjugated compound) composite, the hetero atom is preferably at least one atom selected from the group consisting of a nitrogen atom, oxygen atom, sulfur atom and phosphorus atom, and is more preferably a nitrogen atom, oxygen atom or sulfur atom.

From the viewpoints of the stability and the emission properties of the conjugated compound used in the present invention, and therefore the stability and emission properties of the composite, the band gap for the conjugated compound is preferably at least 2.10 eV, more preferably at least 2.20 eV, still more preferably at least 2.40 eV, and most preferably 2.60 eV or greater. Furthermore, the ionization potential of the conjugated compound, determined by measurement in the atmosphere by photoelectron spectroscopy (for example, using a photoelectron spectrometer), is preferably at least 5.20 eV, and more preferably 5.25 eV or greater.

The value for the above-mentioned band gap can be determined from the long wavelength-side absorption limit of an absorption spectrum obtained by ultraviolet-visible-near infrared spectroscopy (namely, using an ultraviolet-visible-near infrared spectrometer).

The silver-(conjugated compound) composite of the present invention is typically in particulate form, and the number-average Feret diameter of the particles is typically not more than 1,100 nm, preferably not more than 700 nm, and more preferably 400 nm or less. Although there are no particular limitations on the lower limit for the particle diameter, the diameter is typically at least 1 nm.

<Production Methods>
Production Method 1:

The silver-(conjugated compound) composite of the present invention can be produced by a method that includes, for example, a step of bringing coated silver particles, which have been prepared in advance by coating silver particles having a number-average Feret diameter of not more than 1,000 nm with an unconjugated compound, and a conjugated compound having a weight-average molecular weight of not less than $3.0 \times 10^2$ into contact within a solvent, e.g., by performing mixing.

Using the above coated silver particles is advantageous in terms of enabling silver particles having a number-average Feret diameter of not more than 1,000 nm to be obtained with relative ease.

In this production method, when coated silver particles that have undergone a coating treatment with an unconjugated compound are used, the resulting silver-(conjugated compound) composite comprises the unconjugated compound in addition to the silver particles and the conjugated compound. It is thought that this unconjugated compound has a role in mediating the adsorption of the conjugated compound to the silver particles, and because a significant proportion of the unconjugated compound is substituted by the conjugated compound, at least a portion of the conjugated compound adsorbs directly to the silver particles. Accordingly, the unconjugated compound should exist in an amount that is sufficient to perform this role. Specifically, the amount of the unconjugated compound within the composite is preferably not less than 0.1% by weight, and is more preferably 1% by weight or greater. Further, the upper limit for this amount is preferably not more than 99% by weight, more preferably not more than 80% by weight, still more preferably not more than 50% by weight, still more preferably not more than 30% by weight, and most preferably 10% by weight or less.

The unconjugated compound used in this production method refers to an organic compound having no conjugated region of π electrons, namely, no delocalized region of conjugated π electrons as described within the above definition for a conjugated compound.

Examples of the unconjugated compound include polyvinylpyrrolidone, polyvinyl alcohol, polyallylamide and polyacrylic acid, and of these, polyvinylpyrrolidone, polyvinyl alcohol and polyallylamide are preferred, polyvinylpyrrolidone and polyallylamide are more preferred, and polyvinylpyrrolidone is particularly desirable.

The coating treatment with the unconjugated compound may, be performed, for example, by dispersing the silver particles within a solution containing the unconjugated compound, or may be synthesized by a process of reducing a silver compound in the presence of the unconjugated compound.

Although there are no particular limitations on solvents that may be used in the above production process, a solvent that dissolves the conjugated compound having a weight-average molecular weight of not less than $3.0 \times 10^2$ is preferred. Further, in those cases where coated silver particles are used, a solvent that dissolves the unconjugated compound coating the silver particles is preferred. Examples of solvents that can be used include benzene, toluene, xylene, ortho-dichlorobenzene, chloroform, tetrahydrofuran, hexane, diethyl ether, acetonitrile, N-methylpyrrolidone, methanol, ethanol, isopropanol, ethylene glycol and water. These solvents may also be used in mixtures containing two or more solvents, and the contact step may be repeated using different solvents.

Although there are no particular limitations on the concentration of the solution of the conjugated compound having a weight-average molecular weight of not less than $3.0 \times 10^2$ used in this production method, from the viewpoint of facilitating the adsorption of the conjugated compound to the silver particles, the concentration is preferably not less than 10 μmol/l, more preferably not less than 50 μmol/l, still more preferably not less than 100 μmol/l, and most preferably 200 μmol/l or greater. There are no particular limitations on the upper limit for the concentration, provided the conjugated compound dissolves in the solvent.

When the volume of the solution of the conjugated compound having a weight-average molecular weight of not less than $3.0 \times 10^2$ is 10 ml, the amount of silver particles or coated silver particles is preferably not less than 0.1 mg, more preferably not less than 1 mg, still more preferably not less than 5 mg, and most preferably 10 mg or greater. The upper limit is typically approximately 10 g, but is preferably not more than 5 g, more preferably not more than 1 g, and still more preferably 100 mg or less. If the amount of the silver particles or coated silver particles is very large, then there is a possibility that adsorption of the conjugated compound may be unsatisfactory.

Production Method 2

The silver-(conjugated compound) composite of the present invention can also be obtained by a production method that includes, for example, a step of reducing a silver compound in the presence of a conjugated compound having a weight-average molecular weight of not less than $3.0 \times 10^2$ (hereinafter referred to as the "reduction step").

The silver compound includes silver chloride, silver bromide, silver iodide, silver sulfide, silver oxide, silver nitrate, silver hypochlorite, silver chlorite, silver chlorate, silver perchlorate, silver acetate, silver sulfate, silver carbonate, silver phosphate, silver tetrafluoroborate, silver hexafluorophosphate and silver trifluoromethanesulfonate, and from the viewpoint of the solubility of the silver compound in the reducing agent, silver nitrate, silver perchlorate, silver acetate, silver sulfate, silver carbonate, silver phosphate, silver tetrafluoroborate, silver hexafluorophosphate and silver trifluoromethanesulfonate are preferred, and silver nitrate, silver perchlorate, silver acetate, silver carbonate, silver tetrafluoroborate, silver hexafluorophosphate and silver trifluoromethanesulfonate are particularly desirable. These silver compounds may be used individually, or two or more may be used in combination.

Reducing agents that may be used in the reduction step include reducing agents having no aromatic rings such as ethylene glycol, diethylene glycol and triethylene glycol, and reducing agents having an aromatic ring such as phenol, benzyl alcohol, phenylethyl alcohol, benzaldehyde, phenylacetaldehyde, phenylmethylamine, phenylethylamine, aniline, thiophenol, phenylmethylthiol, phenylethylthiol, thiophene, hydroxythiophene, thiophene aldehyde, furfural, pyrrole, and derivatives of the above compounds. Of the above compounds, from the viewpoints of the stability of the reducing agent and the reduction performance, ethylene glycol, diethylene glycol, triethylene glycol, phenol, benzyl alcohol, phenylethyl alcohol, aniline, thiophenol, phenylmethylthiol, phenylethylthiol and hydroxythiophene are preferred. Some or all of the hydrogen atoms within these reducing agents may be substituted. These reducing agents may be used individually, or two or more may be used in combination.

In the reduction step, examples of solvents that may be used include benzene, toluene, xylene, ortho-dichlorobenzene, chloroform, tetrahydrofuran, hexane, diethyl ether, acetonitrile and N-methylpyrrolidone. Moreover, the reducing agent may also be used as the solvent.

The reduction step is preferably performed in the presence of a metal halide, a hydrogen halide, or both a metal halide and a hydrogen halide.

The metal halide includes lithium chloride, cesium chloride, tungsten chloride, molybdenum chloride, sodium chloride, magnesium chloride, potassium chloride, calcium chloride, scandium chloride, titanium chloride, vanadium chloride, chromium chloride, manganese chloride, iron chloride, cobalt chloride, nickel chloride, copper chloride, zinc chloride, platinum chloride, tin chloride, silver chloride, sodium bromide, magnesium bromide, potassium bromide, calcium bromide, iron bromide, copper bromide, nickel bromide, silver bromide, sodium iodide, magnesium iodide, potassium iodide, calcium iodide and silver iodide, and from the viewpoint of solubility, lithium chloride, cesium chloride, tungsten chloride, molybdenum chloride, sodium chloride, magnesium chloride, potassium chloride, calcium chloride, scandium chloride, titanium chloride, vanadium chloride, chromium chloride, manganese chloride, iron chloride, cobalt chloride, nickel chloride, copper chloride, zinc chloride, platinum chloride, tin chloride, iron bromide and copper bromide are preferred, and potassium chloride, calcium chloride, silver chloride, iron chloride, sodium chloride and copper chloride are particularly preferred. These metal halides may be in the form of hydrates.

The above-mentioned hydrogen halide includes hydrogen fluoride, hydrogen chloride, hydrogen bromide and hydrogen iodide, and from the viewpoint of affinity with the silver compound, hydrogen chloride is preferred.

The metal halides and the hydrogen halides may each be used individually, or in combinations of two or more compounds.

This production method of the present invention may be a single step method composed of only the reduction step, or may by a method of two or more steps that includes other steps besides the reduction step. A production method of two or more steps is described below as a preferred embodiment.

Specifically, this production method includes the above reduction step and a heating step of heating a reducing agent having an aromatic ring prior to the reduction step, and this particular production method is preferred from the viewpoint of activation of the reducing agent. The heating step may be performed using the same solvent as that used in the reduction step.

First, the reducing agent having an aromatic ring is dissolved in a solvent if required, and is then heated (preheating). Subsequently, the silver compound is added to the heated reducing agent, and the silver compound is reduced, if necessary in the presence of a dispersant. This enables the desired silver-(conjugated compound) composite to be produced. When adding the silver compound to the heated reducing agent, a metal halide and/or hydrogen halide may be added to inhibit the silver-(conjugated compound) composite from returning to the raw material silver particles.

The heating step is preferably conducted in the presence of oxygen, and is more preferably performed in the presence of a mixed gas containing nitrogen and oxygen in a ratio (volumetric ratio) of nitrogen:oxygen=4:1 (air may be used as a substitute for this mixed gas).

The reduction step is preferably performed in an inert atmosphere of nitrogen or argon or the like.

The temperature during the heating step and the reduction step is typically within a range from 40 to 200° C., preferably from 60 to 190° C., and more preferably from 100 to 190° C. The temperatures in the heating step and the reduction step may be different.

The time required for the heating step is typically at least 5 minutes, and preferably at least 10 minutes, and more preferably 20 minutes or longer. The upper limit is typically 400 minutes.

The time required for the reduction step is typically at least 5 minutes, and preferably at least 10 minutes, and more preferably 15 minutes or longer. The upper limit is typically 400 minutes.

This production method of the present invention may also include, following the above-mentioned reduction step, a purification step of purifying the unpurified silver-(conjugated compound) composite obtained in the reduction step. This purification step may be conducted using centrifugal separation, supernatant removal, re-dispersion, washing, heating, drying and/or the like.

Further, in those cases where the silver-(conjugated compound) composite obtained following the above reduction step and purification step is in the form of a dispersion, the production method may include a recovery step of using centrifugal separation, filtration or distillation or the like to obtain a solid-state silver-(conjugated compound) composite.

<Dispersion>

The silver-(conjugated compound) composite of the present invention may be used as is, but in order to improve the workability during application of the composite, the composite may also be used in the form of a dispersion containing the composite, prepared by dispersing the composite in a solvent. A non-polar or polar organic solvent may be used as the solvent. Examples of the non-polar organic solvent include benzene, toluene, xylene, ortho-dichlorobenzene, chloroform, tetrahydrofuran, hexane and diethyl ether, whereas examples of the polar organic solvent include acetonitrile, N-methylpyrrolidone and alcohols such as methanol, ethanol and isopropanol. In a dispersion of the silver-(conjugated compound) composite of the present invention, the concentration of the silver-(conjugated compound) composite is preferably within a range from 0.01 to 75% by weight, more preferably from 0.05 to 50% by weight, and still more preferably from 0.1 to 30% by weight. In addition to the silver-(conjugated compound) composite of the present invention, dispersion stabilizers, surfactants, viscosity regulators and corrosion inhibitors and the like may also be dispersed or dissolved in the dispersion.

A dispersion of the present invention is useful as a conductive coating material, a heat-conductive coating material, a pressure-sensitive adhesive, an adhesive or a functional coating material.

<Layered Structure>

By using the silver-(conjugated compound) composite of the present invention within a layered structure, a material is obtained that is useful in the production of electronic devices and the like. This layered structure comprises a substrate and a layer comprising the silver-(conjugated compound) composite of the present invention formed on the substrate. In one example of a light emitting device, the substrate is, for example, a glass substrate or a plastic substrate composed of polyethylene terephthalate, polyethylene, polypropylene or polycarbonate or the like, and the layer containing the silver-(conjugated compound) composite of the present invention functions as an electrode such as an anode or a cathode.

<Uses>

Representative uses of the silver-(conjugated compound) composite of the present invention are described below.

The silver-(conjugated compound) composite of the present invention exhibits excellent conductivity. Accordingly, the silver-(conjugated compound) composite of the present invention can be used, for example, as an electrode.

A silver-(conjugated compound) composite of the present invention in the dispersion state described above can be used as a conductive coating material, and by selecting the coating method used for applying the dispersion, a patterned conductive region can be formed. By adopting this method, an electrode or the like can be formed without the need for processes such as vapor deposition, sputtering, etching or plating. Further, because the silver-(conjugated compound) composite of the present invention exhibits superior conductivity and charge injection properties, the resulting electrode exhibits a combination of excellent conductivity and charge injection properties. This electrode may be used not only within organic electronic devices including light emitting devices such as organic EL devices, organic transistors, and photoelectric conversion elements such as solar cells, but also within heating elements, electromagnetic wave shielding films, antennas, integrated circuits and antistatic agents and the like. During application of the composite, the dispersion state described above is ideal.

The above-mentioned light emitting device has electrodes consisting of an anode and a cathode, and a light emitting layer provided between the electrodes, wherein the silver-(conjugated compound) composite of the present invention is used for at least one of the electrodes. This light emitting device may also include a substrate, hole injection layer, electron injection layer, hole transport layer, electron transport layer and interlayer and the like.

The above-mentioned organic transistor comprises a source electrode, a drain electrode and an insulated gate electrode layer, wherein the silver-(conjugated compound) composite of the present invention is used for the electrodes. This organic transistor may also include a substrate and a semiconductor layer.

The above-mentioned photoelectric conversion element comprises electrodes consisting of an anode and a cathode, and an organic layer provided between the electrodes, wherein the silver-(conjugated compound) composite of the present invention is used for the electrodes. This photoelectric conversion element may also include a substrate, hole injection layer, electron injection layer, hole transport layer, electron transport layer, interlayer and charge separation layer and the like.

In any of these uses, a single silver-(conjugated compound) composite of the present invention may be used alone, or two or more composites may be used in combination.

EXAMPLES

The present invention is described below in further detail using a series of examples and comparative examples, but the present invention is in no way limited by these examples.

—Measurement Methods—

Structural analysis of each polymer was conducted by $^1$H-NMR analysis using a 300 MHz NMR spectrometer manufactured by Varian Inc. Further, measurement was conducted using a solution prepared by dissolving the sample in an appropriate deuterated solvent at a concentration of 20 mg/ml.

The weight-average molecular weight (Mw) and the number-average molecular weight (Mn) of each polymer were determined as the polystyrene-equivalent weight-average molecular weight and number-average molecular weight respectively, using gel permeation chromatography (GPC) (HLC-8220GPC, manufactured by Tosoh Corporation). Each measurement sample was prepared by dissolving the sample in tetrahydrofuran at a concentration of approximately 0.5% by weight, and then injecting 50 µL of the sample solution into the GPC device. Tetrahydrofuran was used as the GPC mobile phase, and the flow rate was set to 0.5 mL/minute.

The ionization potential of each of the obtained polymers was measured in the atmosphere, using a photoelectron spectrometer (product name: AC2, manufactured by Riken Keiki Co., Ltd.). The sample for measurement was prepared by first preparing a 1% by weight chloroform solution of the polymer, subsequently spin coating the solution onto a quartz substrate for 30 seconds at a rotational rate of 1,000 rpm, and then drying the solution at 100° C. for 15 minutes.

The absorption wavelength of each of the obtained polymers was measured using an ultraviolet-visible-near infrared spectrometer (Cary 5E, manufactured by Varian Inc.). The sample for measurement was prepared by first preparing a 1% by weight chloroform solution of the polymer, subsequently spin coating the solution onto a quartz substrate for 30 seconds at a rotational rate of 1,000 rpm, and then drying the solution at 100° C. for 15 minutes.

The shape of each obtained silver-(conjugated compound) composite was confirmed visually from a photograph of the composite captured at a magnification of 20,000× using a scanning electron microscope manufactured by Jeol Ltd. (product name: JSM-5500) (during capture of the photograph, the angle of the sample stage was set to 0°, the capture location was a random location, and no alignment operations or the like were performed during sample preparation). The number-average Feret diameter was determined by randomly sampling at least 200 particles from the 20,000× magnification photograph, measuring the Feret diameter of each particle, and calculating the arithmetic average.

The X-ray photoelectron spectrum of each silver-(conjugated compound) composite was measured using a scanning X-ray photoelectron spectroscopic analysis apparatus (product name: PHI Quantera SXM, manufactured by Ulvac-Phi Inc.), and a surface compositional analysis was performed. The analysis technique employed X-ray photoelectron spectroscopy (hereinafter abbreviated as "XPS"), the X-ray source was an AlKα beam (1486.6 eV), the X-ray spot diameter was 100 μm, and the neutralization conditions included the use of a neutralizing electron gun and a low-energy Ar ion gun. The sample of the silver-(conjugated compound) composite was placed in a stainless steel cup for measurement.

A solid-state emission spectrum of each synthesized silver-(conjugated compound) composite was measured using a fluorescence spectrophotometer (product name: Fluorolog, manufactured by Jobin Yvon-Spex Inc.).

Synthesis Example 1

Synthesis of Compound (1)

A 500 ml three-necked flask was charged with 4.11 g (25.5 mmol) of 1-phenyl-2-pyrrolidone, and the flask contents were dried and purged with nitrogen. 100 ml of chloroform was added to the flask, the 1-phenyl-2-pyrrolidone was dissolved in the chloroform, a solution containing 4.52 g (25.4 mmol) of N-bromosuccinimide (hereinafter abbreviated as "NBS") dissolved in 50 ml of dimethylformamide (hereinafter abbreviated as "DMF") was then added to the flask, and the resulting mixture was stirred for 5 hours. 150 ml of distilled water was added to the thus obtained reaction solution, and following stirring, the chloroform and the distilled water layers were separated, and the organic layer was collected and concentrated. The thus obtained crude product was purified by recrystallization, yielding 5.98 g of a product. The structure of the product was confirmed using $^1$H-NMR. The results confirmed that the product was a compound A represented by the formula shown below.

[Chemical Formula 22]

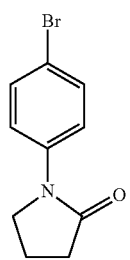

A 200 ml three-necked flask that had been dried and purged with nitrogen was charged with 5.80 g (24.1 mmol) of the compound A, 4.28 g (25.3 mmol) of diphenylamine, 0.11 g (0.12 mmol) of palladium acetate, 0.07 g (0.24 mmol) of tri-tert-butylphosphine, 4.63 g (48.2 mmol) of sodium tert-butoxide and 50 ml of anhydrous toluene, and the resulting mixture was stirred at reflux temperature for 4 hours. The reaction solution was then left to cool to room temperature, 50 ml of distilled water was added to the reaction solution, the distilled water and chloroform layers were separated, and the organic layer was collected and concentrated. The thus obtained crude product was purified by recrystallization, yielding 7.32 g of a product. The structure of the product was confirmed using $^1$H-NMR. The results confirmed that the product was a compound B represented by the formula shown below.

[Chemical Formula 23]

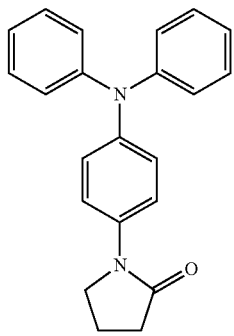

A 300 ml three-necked flask that had been dried and purged with nitrogen was charged with 7.01 g (21.3 mmol) of the compound B, and the compound B was then dissolved in 100 ml of anhydrous chloroform. A solution containing 7.39 g (41.5 mmol) of NBS dissolved in 50 ml of DMF was then added to the flask using a dropping funnel. The resulting mixture was stirred at room temperature for 5 hours. 100 ml of distilled water was added to the thus obtained reaction solution, the reaction solution was separated into chloroform and distilled water layers, and the organic layer was collected and concentrated. The thus obtained crude product was purified by recrystallization, yielding 9.84 g of a product. The structure of the product was confirmed using $^1$H-NMR. The results confirmed that the product was a compound C represented by the formula shown below.

[Chemical Formula 24]

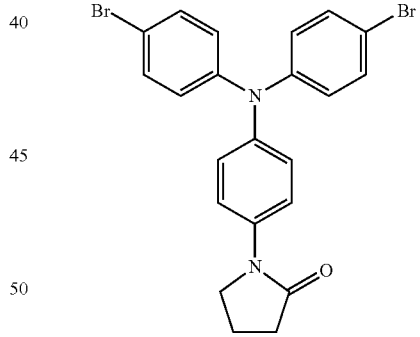

A 300 ml three-necked flask that had been dried and purged with nitrogen was charged with 1.00 g (2.11 mmol) of the compound C, 1.34 g (5.28 mmol) of bis-pinacolate diboron, 0.172 g (0.211 mmol) of palladium chloride-1,1'-bis(diphenylphosphino)ferrocene complex, 0.115 g (0.211 mmol) of 1,1'-bis(diphenylphosphino)ferrocene and 2.07 g (21.1 mmol) of potassium acetate, and the flask contents were dissolved in 18 ml of anhydrous dioxane and then stirred for 5 hours at a temperature of 100° C. After stirring for 5 hours, 1 g of activated carbon was added, and stirring was continued for a further one hour. The reaction mixture was then filtered through celite and concentrated. The thus obtained crude product was purified by recrystallization, yielding 0.735 g of a product. The structure of the product was confirmed using $^1$H-NMR. The results confirmed that the product was a compound (1) represented by the formula shown below.

[Chemical Formula 25]

Synthesis Example 2

Synthesis of Compound (2)

2,7-dibromofluorenone (50 g) and catechol (345 g) were mixed together under an inert atmosphere, and the resulting mixture was heated to 130° C. To this mixture were added 3-mercaptopropionic acid (1.96 g) and sulfuric acid (7 g), and the resulting mixture was stirred at 130° C. for 1.5 hours. Following cooling by standing, the reaction mixture was added dropwise to water (2 L), and the precipitated crystals were collected by filtration. The collected crystals were dissolved in ethanol, and following filtering, the filtrate was concentrated, and the concentrate was added to water to once again precipitate the crystals. The thus obtained solid was collected by filtration, dissolved in toluene and filtered, the filtrate was then added to ethanol, and the resulting solution was added dropwise to hexane and cooled to 5° C. The precipitated solid was collected by filtration and dried under reduced pressure to obtain a white solid. Under an inert atmosphere, 20 g of the white solid was mixed with triethylene glycol monomethyl ester tosylate (72 g), anhydrous potassium carbonate (52 g) and acetonitrile (500 mL), and the resulting mixture was heated and stirred under reflux for 4 hours. Following cooling by standing, the reaction solution was filtered and the filtrate was concentrated under reduced pressure. The reaction mixture was purified by silica gel chromatography using ethyl acetate as the eluent, and then by silica gel chromatography using a mixed solvent of tetrahydrofuran and ethyl acetate as the eluent, yielding 18 g of a product. The structure of the product was confirmed using $^1$H-NMR. The results confirmed that the product was a compound (2) represented by the formula shown below.

[Chemical Formula 26]

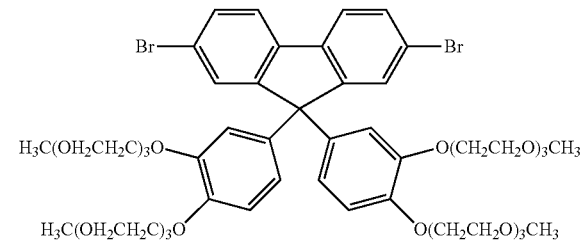

Synthesis Example 3

Synthesis of Polymer (1)

In a flask under an argon atmosphere, 100 mg of the compound (1), 93 mg of 2,7-dibromo-9,9-dioctylfluorene, 6.87 mg of methyltrioctylammonium chloride (product name: Aliquat 336, manufactured by Aldrich Co., Ltd.) (hereinafter referred to as "Aliquat 336"), 19.6 mg of tetrakis(triphenylphosphine)palladium and 10 ml of toluene were mixed together to prepare a solution. A 2 M aqueous solution of sodium carbonate (10 ml) was added dropwise to the solution in the flask, and the resulting mixture was stirred for 20 hours under heating at 100° C. The thus obtained reaction mixture was cooled to room temperature, and subsequent dropwise addition to 300 ml of methanol with stirring precipitated a solid. The solid was filtered and dried, yielding 75.9 mg of a compound (hereinafter referred to as the "polymer (1)") having a repeating unit represented by the formula shown below.

[Chemical Formula 27]

The polystyrene-equivalent number-average molecular weight of the polymer (1) was $5.1 \times 10^3$, and the polystyrene-equivalent weight-average molecular weight was $9.2 \times 10^3$. The peak emission wavelength for the polymer (1) was 432 nm. The ionization potential of the polymer (1) was 5.29 eV, and the band gap was 2.8 eV.

Synthesis Example 4

Synthesis of Polymer (2)

In a flask under an argon atmosphere, 393 mg of the compound (1), 530 mg of the compound (2), 40 mg of Aliquat 336, 58 mg of tetrakis(triphenylphosphine)palladium and 10 ml of toluene were mixed together to prepare a solution. A 2 M aqueous solution of sodium carbonate (10 ml) was added dropwise to the solution in the flask, and the resulting mixture was stirred for 6 hours under heating at 100° C. The thus obtained reaction mixture was cooled to room temperature, and subsequent dropwise addition to 300 ml of methanol and stirring for one hour precipitated a solid. The solid was filtered and dried, yielding 568 mg of a compound (hereinafter referred to as the "polymer (2)") having a repeating unit represented by the formula shown below.

[Chemical Formula 28]

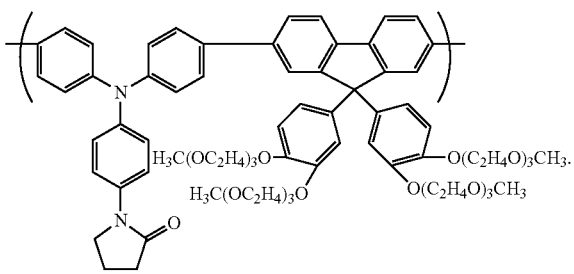

The polystyrene-equivalent number-average molecular weight of the polymer (2) was $3.5 \times 10^3$, and the polystyrene-equivalent weight-average molecular weight was $6.0 \times 10^3$. The peak emission wavelength for the polymer (1) was 435 nm. The ionization potential of the polymer (2) was 5.29 eV, and the band gap was 2.75 eV.

Synthesis Example 5

Synthesis of Compound (3)

A 3,000 mL flask was charged with 52.5 g (0.16 mol) of 2,7-dibromo-9-fluorenone, 154.8 g (0.93 mol) of ethyl salicylate and 1.4 g (0.016 mol) of mercaptoacetic acid, and the inside of the flask was purged with nitrogen. Methanesulfonic acid (630 mL) was then added to the flask, and the resulting mixture was stirred overnight at 75° C. The mixture was then cooled by standing, added to ice water, and stirred for one hour. The thus generated solid was filtered and then washed with heated acetonitrile. The washed solid was dissolved in acetone, and a solid was recrystallized from the acetone solution and collected by filtration. The thus obtained solid (62.7 g), 86.3 g (0.27 mmol) of 2-[2-(2-methoxyethoxy)ethoxy]ethyl p-toluenesulfonate, 62.6 g (0.45 mmol) of potassium carbonate and 7.2 g (0.027 mol) of 18-crown-6 were dissolved in N,N-dimethylformamide (DMF) (670 ml), and the solution was transferred to a flask and stirred overnight at 105° C. The resulting mixture was left to cool to room temperature, and was then added to ice water and stirred for one hour. Chloroform (300 mL) was added to the reaction mixture, a phase separation extraction was performed, and the separated organic layer was concentrated to obtain 51.2 g of a product. The yield was 31%. The structure of the product was confirmed using $^1$H-NMR. The results confirmed that the product was a compound (3) represented by the formula shown below.

[Chemical Formula 29]

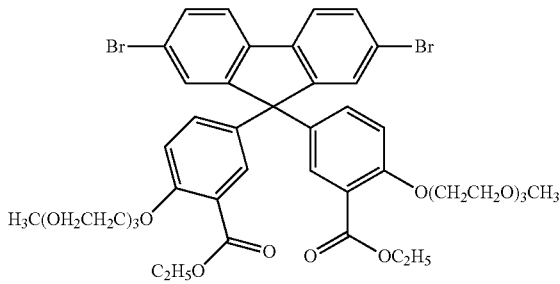

Synthesis Example 6

Synthesis of Compound (4)

A 1,000 ml flask that had been purged with argon gas was charged with the compound (3) (15 g), bis-pinacolate diboron (8.9 g), [1,1'-bis(diphenylphosphino)ferrocene]dichloropalladium(II) dichloromethane complex (0.8 g), 1,1'-bis(diphenylphosphino)ferrocene (0.5 g), potassium acetate (9.4 g) and dioxane (400 mL), and the mixture was heated to 110° C. and stirred for 10 hours under reflux. Following cooling by standing, the reaction mixture was filtered, and the filtrate was concentrated under reduced pressure. The reaction mixture was then washed three times with methanol. The precipitate was dissolved in toluene, and activated carbon was added to the solution and stirred. The solution was then filtered, and the filtrate was concentrated under reduced pressure, yielding 11.7 g of a product. The structure of the product was confirmed using $^1$H-NMR. The results confirmed that the product was a compound (4) represented by the formula shown below.

[Chemical Formula 30]

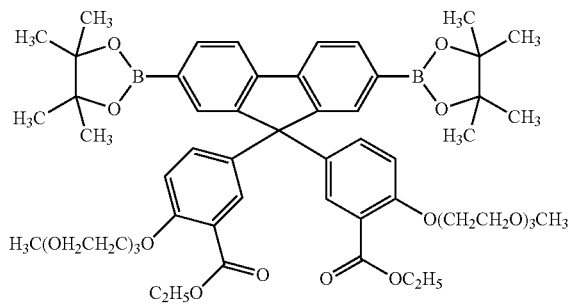

Synthesis Example 7

Synthesis of Polymer (3)

In a 100 ml flask that had been purged with argon gas, the compound (3) (0.55 g), the compound (4) (0.61 g), tetrakis(triphenylphosphine)palladium (0.01 g), methyltrioctylammonium chloride (product name: Aliquat 336 (a registered trademark), manufactured by Aldrich Co., Ltd.) (0.20 g) and toluene (10 mL) were mixed together, and the resulting mixture was heated to 105° C. A 2 M aqueous solution of sodium carbonate (6 mL) was added dropwise to the reaction solution, and the resulting mixture was stirred for 8 hours under reflux. 4-t-butylphenylboronic acid (0.01 g) was then added to the reaction mixture and stirred for 6 hours under reflux. Subsequently, an aqueous solution of sodium diethyldithiocarbamate (10 mL, concentration: 0.05 g/mL) was added to the reaction mixture and stirred for 2 hours. The mixed solution was added dropwise to 300 mL of methanol and stirred for one hour, and the resulting precipitate was filtered, dried under reduced pressure for two hours, and then dissolved in 20 mL of tetrahydrofuran. The thus obtained solution was added dropwise to a mixed solvent containing 120 ml of methanol and 50 mL of a 3% by weight aqueous solution of acetic acid, and following stirring for one hour, the precipitated solid was collected by filtration and dissolved in 20 ml of tetrahydrofuran. The thus obtained solution was added dropwise to 200 ml of methanol and stirred for 30 minutes, and the precipitate was collected by filtration, yielding a solid. The thus obtained solid was dissolved in tetrahydrofuran and purified by passage through an alumina column and a silica gel column. The tetrahydrofuran solution collected from the columns was concentrated and then added dropwise to methanol (200 mL). Filtering and drying of the precipitated solid yielded 520 mg of a polymer (hereinafter referred to as the "polymer (3)").

The results of $^1$H-NMR confirmed that the polymer (3) had a repeating unit represented by the formula shown below.

[Chemical Formula 31]

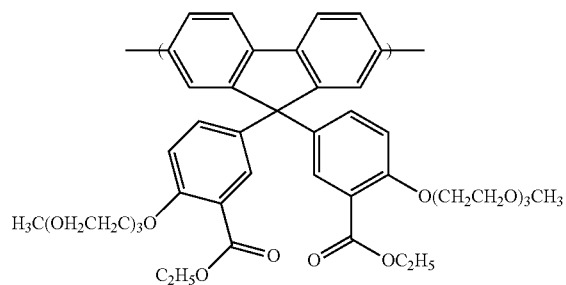

The polystyrene-equivalent number-average molecular weight of the polymer (3) was $2.4 \times 10^4$, and the polystyrene-equivalent weight-average molecular weight was $4.8 \times 10^4$.

Synthesis Example 8

Synthesis of Polymer (4)

A 100 mL flask was charged with the polymer (3) (200 mg), and the inside of the flask was purged with nitrogen. Tetrahydrofuran (20 mL) and ethanol (20 mL) were added to the flask, and the resulting mixture was heated to 55° C. An aqueous solution containing cesium hydroxide (200 mg) dissolved in water (2 mL) was added to the flask, and the resulting mixture was stirred at 55° C. for 6 hours. The mixture was left to cool to room temperature, and the reaction solvent was then removed by distillation under reduced pressure. The resulting solid was washed with water and dried under reduced pressure, yielding 150 mg of a polymer (hereinafter referred to as the "polymer (4)") having a repeating unit represented by the formula shown below.

[Chemical Formula 32]

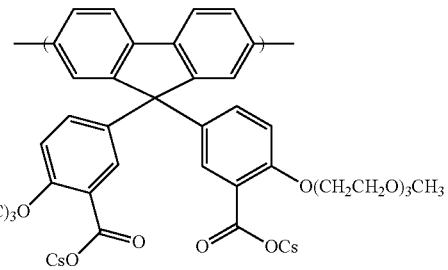

The $^1$H-NMR spectrum confirmed that the signal attributable to the ethyl group of the ethyl ester region within the polymer (3) had disappeared completely. The polystyrene-equivalent number-average molecular weight and the polystyrene-equivalent weight-average molecular weight of the polymer (4) were the same as the values for the polymer (3). The peak emission wavelength for the polymer (4) was 426 nm. The ionization potential of the polymer (4) was 5.50 eV, and the band gap was 2.80 eV.

Synthesis Example 9

A 100 mL flask containing 15 mL of ethylene glycol was immersed in an oil bath at 160° C., and heated for one hour. Subsequently, 9 mL of a 0.1 mol/L silver nitrate-ethylene glycol solution, 9 mL of a 0.15 mol/L polyvinylpyrrolidone (hereinafter abbreviated as "PVP", manufactured by Sigma-Aldrich Co., Ltd., weight-average molecular weight as listed in catalog: $5.5 \times 10^4$)-ethylene glycol solution, and 36 μL of a 2 mmol/L tris(acetylacetonato)iron(III)-ethylene glycol solution were added to the flask and stirred for 60 minutes, yielding a dispersion of coated silver particles. The thus obtained dispersion was left to cool to 40° C., and a centrifugal separation was performed, yielding a sediment. The thus obtained sediment was dried, yielding coated silver particles (hereinafter referred to as the "coated silver particles A").

Observation of the obtained coated silver particles using an SEM and measurement of the Feret diameter revealed a number-average Feret diameter of 200 nm. Based on the results of an XPS measurement, it was clear that polyvinylpyrrolidone was adsorbed to the surface of the silver particles.

Example 1

Production of Silver-(Conjugated Compound) Composite

A 50 mL flask containing 5 mL of benzyl alcohol was immersed in an oil bath at 150° C., and preheating was performed while air was bubbled through the benzyl alcohol for 60 minutes. Following the preheating period, the gas being bubbled through the benzyl alcohol was changed from air to nitrogen gas, and after 5 minutes of nitrogen purging, the bubbling was halted. Subsequently, 1.5 mL of a 0.1 M silver nitrate-benzyl alcohol solution, 1.5 mL of a 0.15 M polymer (1)-benzyl alcohol solution, and 40 μL of a 4 mM copper chloride dihydrate-benzyl alcohol solution were added to the flask, and the mixture was stirred for 120 minutes, yielding a dispersion. The dispersion was left to cool to 40° C., and a centrifugal separation was then performed and the sediment was collected. The collected sediment was washed with benzyl alcohol and dried, and an XPS measurement was then performed, confirming the formation of a composite of silver and the polymer (1). The particulate composite of silver and the polymer (1) obtained in this manner is referred to below as the "silver-(conjugated compound) composite (1)". If the total number of atoms of the silver-(conjugated compound) composite (1) is deemed to be 1, then the proportion of the total number of hetero atoms including the nitrogen atoms, oxygen atoms, sulfur atoms and phosphorus atoms was 0.13. Observation of the silver-(conjugated compound) composite (1) using an SEM and measurement of the Feret diameter revealed a number-average Feret diameter of 205 nm (confirming that the Feret diameter of the silver particles prior to formation of the composite was not more than 205 nm).

10 mg of the silver-(conjugated compound) composite (1) was dispersed in 1 ml of a 6.2% by weight poly(methyl methacrylate)-chloroform solution. The resulting dispersion was applied to a quartz substrate by spin coating and dried on a hotplate at 130° C. to form a film, and an emission spectrum was then measured using a fluorescence spectrophotometer. The peak emission wavelength was 432 nm. There was no shift in the peak emission wavelength from that of the polymer (1).

Further, 10 mg of the silver-(conjugated compound) composite (1) and 1 ml of xylene were mixed, and ultrasound was used to disperse the composite substantially uniformly and prepare a dispersion. The dispersion was left to stand for one hour, and the dispersion state was maintained, with no flocculation of the silver particulate composite (1) within the dispersion. Moreover, when a thin film of the silver-(conjugated compound) composite (1) was formed on a quartz substrate, and the conductivity of the thin film was measured using a digital tester CDM-03D manufactured by Custom Co., Ltd., the conductivity was good.

Example 2

A 50 mL flask containing 5 mL of benzyl alcohol was immersed in an oil bath at 150° C., and preheating was performed while air was bubbled through the benzyl alcohol for 60 minutes. Following the preheating period, the gas being bubbled through the benzyl alcohol was changed from air to nitrogen gas, and after 5 minutes of nitrogen purging, the bubbling was halted. Subsequently, 1.5 mL of a 0.1 M silver nitrate-benzyl alcohol solution, 1.5 mL of a 0.15 M polymer (2)-benzyl alcohol solution, and 40 μL of a 4 mM copper chloride dihydrate-benzyl alcohol solution were added to the flask, and the mixture was stirred for 120 minutes, yielding a dispersion. The dispersion was left to cool to 40° C., and a centrifugal separation was then performed and the sediment was collected. The collected sediment was washed with benzyl alcohol and dried, and an XPS measurement was then performed, confirming the formation of a composite of silver and the polymer (2). The particulate composite of silver and the polymer (2) obtained in this manner is referred to below as the "silver-(conjugated compound) composite (2)". If the total number of atoms of the silver-(conjugated compound) composite (2) is deemed to be 1, then the proportion of the total number of hetero atoms including the nitrogen atoms, oxygen atoms, sulfur atoms and phosphorus atoms was 0.14. Observation of the silver-(conjugated compound) composite (2) using an SEM and measurement of the Feret diameter revealed a number-average Feret diameter of 98.0 nm (confirming that the Feret diameter of the silver particles prior to formation of the composite was not more than 98.0 nm).

10 mg of the silver-(conjugated compound) composite (2) was dispersed in 1 ml of a 6.2% by weight poly(methyl methacrylate)-chloroform solution. The resulting dispersion was applied to a quartz substrate by spin coating and dried on a hotplate at 130° C. to form a film, and an emission spectrum was then measured using a fluorescence spectrophotometer. The peak emission wavelength was 435 nm. There was no shift in the peak emission wavelength from that of the polymer (2).

Further, 10 mg of the silver-(conjugated compound) composite (2) and 1 ml of xylene were mixed, and ultrasound was used to disperse the composite substantially uniformly and prepare a dispersion. The dispersion was left to stand for one hour, and the dispersion state was maintained, with no flocculation of the silver particulate composite (2) within the dispersion. Moreover, when a thin film of the silver-(conjugated compound) composite (2) was formed on a quartz substrate, and the conductivity of the thin film was measured using a digital tester CDM-03D manufactured by Custom Co., Ltd., the conductivity was good.

Example 3

40 mg of the coated silver particles A were added to 10 ml of a methanol solution of the polymer (4) (having an equivalent concentration of the repeating unit of 100 μM), and the mixture was dispersed using ultrasound. The dispersion was stirred for one hour, and a centrifugal separation was then performed and the supernatant was removed. Subsequently, the operation of adding 10 ml of a methanol solution of the polymer (4) (having an equivalent concentration of the repeating unit of 100 μM) to the residue, dispersing the mixture using ultrasound, stirring for one hour, performing a centrifugal separation, and then removing the supernatant was repeated a further 5 times. Subsequently, 30 ml of methanol was added, and the resulting mixture was dispersed using ultrasound. The dispersion was stirred for one hour, and a centrifugal separation was then performed and the supernatant was removed. Subsequently, the operation of adding 30 ml of methanol, dispersing the mixture using ultrasound, stirring for one hour, performing a centrifugal separation, and then removing the supernatant was repeated a further 5 times, and the resulting residue was then dried. The thus obtained solid was measured by XPS, and the measurement confirmed the formation of a composite of silver and the polymer (4). The particulate composite of silver and the polymer (4) obtained in this manner is referred to below as the "silver-(conjugated compound) composite (3)". If the total number of atoms of the silver-(conjugated compound) composite (3) is deemed to be 1, then the proportion of the total number of hetero atoms including the nitrogen atoms, oxygen atoms, sulfur atoms and phosphorus atoms was 0.20. Observation of the silver-(conjugated compound) composite (3) using an SEM and measurement of the Feret diameter revealed a number-average Feret diameter of 203 nm (confirming that the Feret diameter of the silver particles prior to formation of the composite was not more than 203 nm).

10 mg of the silver-(conjugated compound) composite (3) was dispersed in 1 ml of a 6.2% by weight poly(methyl methacrylate)-chloroform solution. The resulting dispersion was applied to a quartz substrate by spin coating and dried on a hotplate at 130° C. to form a film, and an emission spectrum was then measured using a fluorescence spectrophotometer. The peak emission wavelength was 426 nm. There was no shift in the peak emission wavelength from that of the polymer (4).

Further, 10 mg of the silver-(conjugated compound) composite (3) and 1 ml of xylene were mixed, and ultrasound was used to disperse the composite substantially uniformly and prepare a dispersion. The dispersion was left to stand for one hour, and the dispersion state was maintained, with no flocculation of the silver particulate composite (3) within the dispersion. Moreover, when a thin film of the silver-(conjugated compound) composite (3) was formed on a quartz substrate, and the conductivity of the thin film was measured using a digital tester CDM-03D manufactured by Custom Co., Ltd., the conductivity was good.

Comparative Example 1

An emission spectrum was measured for the composite of polyvinylpyrrolidone and silver particles disclosed in Example 4 of the Patent Document 2 (JP 2007-146279 A) using the same method as that described above for Example 1, but no emission could be confirmed.

Further, 10 mg of the above composite and 1 ml of xylene were mixed, and ultrasound was used to disperse the composite substantially uniformly and prepare a dispersion. When the dispersion was left to stand for one hour, the composite within the dispersion underwent flocculation. Moreover, when a thin film of the composite was formed on a quartz substrate, and the conductivity of the thin film was measured using a digital tester CDM-03D manufactured by Custom Co., Ltd., the resistance was high and an electric current did not flow satisfactorily, indicating that the conductivity was inferior to that of the silver-(conjugated compound) composites (1), (2) and (3) described above.

Example 4

Preparation of Light Emitting Device k-1

Firstly, to the ITO film of a glass substrate having an ITO film deposited thereon as an anode was applied 0.5 ml of poly(3,4-ethylenedioxythiophene)-polystyrenesulfonic acid (PEDOT:PSS solution manufactured by H.C. Starck Inc., product name: Clevios (a registered trademark) P VP Al 4083) as a hole injection material solution, and spin coating was used to form a film having a thickness of 70 nm. The thus obtained film-coated glass substrate was heated in the air at 200° C. for 10 minutes, and the substrate was then left to cool naturally to room temperature, yielding a glass substrate A having a hole injection layer formed thereon.

Secondly, 5.2 mg of a hole transport material and 1 ml of xylene were mixed together to prepare a hole transport layer composition containing 0.6% by weight of the hole transport material. The hole transport material was synthesized using the method described below.

Under an inert gas atmosphere, 2,7-dibromo-9,9-di(octyl) fluorene (1.4 g, 2.5 mmol), 2,7-bis(4,4,5,5-tetramethyl-1,3,2-dioxaborolan-2-yl)-9,9-di(octyl)fluorene (6.4 g, 10.0 mmol), N,N-bis(4-bromophenyl)-N',N'-bis(4-butylphenyl)-1,4-phenylenediamine (4.1 g, 6 mmol), bis(4-bromophenyl)benzocyclobuteneamine (0.6 g, 1.5 mmol), tetraethylammonium hydroxide (1.7 g, 2.3 mmol), palladium acetate (4.5 mg, 0.02 mmol), tri(2-methoxyphenyl)phosphine (0.03 g, 0.08 mmol) and toluene (100 mL) were mixed together, and the resulting mixture was stirred under heating at 100° C. for two hours. Subsequently, phenylboronic acid (0.06 g, 0.5 mmol) was added, and the resulting mixture was stirred for 10 hours. Following cooling by standing, the water layer was removed, an aqueous solution of sodium diethyldithiocarbamate was added to the organic layer and stirred, the water layer was once again removed, and the remaining organic layer was washed sequentially with water and a 3% by weight aqueous solution of acetic acid. The organic layer was poured into methanol to precipitate the polymer, and the precipitated polymer was collected by filtration, re-dissolved in toluene, and passed through a silica gel column and an alumina column. The eluted toluene solution containing the polymer was collected, and the collected toluene solution was poured into methanol to once again precipitate the polymer. The precipitated polymer was collected by filtration and dried under vacuum at 50° C., yielding a polymeric compound (12.1 g) that functions as a hole transport material. Analysis by gel permeation chromatography revealed that the polystyrene-equivalent weight-average molecular weight of the obtained hole transport material was $3.0 \times 10^5$, and the molecular weight distribution index (Mw/Mn) was 3.1.

The hole transport material was a copolymer having a structural unit represented by the formula shown below:

[Chemical Formula 33]

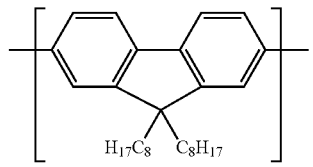

a structural unit represented by the formula shown below:

[Chemical Formula 34]

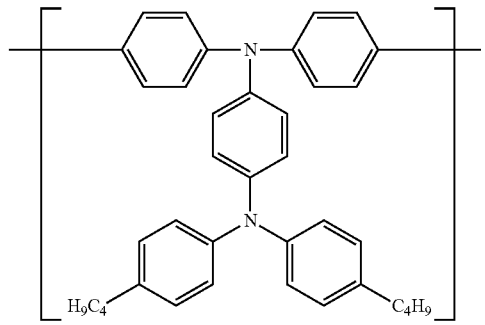

and a structural unit represented by the formula shown below:

[Chemical Formula 35]

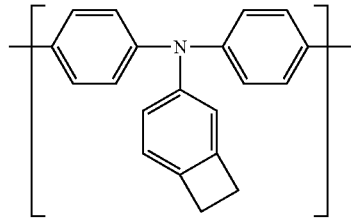

in a molar ratio of 62.5:30:7.5 (wherein these values are theoretical values calculated from the amounts of the respective raw materials).

The hole transport layer composition was applied, by spin coating, onto the hole injection layer of the glass substrate A having the hole injection layer formed thereon, thus forming a coating having a thickness of 33 nm. The glass substrate with this coating formed thereon was heated at 200° C. for 20 minutes under a nitrogen atmosphere to insolubilize the coating, and the substrate was then left to cool freely to room temperature, yielding a glass substrate B having a hole transport layer formed thereon.

Thirdly, a light emitting material and xylene were mixed together to prepare a light emitting layer composition containing 1.3% by weight of the light emitting material. The light emitting material was synthesized using the method described below.

Under an inert gas atmosphere, 2,7-dibromo-9,9-di(octyl)fluorene (9.0 g, 16.4 mmol), N,N'-bis(4-bromophenyl)-N,N'-bis(4-butyl-2,6-dimethylphenyl)-1,4-phenylenediamine (1.3 g, 1.8 mmol), 2,7-bis(4,4,5,5-tetramethyl-1,3,2-dioxaborolan-2-yl)-9,9-di(4-hexylphenyl)fluorene (13.4 g, 18.0 mmol), tetraethylammonium hydroxide (43.0 g, 58.3 mmol), palladium acetate (8 mg, 0.04 mmol), tri(2-methoxyphenyl)phosphine (0.05 g, 0.1 mmol) and toluene (200 mL) were mixed together, and the resulting mixture was stirred under heating at 90° C. for 8 hours. Subsequently, phenylboronic acid (0.22 g, 1.8 mmol) was added, and the resulting mixture was stirred for 14 hours. Following cooling by standing, the water layer was removed, an aqueous solution of sodium diethyldithiocarbamate was added to the organic layer and stirred, the water layer was once again removed, and the remaining organic layer was washed sequentially with water and a 3% by weight aqueous solution of acetic acid. The organic layer was poured into methanol to precipitate the polymer, and the precipitated polymer was collected by filtration, re-dissolved in toluene, and passed through a silica gel column and an alumina column. The eluted toluene solution containing the polymer was collected, and the collected toluene solution was poured into methanol to once again precipitate the polymer. The precipitated polymer was collected by filtration and dried under vacuum at 50° C., yielding a polymeric compound (12.5 g) that functions as a light emitting material. Analysis by gel permeation chromatography revealed that the polystyrene-equivalent weight-average molecular weight of the obtained light emitting material was $3.1 \times 10^5$, and the molecular weight distribution index (Mw/Mn) was 2.9.

The light emitting material was a copolymer having a structural unit represented by the formula shown below:

[Chemical Formula 36]

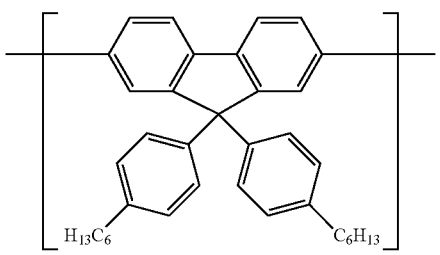

a structural unit represented by the formula shown below:

[Chemical Formula 37]

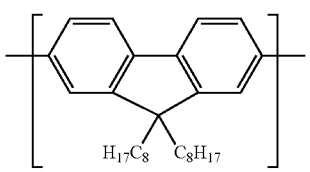

and a structural unit represented by the formula shown below:

[Chemical Formula 38]

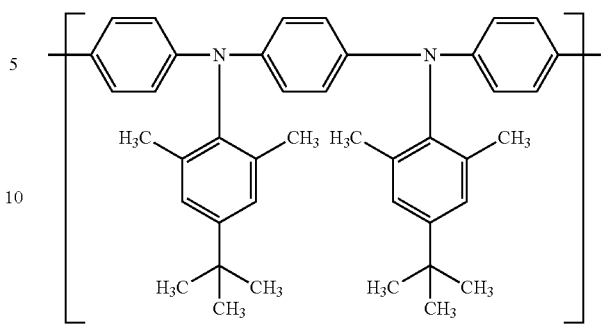

in a molar ratio of 50:45:5 (wherein these values are theoretical values calculated from the amounts of the respective raw materials).

The light emitting layer composition was applied, by spin coating, onto the hole transport layer of the glass substrate B having the hole transport layer formed thereon, thus forming a coating having a thickness of 99 nm. The glass substrate with this coating formed thereon was heated at 130° C. for 15 minutes under a nitrogen atmosphere to evaporate the solvent, and the substrate was then left to cool freely to room temperature, yielding a glass substrate C having a light emitting layer formed thereon.

Fourthly, a thin film of the above-mentioned silver-(conjugated compound) composite (3) was formed on the glass substrate C having the light emitting layer formed thereon, yielding a layered structure m-1 having the silver-(conjugated compound) composite of the present invention formed thereon. In this case, the silver-(conjugated compound) composite (3) functions as the cathode.

Finally, by encapsulating this layered structure m-1 having the cathode formed thereon, using a sealing glass and a two-pot mixed epoxy resin (product name: PX681C/NC, manufactured by Robnor Resins Ltd.) under a nitrogen atmosphere, a light emitting device k-1 was produced.

When a forward voltage of 20 V was applied to the light emitting device k-1, light emission was observed.

Comparative Example 2

Preparation of Light Emitting Device k-2

With the exception of using the uncoated silver particles A instead of the silver-(conjugated compound) composite (3) in Example 4, a light emitting device (hereinafter referred to as the "light emitting device k-2") was prepared in the same manner as Example 4. A forward voltage of 20 V was applied to the light emitting device k-2, but no light emission was observed.

INDUSTRIAL APPLICABILITY

The silver-(conjugated compound) composite of the present invention is useful as a material for coated electrodes, transparent electrodes, conductive coating materials, pressure-sensitive adhesives, adhesives, circuits, conductive coating materials, integrated circuits, electromagnetic wave shielding materials, sensors, antennas and heating elements; and also as a fiber; a packaging material; a material for antibacterial agents, deodorants and antistatic agents; and a medical treatment material.

Further, a layered structure of the present invention has a layer comprising the above silver-(conjugated compound) composite, and because this layer exhibits excellent conductivity, the layered structure is useful (particularly as an electrode) within organic electronic devices such as solar cells and organic transistors. A light emitting device prepared using the silver-(conjugated compound) composite of the present invention exhibits superior emission brightness to a light emitting element that does not use the silver-(conjugated compound) composite of the present invention. This is due to the superior charge injection properties of the silver-(conjugated compound) composite of the present invention.

The invention claimed is:

1. A silver-(conjugated compound) composite, comprising silver particles having a number-average Feret diameter of not more than 1,000 nm, and a conjugated compound having a weight-average molecular weight of not less than $3.0 \times 10^2$ adsorbed to the silver particles, wherein the conjugated compound has a monovalent group represented by a formula (I) shown below, a repeating unit represented by a formula (II) shown below, or a monovalent group represented by the formula (I) and a repeating unit represented by the formula (II):

(I)

wherein $Ar^1$ represents an aromatic group having a valency of $(n^1+1)$, each $R^1$ independently represents a single bond or a group having a valency of $(m^1+1)$, $X^1$ represents a pyrrolidonyl group, a group represented by the formula: —COOM, a group represented by the formula (p-1), or a group represented by the formula (p-2); as a monovalent group containing a hetero atom, and $m^1$ and $n^1$ are identical or different and each represents an integer of 1 or greater,

(II)

(p-1)

(p-2)

wherein R' represents a substituted or unsubstituted divalent hydrocarbon group or a group represented by a formula: —$R^dO$—, wherein $R^d$ represents an alkylene group of 1 to 50 carbon atoms, R" represents a hydrogen atom, a substituted or unsubstituted monovalent hydrocarbon group, —$CO_2H$, —$SO_3H$, —OH, —SH, —$NR^c_2$, —CN or —$C(=O)NR^c_2$, wherein $R^c$ represents a substituted or unsubstituted alkyl group of 1 to 30 carbon atoms or a substituted or unsubstituted aryl group of 6 to 50 carbon atoms, R''' represents a substituted or unsubstituted trivalent hydrocarbon group, m represents an integer of 1 or greater, and in cases where there is a plurality of any one or more of R', R" and R''' groups, in each case, the plurality of groups may be the same or different;

wherein $Ar^2$ represents an aromatic group having a valency of $(n^2+2)$, each $R^2$ independently represents a single bond or a group having a valency of $(m^2+1)$, $X^2$ represents a pyrrolidonyl group, a group represented by the formula: —COOM, a group represented by the formula (p-1), or a group represented by the formula (p-2); as a monovalent group containing a hetero atom, and $m^2$ and $n^2$ are identical or different and each represents an integer of 1 or greater; and wherein the aromatic group having a valency of $(n^1+1)$ represented by $Ar^1$ and the aromatic group having a valency of $(n^2+2)$ represented by $Ar^2$ are residues in which $(n^1+1)$ aromatic ring-bonded hydrogen atoms and $(n^2+2)$ aromatic ring-bonded hydrogen atoms respectively have been removed from an aromatic compound represented by any one of formulas (2) to (26), (28) to (35), (37) and (39)-(57) shown below or a substituted aromatic compound thereof:

(2)

(3)

(4)

(5)

(6)

(7)

(8)

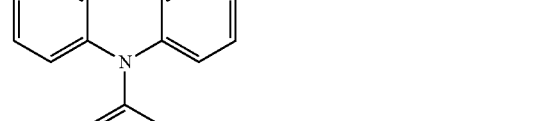
(9)

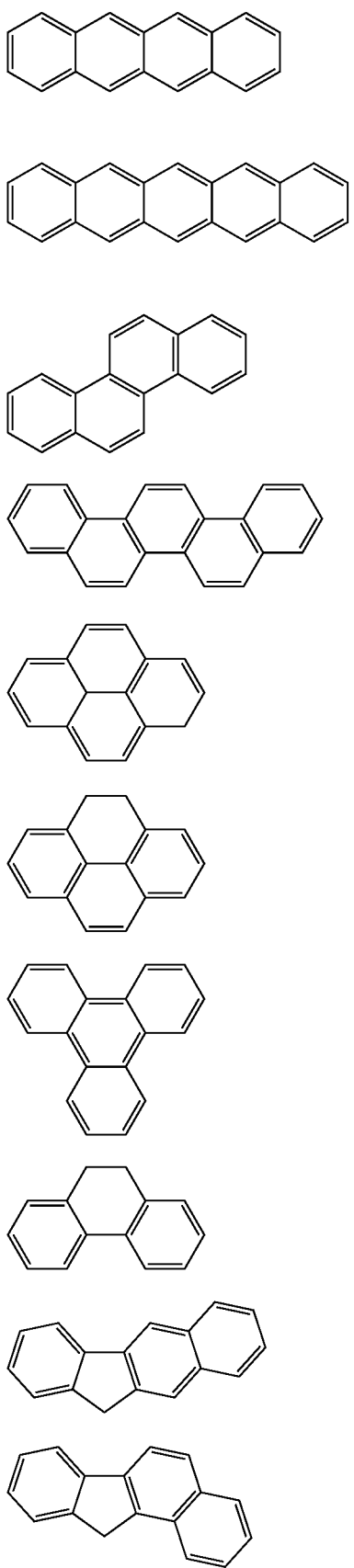
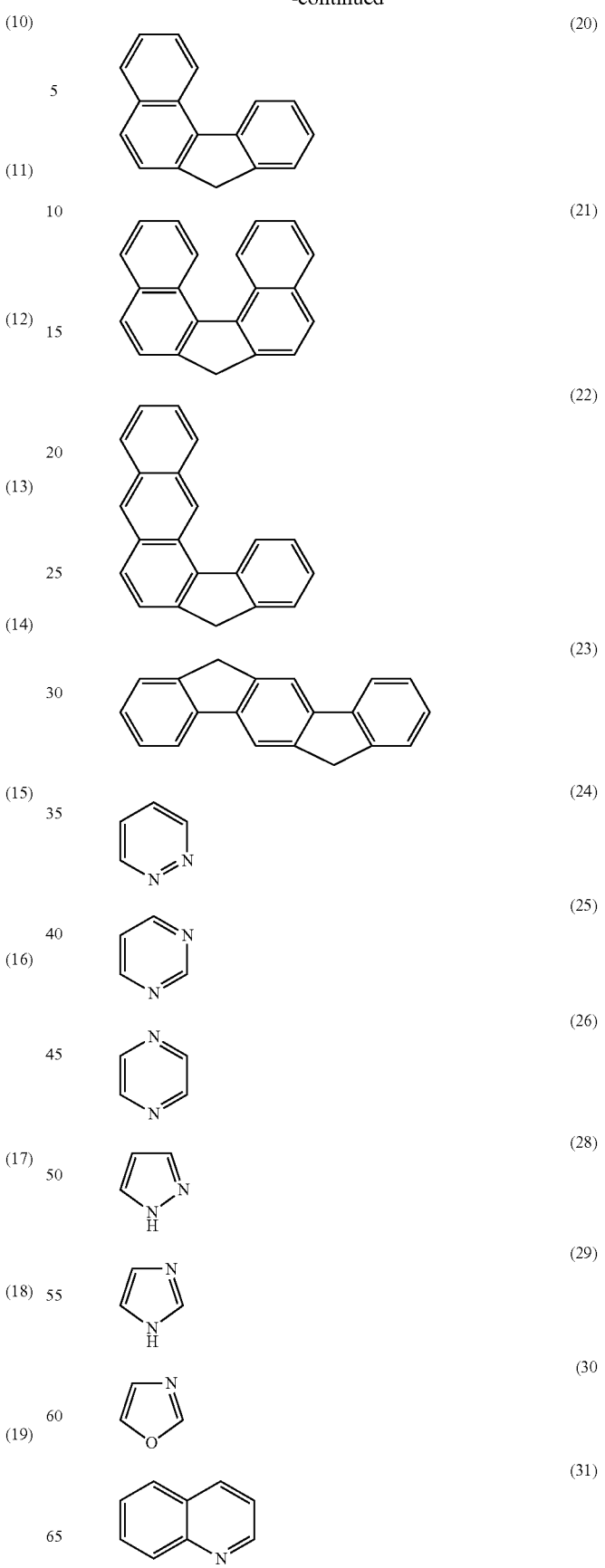

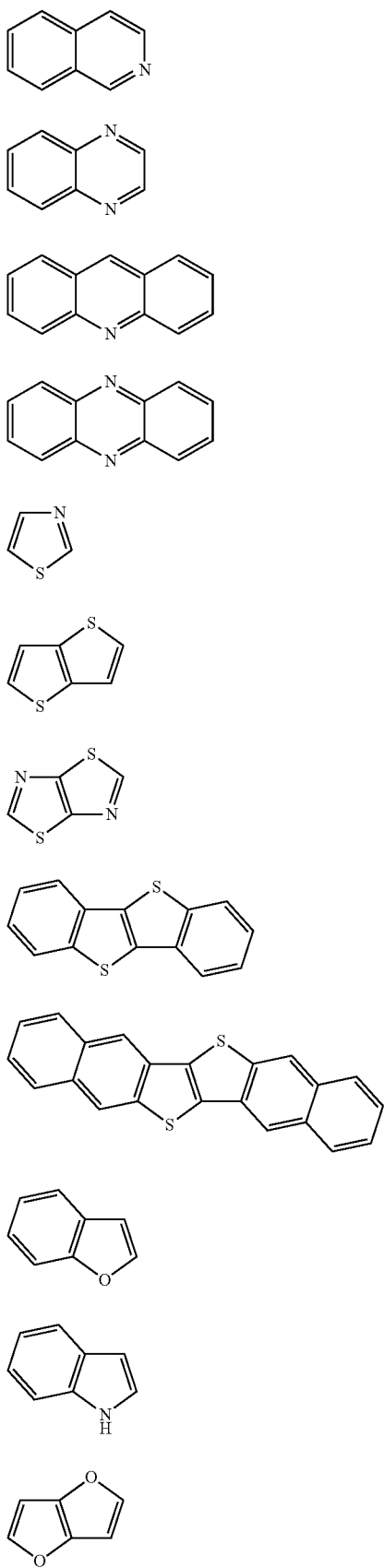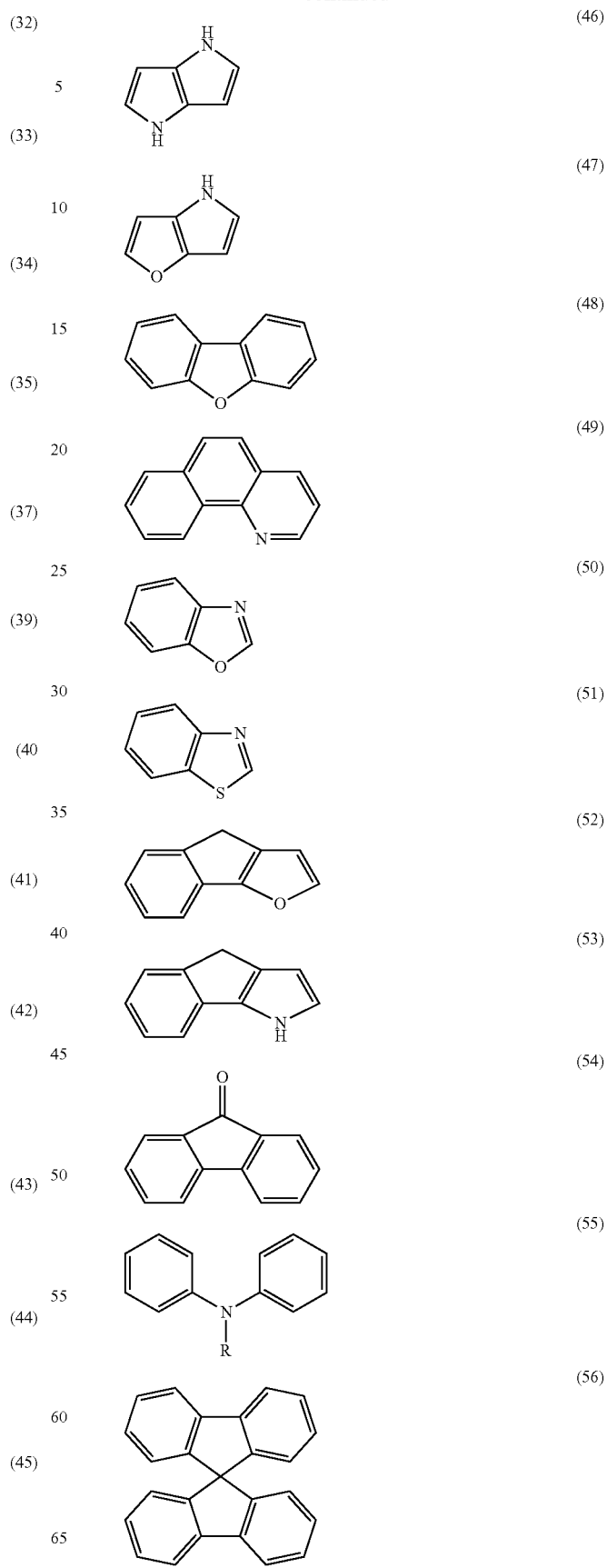

-continued

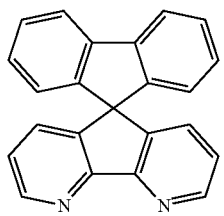
(57)

wherein R in the formula (55) represents a hydrogen atom or a substituted or unsubstituted hydrocarbon group.

2. The silver-(conjugated compound) composite according to claim 1, wherein the conjugated compound is an aromatic compound.

3. The silver-(conjugated compound) composite according to claim 1, wherein a proportion of the conjugated compound within the silver-(conjugated compound) composite is not less than 1.0% by weight.

4. The silver-(conjugated compound) composite according to claim 1, further comprising an unconjugated compound.

5. The silver-(conjugated compound) composite according to claim 1, wherein the composite is in a particulate form having a number-average Feret diameter of not more than 1,100 nm.

6. The silver-(conjugated compound) composite according to claim 1, wherein the conjugated compound is insoluble in water.

7. The silver-(conjugated compound) composite according to claim 1, wherein a formula weight of the repeating unit represented by the formula (II) is not less than $3.0 \times 10^2$.

8. The silver-(conjugated compound) composite according to claim 1, wherein if a total number of atoms that exist within the composite, determined by X-ray photoelectron spectroscopy, is deemed to be 1, then a proportion of hetero atoms other than silver atoms is 0.01 or greater.

9. The silver-(conjugated compound) composite according to claim 1, which when measured by X-ray photoelectron spectroscopy, exhibits a peak attributable to the conjugated compound that is not detected in pure metallic silver.

10. The silver-(conjugated compound) composite according to claim 1, wherein a band gap of the conjugated compound, determined by measurement using an ultraviolet-visible-near infrared spectrometer, is 2.1 eV or greater.

11. The silver-(conjugated compound) composite according to claim 1, wherein an ionization potential of the conjugated compound, determined by measurement in the atmosphere using a photoelectron spectrometer, is 5.2 eV or greater.

12. A method of producing the silver-(conjugated compound) composite defined in claim 1, the method comprising the step of reducing a silver compound in presence of a conjugated compound having a weight-average molecular weight of not less than $3.0 \times 10^2$,
wherein the conjugated compound has a monovalent group represented by a formula (I) shown below, a repeating unit represented by a formula (II) shown below, or a monovalent group represented by the formula (I) and a repeating unit represented by the formula (II):

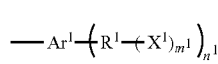
(I)

wherein $Ar^1$ represents an aromatic group having a valency of $(n^1+1)$, each $R^1$ independently represents a single bond or a group having a valency of $(m^1+1)$, $X^1$ represents a pyrrolidonyl group, a group represented by the formula: —COOM, a group represented by the formula (p-1), or a group represented by the formula (p-2); as a monovalent group containing a hetero atom, and $m^1$ and $n^1$ are identical or different and each represents an integer of 1 or greater,

(II)

(p-1)

(p-2)

wherein R' represents a substituted or unsubstituted divalent hydrocarbon group or a group represented by a formula: —$R^d$O—, wherein $R^d$ represents an alkylene group of 1 to 50 carbon atoms, R" represents a hydrogen atom, a substituted or unsubstituted monovalent hydrocarbon group, —$CO_2H$, —$SO_3H$, —OH, —SH, —$NR^c_2$, —CN or —$C(=O)NR^c_2$, wherein $R^c$ represents a substituted or unsubstituted alkyl group of 1 to 30 carbon atoms or a substituted or unsubstituted aryl group of 6 to 50 carbon atoms, R'" represents a substituted or unsubstituted trivalent hydrocarbon group, m represents an integer of 1 or greater, and in cases where there is a plurality of any one or more of R', R" and R'" groups, in each case, the plurality of groups may be the same or different;

wherein $Ar^2$ represents an aromatic group having a valency of $(n^2+2)$, each $R^2$ independently represents a single bond or a group having a valency of $(m^2+1)$, $X^2$ represents a pyrrolidonyl group, a group represented by the formula: —COOM, a group represented by the formula (p-1), or a group represented by the formula (p-2); as a monovalent group containing a hetero atom, and $m^2$ and $n^2$ are identical or different and each represents an integer of 1 or greater; and wherein the aromatic group having a valency of $(n^1+1)$ represented by $Ar^1$ and the aromatic group having a valency of $(n^2+2)$ represented by $Ar^2$ are residues in which $(n^1+1)$ aromatic ring-bonded hydrogen atoms and $(n^2+2)$ aromatic ring-bonded hydrogen atoms respectively have been removed from an aromatic compound represented by any one of formulas (2) to (26), (28) to (35), (37) and (39)-(57) shown below or a substituted aromatic compound thereof:

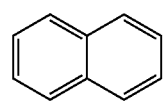
(2)

-continued
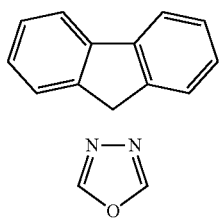
(3)
(4)
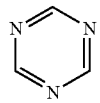
(5)
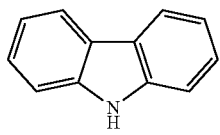
(6)
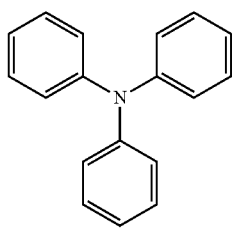
(7)
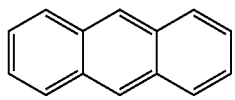
(8)
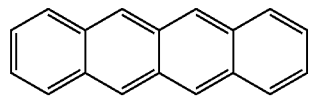
(9)
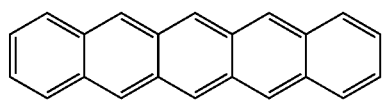
(10)
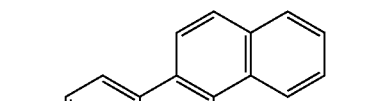
(11)
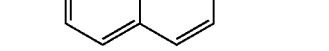
(12)
(13)
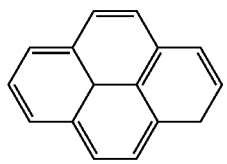
(14)
-continued
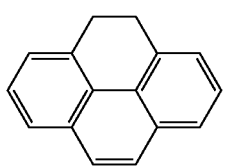
(15)
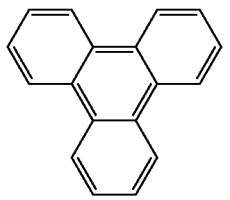
(16)
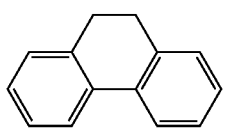
(17)
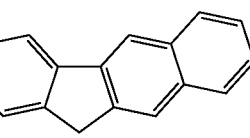
(18)
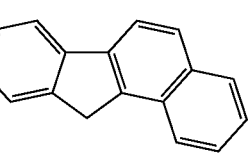
(19)
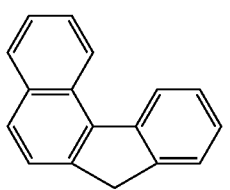
(20)
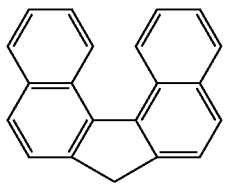
(21)
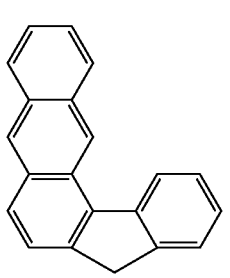
(22)
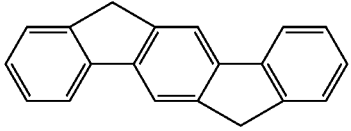
(23)

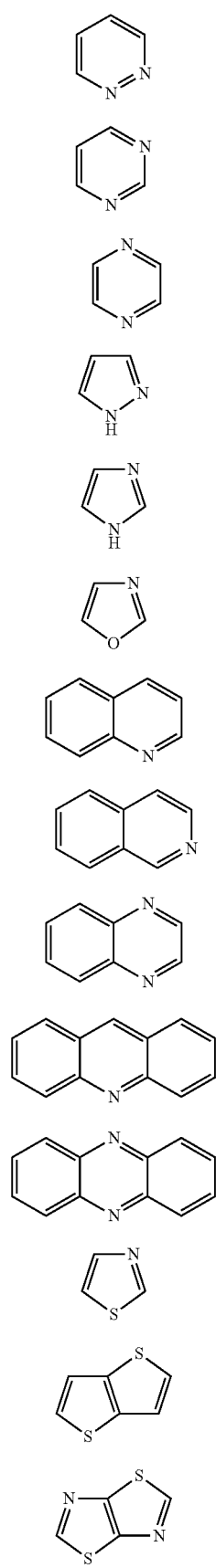
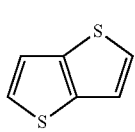
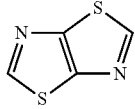
(24)
(25)
(26)
(28)
(29)
(30)
(31)
(32)
(33)
(34)
(35)
(37)
(39)
(40)
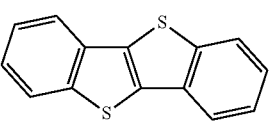
(41)
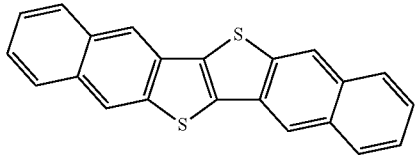
(42)
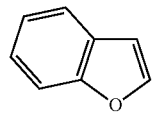
(43)
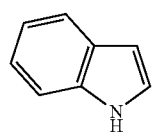
(44)
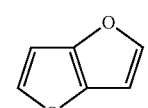
(45)
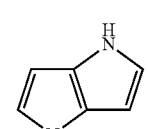
(46)
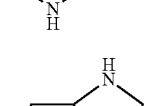
(47)
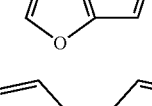
(48)
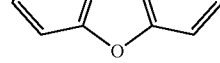
(49)
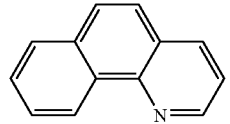
(50)
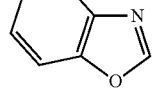
(51)
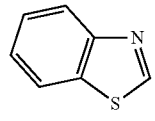
(52)
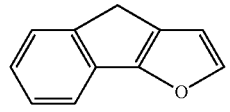

-continued

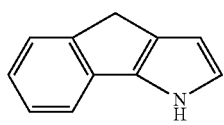

(53)

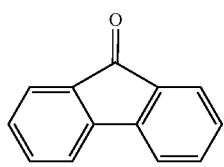

(54)

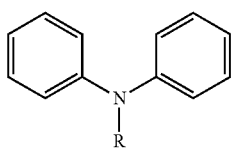

(55)

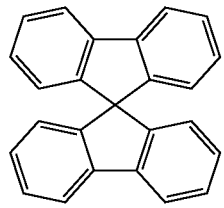

(56)

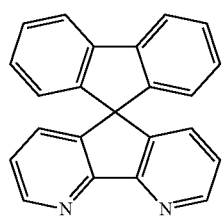

(57)

wherein R in the formula (55) represents a hydrogen atom or a substituted or unsubstituted hydrocarbon group.

13. A method of producing the silver-(conjugated compound) composite defined in claim 1, the method comprising the step of bringing silver particles, which have been prepared in advance by coating silver particles having a number-average Feret diameter of not more than 1,000 nm with an unconjugated compound, and a conjugated compound having a weight-average molecular weight of not less than $3.0 \times 10^2$ into contact within a solvent, wherein the conjugated compound has a monovalent group represented by a formula (I) shown below, a repeating unit represented by a formula (II) shown below, or a monovalent group represented by the formula (I) and a repeating unit represented by the formula (II):

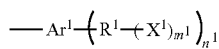

(I)

wherein $Ar^1$ represents an aromatic group having a valency of $(n^1+1)$, each $R^1$ independently represents a single bond or a group having a valency of $(m^1+1)$, $X^1$ represents a pyrrolidonyl group, a group represented by the formula: —COOM, a group represented by the formula (p-1), or a group represented by the formula (p-2); as a monovalent group containing a hetero atom, and $m^1$ and $n^1$ are identical or different and each represents an integer of 1 or greater,

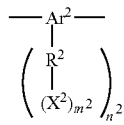

(II)

—O—(R'O)$_m$—R''  (p-1)

(p-2)

wherein R' represents a substituted or unsubstituted divalent hydrocarbon group or a group represented by a formula: —R$^d$O—, wherein R$^d$ represents an alkylene group of 1 to 50 carbon atoms, R'' represents a hydrogen atom, a substituted or unsubstituted monovalent hydrocarbon group, —CO$_2$H, —SO$_3$H, —OH, —SH, —NR$^c{}_2$, —CN or —C(=O)NR$^c{}_2$, wherein R$^c$ represents a substituted or unsubstituted alkyl group of 1 to 30 carbon atoms or a substituted or unsubstituted aryl group of 6 to 50 carbon atoms, R''' represents a substituted or unsubstituted trivalent hydrocarbon group, m represents an integer of 1 or greater, and in cases where there is a plurality of any one or more of R', R'' and R''' groups, in each case, the plurality of groups may be the same or different;

wherein $Ar^2$ represents an aromatic group having a valency of $(n^2+2)$, each $R^2$ independently represents a single bond or a group having a valency of $(m^2+1)$, $X^2$ represents a pyrrolidonyl group, a group represented by the formula: —COOM, a group represented by the formula (p-1), or a group represented by the formula (p-2); as a monovalent group containing a hetero atom, and $m^2$ and $n^2$ are identical or different and each represents an integer of 1 or greater; and wherein the aromatic group having a valency of $(n^1+1)$ represented by $Ar^1$ and the aromatic group having a valency of $(n^2+2)$ represented by $Ar^2$ are residues in which $(n^1+1)$ aromatic ring-bonded hydrogen atoms and $(n^2+2)$ aromatic ring-bonded hydrogen atoms respectively have been removed from an aromatic compound represented by any one of formulas (2) to (26), (28) to (35), (37) and (39)-(57) shown below or a substituted aromatic compound thereof:

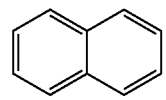

(2)

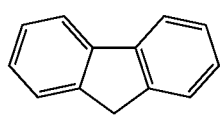

(3)

(4)

-continued
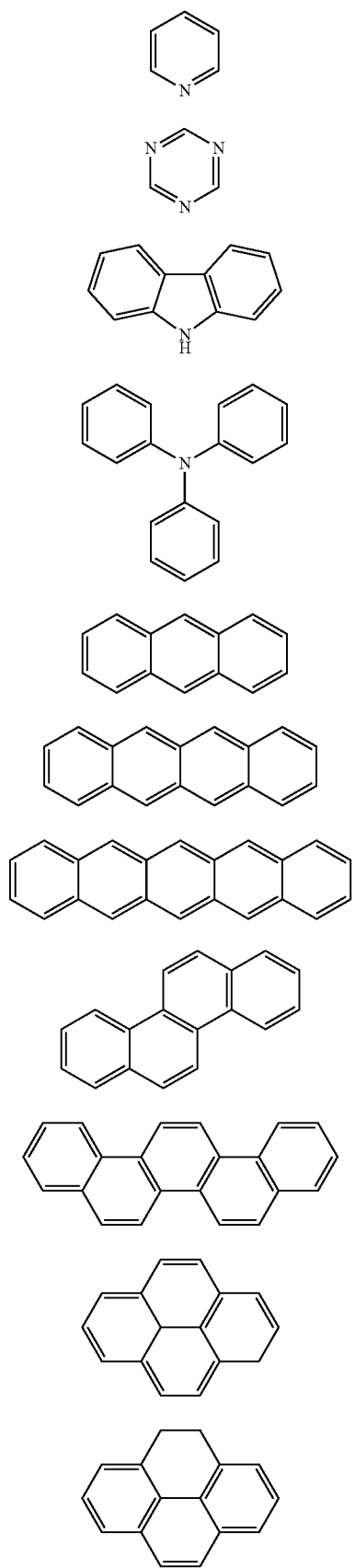
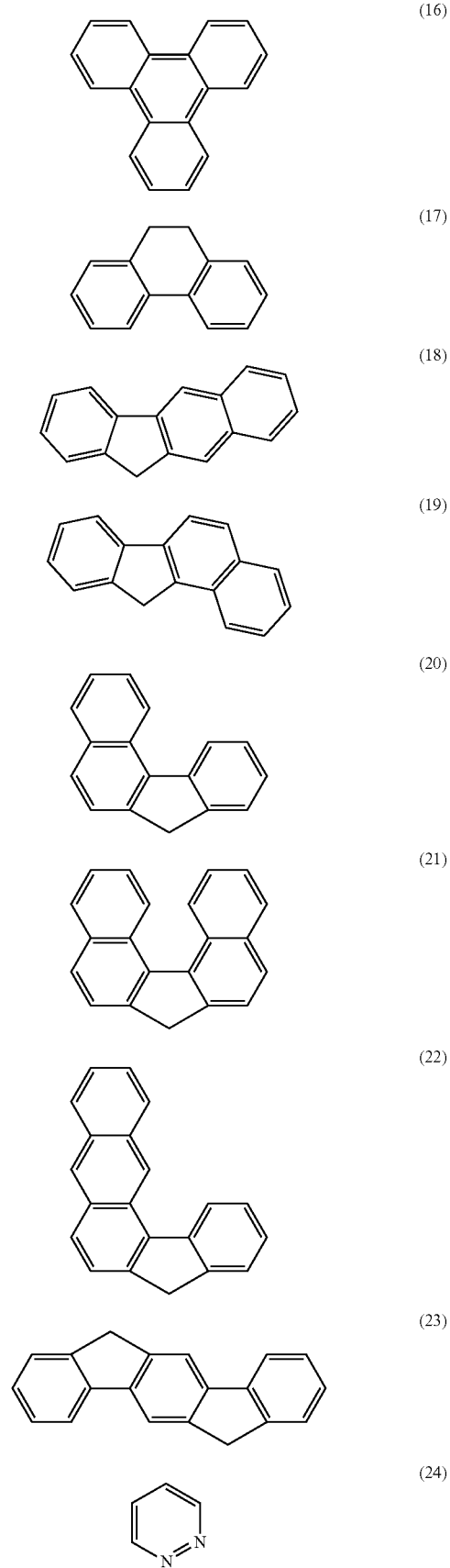

103
-continued
(25)
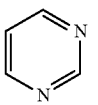
(26)
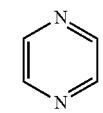
(28)
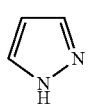
(29)
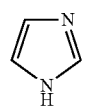
(30)
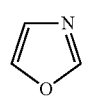
(31)
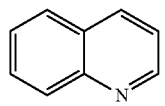
(32)
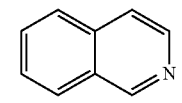
(33)
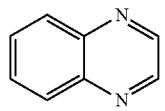
(34)
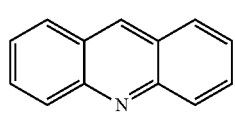
(35)
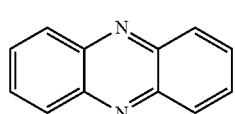
(37)
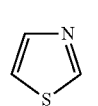
(39)
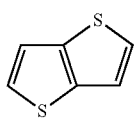
(40)
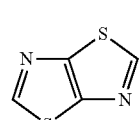
(41)
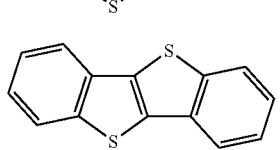
104
-continued
(42)
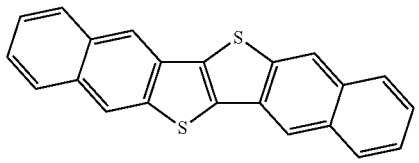
(43)
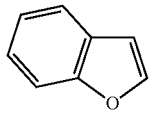
(44)
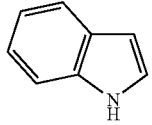
(45)
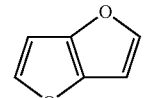
(46)
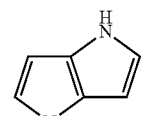
(47)
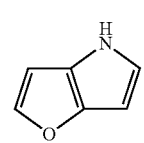
(48)
(49)
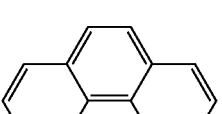
(50)
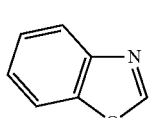
(51)
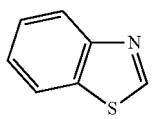
(52)
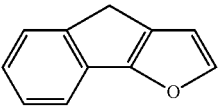
(53)
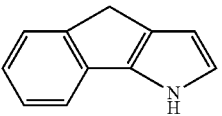

(54) 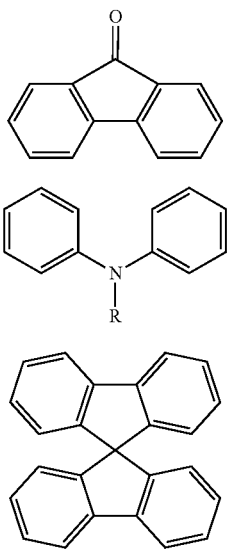

(55)

(56)

(57) 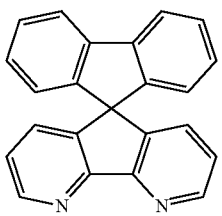

wherein R in the formula (55) represents a hydrogen atom or a substituted or unsubstituted hydrocarbon group.

14. A dispersion, comprising the silver-(conjugated compound) composite defined in claim 1.

15. An electrode material, comprising the silver-(conjugated compound) composite defined in claim 1.

16. A layered structure, comprising a substrate, and a layer comprising the silver-(conjugated compound) composite defined in claim 1 formed on the substrate.

17. An organic electronic device, comprising the silver-(conjugated compound) composite defined in claim 1.

* * * * *